United States Patent
Chen et al.

(10) Patent No.: US 10,496,463 B2
(45) Date of Patent: *Dec. 3, 2019

(54) INTERACTIVE, CONSTRAINT-NETWORK PROGNOSTICS AND DIAGNOSTICS TO CONTROL ERRORS AND CONFLICTS (IPDN)

(71) Applicant: Purdue Research Foundation, West Lafayette, IN (US)

(72) Inventors: Xin W. Chen, Glen Carbon, IL (US); Shimon Y. Nof, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/700,917

(22) Filed: Sep. 11, 2017

(65) Prior Publication Data

US 2018/0089006 A1     Mar. 29, 2018

Related U.S. Application Data

(63) Continuation of application No. 14/685,352, filed on Apr. 13, 2015, now Pat. No. 9,760,422, which is a (Continued)

(51) Int. Cl.
*G06F 11/00*     (2006.01)
*G06F 11/07*     (2006.01)
(Continued)

(52) U.S. Cl.
CPC ........ *G06F 11/076* (2013.01); *G05B 23/0251* (2013.01); *G06F 11/0709* (2013.01); *G06F 11/079* (2013.01); *G06F 11/3676* (2013.01)

(58) Field of Classification Search
CPC ..... G05B 23/0243–0297; G06F 11/076; G06F 11/079
See application file for complete search history.

(56) References Cited

U.S. PATENT DOCUMENTS 6,789,257 B1    9/2004  MacPhail
6,918,059 B1    7/2005  Galuten
(Continued)

OTHER PUBLICATIONS

Chen, X. W. et al., Automating Errors and Conflicts Prognostics and Prevention, in Shimon Y. Nof (ed.), Springer Handbook of Automation, Springer Berlin Heidelberg, 2009, pp. 503-525.
(Continued)

*Primary Examiner* — Michael Maskulinski
(74) *Attorney, Agent, or Firm* — Maginot, Moore & Beck LLP

(57) ABSTRACT

Methods for interactively preventing and detecting conflicts and errors (CEs) through prognostics and diagnostics. Centralized and Decentralized Conflict and Error Prevention and Detection (CEPD) Logic is developed for prognostics and diagnostics over three types of real-world constraint networks: random networks (RN), scale-free networks (SFN), and Bose-Einstein condensation networks (BECN). A method is provided for selecting an appropriate CEPD algorithm from a plurality of algorithms having either centralized or decentralized CEPD logic, based on analysis of the characteristics of the CEPD algorithms and the characteristics of the constraint network.

14 Claims, 11 Drawing Sheets

Relationship between Research Questions and Problems.

Related U.S. Application Data continuation of application No. 13/174,424, filed on Jun. 30, 2011, now Pat. No. 9,009,530.

(60) Provisional application No. 61/359,994, filed on Jun. 30, 2010.

(51) Int. Cl.
*G06F 11/36* (2006.01)
*G05B 23/02* (2006.01)

(56) References Cited

U.S. PATENT DOCUMENTS

| | | |
|---|---|---|
| 7,281,173 B2 | 10/2007 | Hite et al. |
| 7,570,580 B1 | 8/2009 | Bajpay |
| 7,636,038 B1 | 12/2009 | Nof et al. |
| 2002/0111755 A1 | 8/2002 | Valadarsky |
| 2004/0225381 A1 | 11/2004 | Ritz |
| 2006/0235962 A1 | 10/2006 | Vinberg et al. |
| 2011/0071750 A1 | 3/2011 | Giovino et al. |
| 2011/0083043 A1 | 4/2011 | Chan |

OTHER PUBLICATIONS

Chen, X. W. et al., Prognostics and Diagnostics of Conflicts and Errors Over e-Work Networks, 19th International Conference on Production Research, Jul. 29-Aug. 2, 2007, Valparaiso, Chile, 6 pgs.

Chen, X. W., Information Systems Supported Decentralized Conflict and Error Prevention and Detection, Proceedings of the 2009 Industrial Engineering Research Conference, May 30-Jun. 3, 2009, Miami, Florida, 6 pgs.

Chen, X. W. et al., Prognostics and Diagnostics of Conflicts and Errors in a Supply Network, 8th IFAC International Workshop on Intelligent Manufacturing Systems, University of Alicante, Spain, May 23-25, 2007, 6 pgs.

Chen, X. W. et al., Error Detection and Prediction Algorithms: Application in Robotics, Journal of Intelligent and Robotic Systems, vol. 48, Issue 2, Feb. 2007, pp. 225-252.

Lara, M. A. et al., Computer-Supported Conflict Resolution for Collaborative Facility Designers, International Journal of Production Research, vol. 41, No. 2, 2003, pp. 207-233.

Nof S. Y., Design of Effective e-Work: Review of Models, Tools, and Emerging Challenges, Production Planning and Control, vol. 14, No. 8, Dec. 2003, pp. 681-703.

Velasquez, J.D. et al., Systematic Resolution of conflict Situation in Collaborative Facility Design, International Journal o f Production Economics, vol. 116, No. 1, Nov. 2008, pp. 139-153.

Yang, C. L. et al., design of a task planning conflict and Error Detection System with Active Protocols and Agents, PRISM Research Memorandum No. 2004-P1, School of Industrial Engineering, Purdue University, West Lafayette, Indiana, Aug. 2004, 29 pgs.

Yang, C.L. et al., Analysis, Detection Policy, and Performance Measures of Detection Task Planning Errors and Conflicts, PRISM Research Memorandum No. 2007-P2, School of Industrial Engineering, Purdue University, West Lafayette, Indiana, Aug. 2004, 30 pgs.

Chen, X. et al., Agent-based Error Prevention Algorithms, PRISM Center, School of Industrial Engineering, Purdue University, West Lafayette, USA, 2011.

Chen, X. et al., A Decentralized Conflict and Error Detection and Prediction Model, PRISM Center and School of Industrial Engineering, Purdue University, West Lafayette, Indiana, USA, 2010.

Chen, Prognostics and Diagnostics of Conflicts and Errors with Prevention and Detection Logic, Apr. 10, 2009.

Albert, R., Jeong, H., and Barabasi, A. L., 1999, "Internet: Diameter of the World-Wide Web," Nature, 401(6749), pp. 130-131.

Albert, R., Jeong, H., and Barabasi, A. L., 2000, "Error and attack tolerance of complex networks," Nature, 406(6794), pp. 378-382.

Aiello, W., Chung, F., and Lu, L., 2000, "A random graph model for massive graphs," In Proceedings of the 32nd Annual ACM Symposium on Theory of Computing, pp. 171-180. Association of Computing machinery, New York.

Angeles Serrano, M. and De Los Rios, P., 2007, "Interfaces and the edge percolation map of random directed networks," Physical Review E—Statistical, Nonlnear, and Soft Matter Physics, 76(5), pp. 56-121.

Barabasi, A. L. and Albert, R., 1999, "Emergence of scaling in random networks," Science, 286(5439), pp. 509-512.

Barber, K. S., Liu, T. H., and Ramaswamy, S., 2001, "Conflict detection during plan integration for multi-agent systems," IEEE Transactions on Systems, Man, and Cybernetics, Part B: Cybernetics, 31(4), pp. 616-628.

Bianconi, G. and Barabasi, A. L., 2001a, "Competition and multiscaling in evolving networks," Europhysics Letters, 54(4), pp. 436-442.

Bianconi, G. and Barabasi, A. L., 2001b, "Bose-Einstein condensation in complex networks," Physical Review Letters, 86(24), pp. 5632-5635.

Broder, A., Kumar, R., Maghoul, F., Raghavan, P., Rajagopalan, S., Stata, R, Tomkins, A., and Wiener, J., 2000, "Graph structure in the Web," Computer Networks, 33(1), pp. 309-320.

Ceroni, J. A. and Velasquez, A. A., 2003, "Conflict detection and resolution in distributed design," Production Planning and Control, 14(8), pp. 734-742.

Cohen, R., Erez, K., Ben-Avraham, D., and Havlin, S., 2000, "Resilience of the Internet to random breakdowns," Physical Review Letters, 85(21), pp. 4626-4628.

Cohen, R., Erez, K., Ben-Avraham, D., and Havlin, S., 2001, "Breakdown of the Internet under intentional attack," Physical Review Letters, 86(16), pp. 3682-3685.

Cohen, R. and Havlin, S., 2003, "Scale-free networks are ultrasmall," Physical Review Letters, 90(5), pp. 0587011-0587014.

Deb, S., Pattipati, K. R., Raghavan, V., Shakeri, M., and Shrestha, R., 1995, "Multi-signal flow graphs: a novel approach for system testability analysis and fault diagnosis," IEEE Aerospace and Electronics Systems Magazine, 10(5), pp. 14-25.

Dorogovtsev, S. N., Mendes, J. F. F., and Samukhin, A. N., 2001, "Giant strongly connected component of directed networks," Physical Review E—Statistical, Nonlinear, and Soft Matter Physics, 64(2), pp. 0251011-0251014.

Georgilakis, P. S., Katsigiannis, J. A., Valavanis, K. P., and Souflaris, A. T., 2006, "A systematic stochastic Petri net based methodology for transformer fault diagnosis and repair actions," Journal of Intelligent and Robotic Systems: Theory and Applications, 45(2), pp. 181-201.

Gertler, J., 1998, Fault detection and diagnosis in engineering systems, New York, Marcel Dekker.

Newman, M. E. J., 2003, "The Structure and Function of Complex Networks," SIAM Review, 45(2), pp. 167-256.

Newman, M. E. J., Strogatz, S. H., and Watts, D. J., 2001, "Random graphs with arbitrary degree distributions and their applications," Physical Review E—Statistical, Nonlinear, and Soft Matter Physics, 64(2), 0261181-02611817.

Shakeri, M., Raghavan, V., Pattipati, K. R., and Patterson-Hine, A., 2000, "Sequential testing algorithms for multiple fault diagnosis," IEEE Transactions on Systems, Man & amp; Cybernetics, Part A: Systems & amp; Humans, 30(1), pp. 1-14.

Shin, M., Cha, Y., Ryu, K., and Jung, M., 2006, "Conflict detection and resolution for goal formation in the fractal manufacturing system," International Journal of Production Research, 44(3), pp. 447-465.

Solomonoff, R. and Rapoport, A., 1951, "Connectivity of random nets," Bulletin of mathematical Biophysics, 13, pp. 107-117.

Tu, F. and Pattipati, K. R., 2003, "Rollout strategies for sequential fault diagnosis," IEEE Transactions on Systems, Man, and Cybernetics Part A: Systems and Humans, 33(1), pp. 86-99.

Tu, F., Pattipati, K. R., Deb, S., and Malepati, V. N., 2003, "Computationally efficient algorithms for multiple fault diagnosis in large graph-based systems," IEEE Transactions on Systems, Man, and Cybernetics Part A: Systems and Humans, 33(1), pp. 73-85.

Wenbin, Q. and Kumar, R., 2006, "Decentralized failure diagnosis of discrete event systems," IEEE Transactions on Systems, Man & amp; Cybernetics, Part A: Systems & amp; Humans, 36(2), pp. 384-395.

(56) References Cited

OTHER PUBLICATIONS

Zad, S. H., Kwong, R. H., and Wonham, W. M., 2003, "fault diagnosis in discrete-event systems: framework and model reduction," IEEE Transactions on Automatic Control, 48(7), pp. 1199-1212.

Li, X., Zhou, X., and Ruan, X., 2002, "Conflict management in closely coupled collaborative design system," International Journal of Computer Integrated Manufacturing, 15(4), pp. 345-352.

Klein, M., 1992, "Detecting and resolving conflicts among cooperating human and machine-based design agents," Artificial Intelligence in Engineering, 7(2), pp. 93-104.

Jiang, T. and Nevill Jr., G. E., 2002, "Conflict cause identification in web-based concurrent engineering design system," Concurrent Engineering Research and Applications, 10(1), pp. 15-26.

Yang et al., Design of a Production Conflict and Error Detection Model with Active Protocols and Agents, 18th International Conference on Production Research, Jul. 31-Aug. 4, 2005, University of Salerno, Fisciamo, Italy, 6 pages.

Tadic, B., "Dynamics of directed graphs: the world-wide Web," Physica A: Statistical Mechanics and Its Applications, 2001, 293, pp. 273-284.

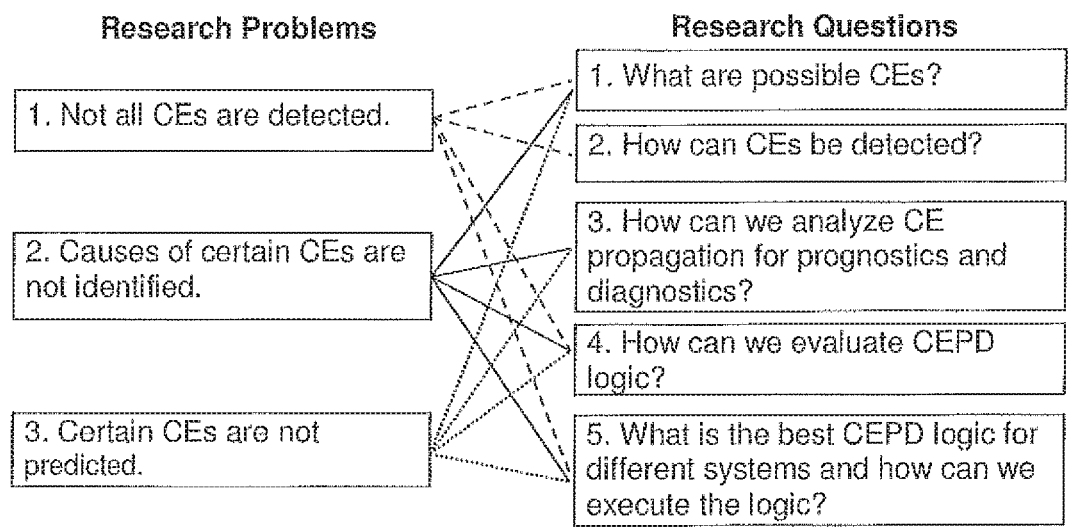
FIG. 1. Relationship between Research Questions and Problems.

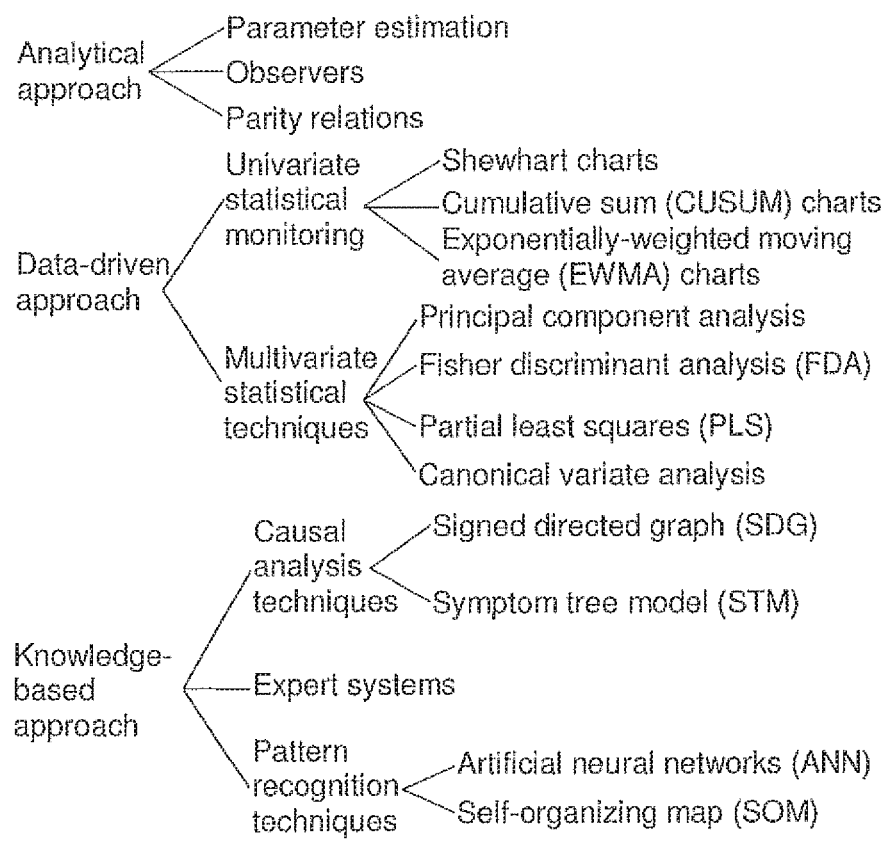
FIG. 2. Fault Management for Process Monitoring.

$$\begin{array}{c} \phantom{-}tr_1 \phantom{0} tr_2 \phantom{0} tr_3 \phantom{0} tr_4 \phantom{0} tr_5 \phantom{0} tr_6 \\ \begin{vmatrix} -1 & 0 & 1 & 0 & 0 & 0 \\ 1 & -1 & 0 & 0 & 0 & 0 \\ 0 & 1 & -1 & 0 & 0 & 0 \\ 0 & -1 & 1 & 0 & -1 & 1 \\ 0 & 0 & 0 & -1 & 0 & 1 \\ 0 & 0 & 0 & 1 & -1 & 0 \end{vmatrix} \begin{array}{c} p_1 \\ p_2 \\ p_3 \\ p_4 \\ p_5 \\ p_6 \end{array} \end{array}$$

FIG. 3. An Incidence Matrix Example.

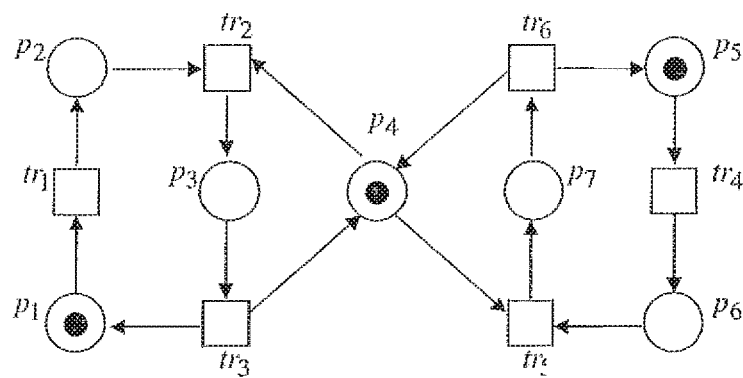

FIG. 4. A P/T Net Example.

$$\begin{vmatrix} 0 \\ 0 \\ 1 \\ 0 \\ 0 \\ 1 \\ 0 \end{vmatrix} = \begin{vmatrix} 1 \\ 0 \\ 0 \\ 1 \\ 1 \\ 0 \\ 0 \end{vmatrix} + \begin{vmatrix} -1 & 0 & 1 & 0 & 0 & 0 \\ 1 & -1 & 0 & 0 & 0 & 0 \\ 0 & 1 & -1 & 0 & 0 & 0 \\ 0 & -1 & 1 & 0 & -1 & 1 \\ 0 & 0 & 0 & -1 & 0 & 1 \\ 0 & 0 & 0 & 1 & -1 & 0 \\ 0 & 0 & 0 & 0 & 1 & -1 \end{vmatrix} \bullet \begin{vmatrix} 1 \\ 1 \\ 0 \\ 1 \\ 0 \\ 0 \end{vmatrix}$$

FIG. 5. Relationship between a Reachable Marking and Initial Marking $M_0$.

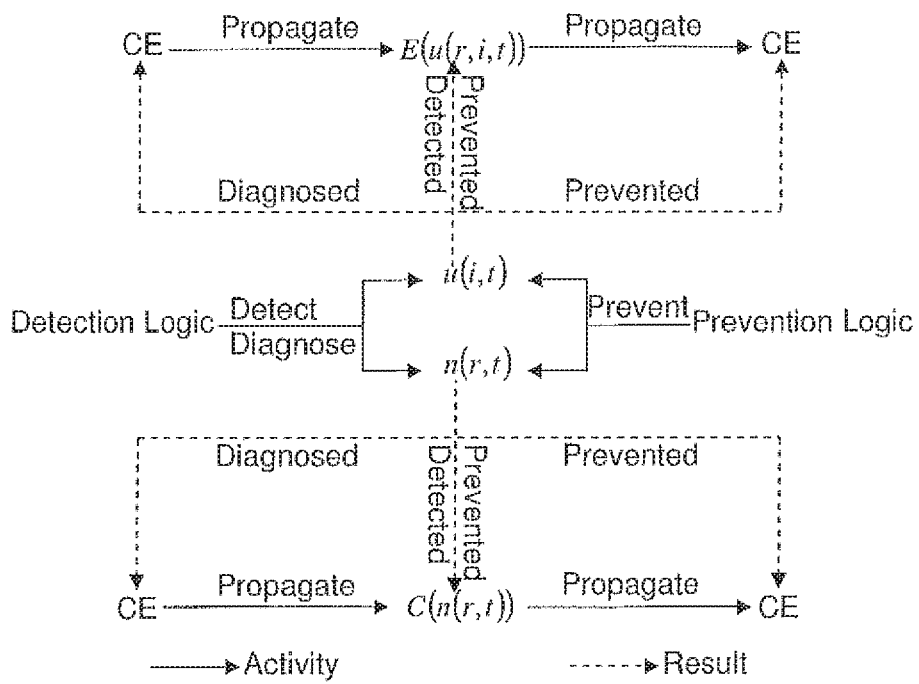
FIG. 6. Application of Prevention and Detection Logic for a Co-U/Co-net.

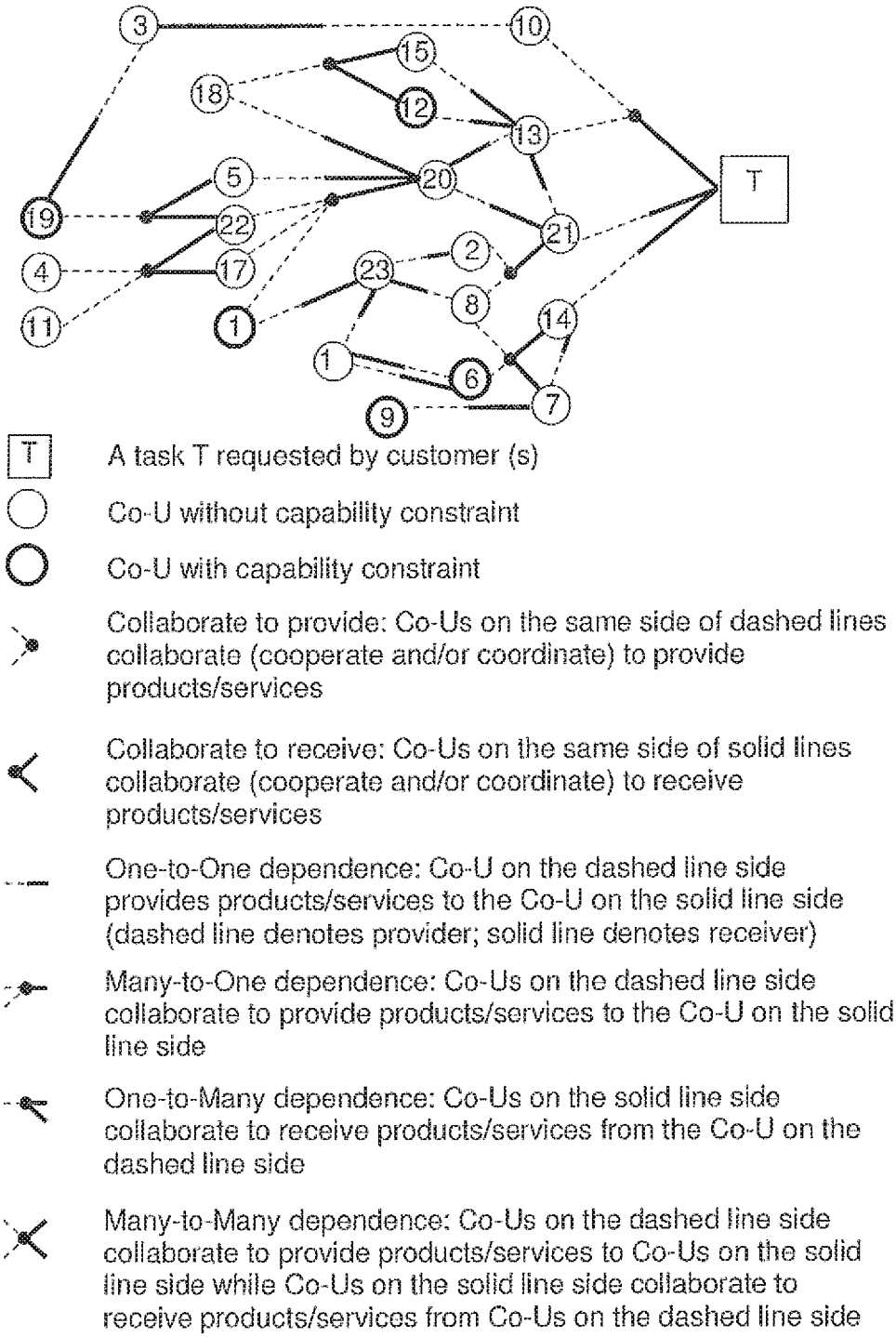
FIG. 7. Collaboration among Co-Us.

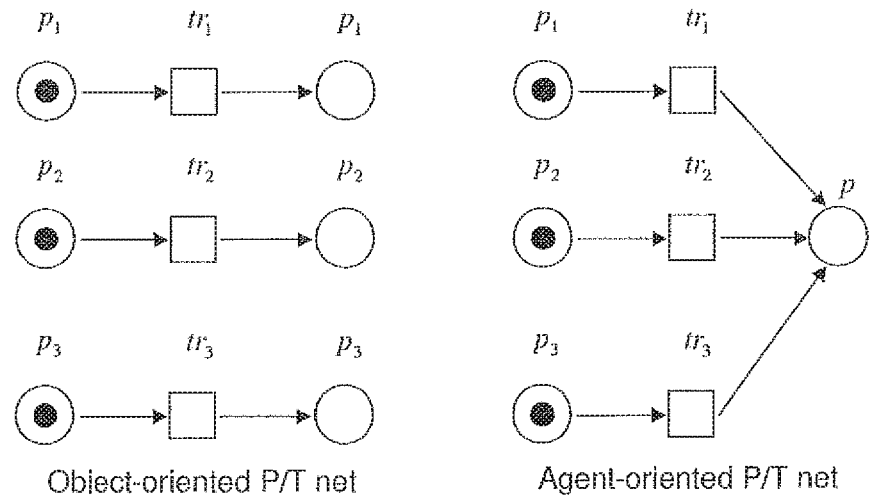
FIG. 8. Object-Oriented versus Agent-Oriented P/T Nets.
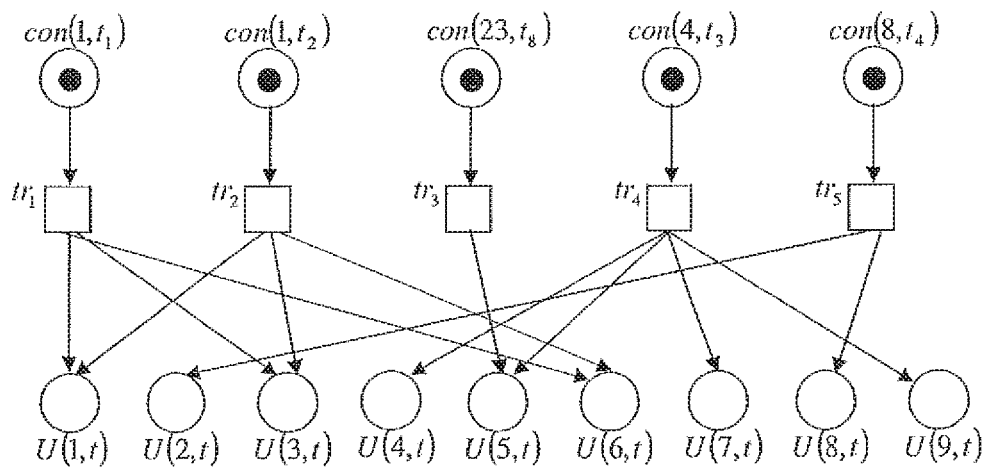
FIG. 9. An Example of the P/T Net for CEPD.

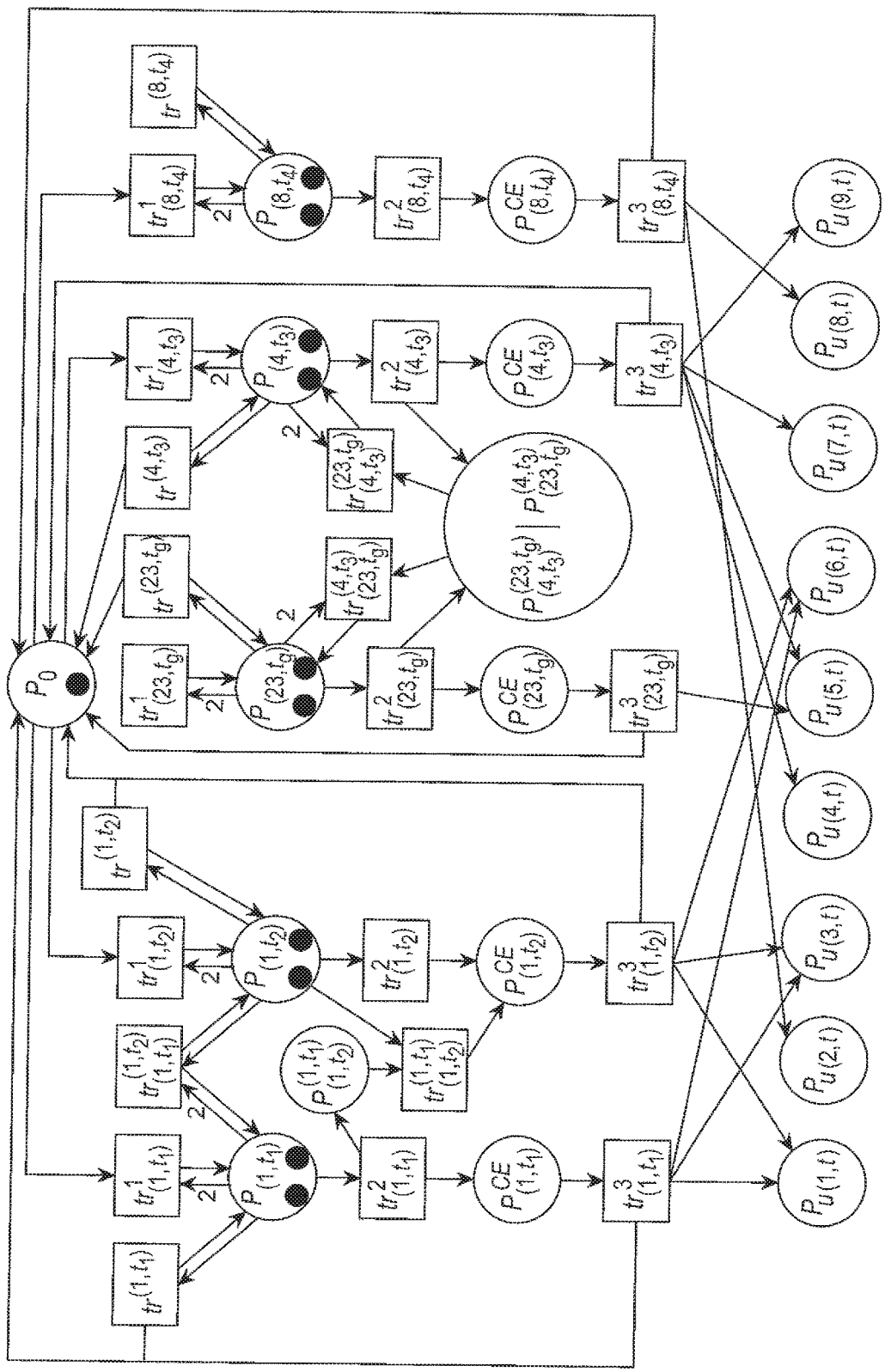
FIG. 10. A P/T Net Example of the Centralized CEPD Logic.

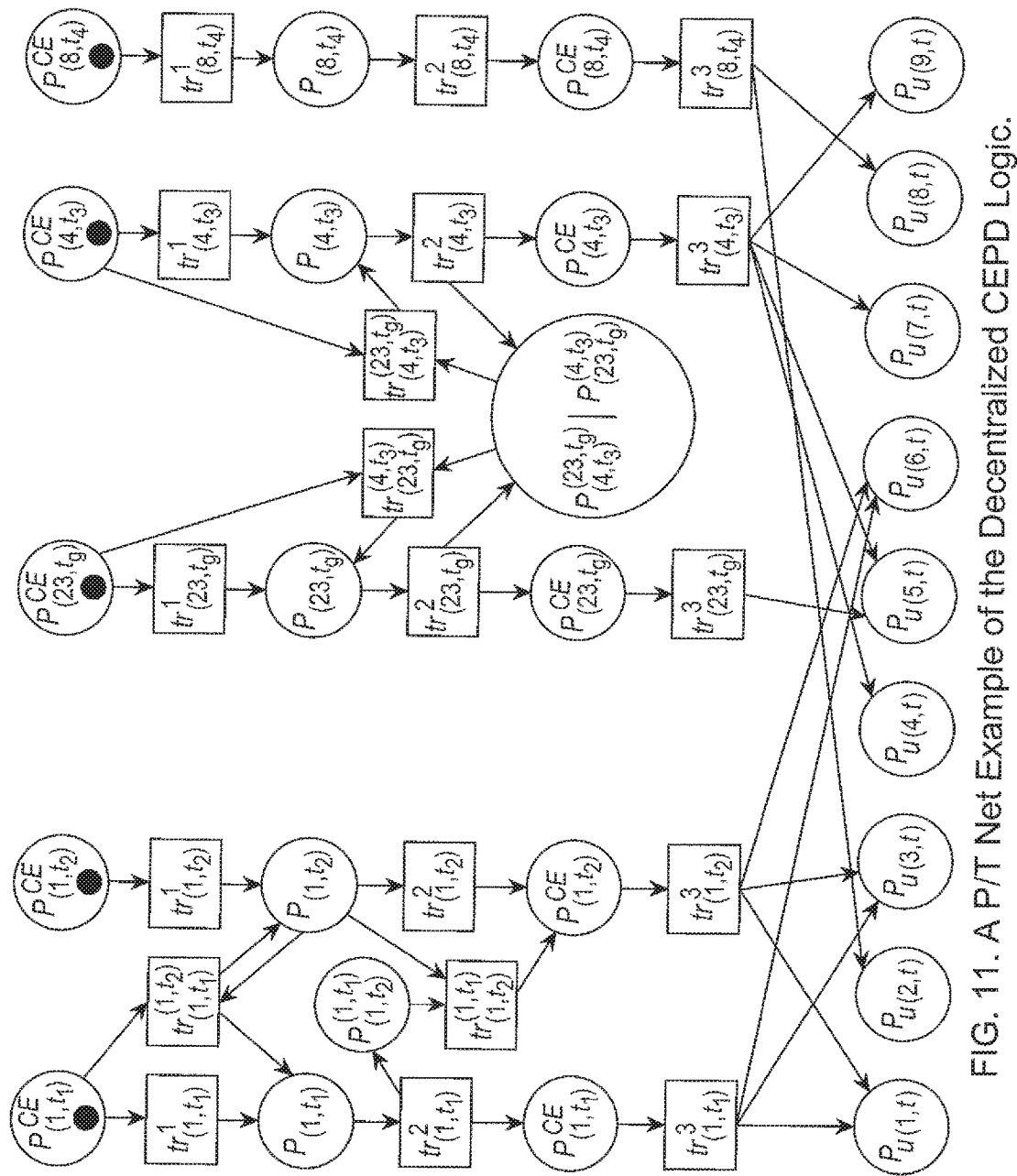
FIG. 11. A P/T Net Example of the Decentralized CEPD Logic.

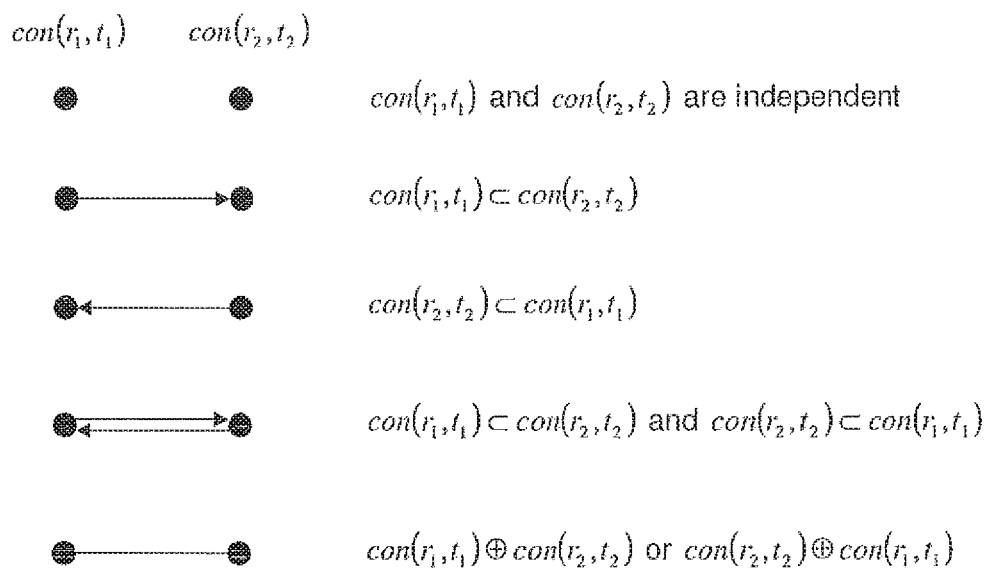
FIG. 12. Relationships between Constraints.

|  | Random Network (RN) | Scale-Free Network (SFN) | Bose-Einstein Condensation Network (BECN) |
|---|---|---|---|
| Network characteristic | The link between any pair of nodes exists with a probability $p$ | The degree distribution follows a power law distribution | The fittest node acquires a finite fraction of all links, independent of the size of the network |
| Degree distribution | $\binom{n-1}{d} p^d (1-p)^{n-1-d}$ | $cd^{-\gamma}$ | The fittest nodes acquires about 80% of all links |
| Topology | Homogeneous: the majority of nodes have the same number of links and nodes that deviate from the average are rare | Hierarchical: nodes span from rare hubs that have many links to the numerous tiny nodes with a few links | Winer-takes-all: the fittest nodes has a large fraction of all links |
| Topology example $n=10$; $p=0.17$; $\gamma=-3$; $c=1/1.20$ | 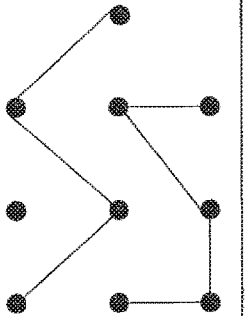 | 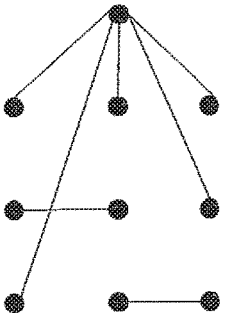 | 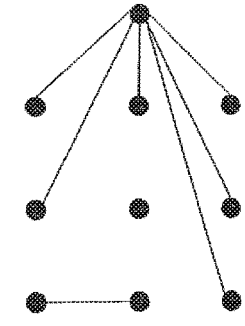 |
| Real-world examples | US highway systems | World Wide Web, actor collaboration, power grid | Supply network |

FIG. 13

Table 6.2 Experiment Results for Verification

| Performance Measure | Network | Centralized | | | Decentralized | | | Traditional | | |
|---|---|---|---|---|---|---|---|---|---|---|
| | | RN | SFN | BECN | RN | SFN | BECN | RN | SFN | BECN |
| $\overline{TT}$ | Undirected | | 50 | | situation (a) | | | | 50 | |
| | | | | | 5.97 | 5.97 | 5.97 | | | |
| | | | | | situation (b) | | | | | |
| | | | | | 49.82 | 41.54 | 49.89 | | | |
| | Directed | | | | situation (a) | | | | | |
| | | | | | 5.97 | 5.97 | 5.97 | | | |
| | | | | | situation (b) | | | | | |
| | | | | | 49.95 | 49.63 | 49.96 | | | |
| $\overline{CA}$ | Undirected | 0.26 | 0.16 | 0.29 | situation (a) | | | | 0.03 | |
| | | | | | 0.37 | 0.39 | 0.37 | | | |
| | | | | | situation (b) | | | | | |
| | | | | | 0.44 | 0.45 | 0.43 | | | |
| | Directed | 0.14 | 0.10 | 0.23 | situation (a) | | | | | |
| | | | | | 0.35 | 0.34 | 0.33 | | | |
| | | | | | situation (b) | | | | | |
| | | | | | 0.44 | 0.44 | 0.43 | | | |
| $\overline{PA}$ | Undirected | 0.08 | 0.04 | 0.10 | situation (a) | | | | 0 | |
| | | | | | 0.14 | 0.15 | 0.13 | | | |
| | | | | | situation (b) | | | | | |
| | | | | | 0.14 | 0.17 | 0.13 | | | |
| | Directed | 0.03 | 0.02 | 0.07 | situation (a) | | | | | |
| | | | | | 0.11 | 0.11 | 0.10 | | | |
| | | | | | situation (b) | | | | | |
| | | | | | 0.12 | 0.13 | 0.10 | | | |
| $\overline{TD}$ | Undirected | 29893 | 34324 | 26962 | situation (a) | | | 36221 | 36459 | 35973 |
| | | | | | 16558 | 16348 | 16582 | | | |
| | | | | | situation (b) | | | | | |
| | | | | | 14271 | 14329 | 14503 | | | |
| | Directed | 35929 | 36438 | 29828 | situation (a) | | | 36438 | 36116 | 36266 |
| | | | | | 17677 | 17665 | 17968 | | | |
| | | | | | situation (b) | | | | | |
| | | | | | 14524 | 14440 | 14700 | | | |

INTERACTIVE, CONSTRAINT-NETWORK PROGNOSTICS AND DIAGNOSTICS TO CONTROL ERRORS AND CONFLICTS (IPDN)

CROSS-REFERENCE TO RELATED APPLICATION

This application claims priority to and is a continuation of U.S. application Ser. No. 14/685,352, filed Apr. 13, 2015, which is a continuation of U.S. application Ser. No. 13/174,424, filed Jun. 30, 2011, which in turn was a non-provisional of Provisional Application No. 61/359,994, filed Jun. 30, 2010, the entire disclosure of which is incorporated herein by reference.

BACKGROUND OF THE INVENTION

This invention relates to the prediction and detection of conflicts and errors in a collaborative operational environment, and more particularly to improved conflict and error prediction and detection (CEPD) systems and methods employing prognostics and diagnostics.

Error detection is a fundamental challenge in a wide range of enterprises including systems employed in manufacturing, production, supply, and in service industries. It can be critical to the proper operation of distributed systems that require collaboration among multiple participants among whom errors are unavoidable. Extensive research has been devoted to the problem, and yet all known models, methodologies, algorithms, protocols and tools are lacking in one respect or another, and even basic concepts relating to the proper approach for different systems/networks are not well understood.

This patent specification is organized in chapters, two of which (Chapters 1 and 3) include further background information. While some related research and other work are discussed, the work discussed is not necessarily prior art, and the discussion itself does not constitute prior art and is not to be construed as an admission of prior art.

SUMMARY OF THE INVENTION

The present invention provides, as one aspect thereof, a method of preventing and detecting conflicts and errors through prognostics and diagnostics in a system having a plurality of cooperative units each configured to collaborate with other cooperative units. The method comprises modeling the system with a plurality of constraints that must be satisfied by cooperative units, wherein the constraints are indicative of potential conflicts and errors in the system and have relationships indicative of how conflicts and errors propagate between units, and applying conflict and error prevention and detection (CEPD) logic configured to detect conflicts and errors that have occurred, and to identify conflicts and errors before they occur, based on whether the constraints are satisfied or unsatisfied.

The objects and advantages of the present invention will be more apparent upon reading the following detailed description in conjunction with the accompanying drawings.

BRIEF DESCRIPTION OF THE DRAWINGS

FIG. 1 shows the relationship between research questions and problems described herein.

FIG. 2 summarizes three approaches to fault management for process monitoring.

FIG. 3 is an incidence matrix example.

FIG. 4 shows a P/T net example.

FIG. 5 shows the relationship between a reachable marking M and initial marking $M_0$.

FIG. 6 shows an example application of prevention and detection logic for a Co-U/Co-net in accordance with the present invention.

FIG. 7 shows an example of collaboration among Co-Us.

FIG. 8 shows a comparison of object-oriented and agent-oriented P/T nets.

FIG. 9 depicts an example of the P/T Net for CEPD.

FIG. 10 depicts a P/T net example of the centralized CEPD Logic.

FIG. 11 depicts a P/T net example of the decentralized CEPD Logic.

FIG. 12 shows the relationships between constraints in a constraint network.

FIG. 13 shows a diagram of the summary of three types of networks that can be used to model constraint networks of CEPD.

FIG. 14 shows a diagram of the experiment results for verification of the analytical results for three CEPD approaches.

DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Chapter 1. Research Background 1.1. Motivation

Conflict and error prognostics and diagnostics are critical in distributed and decentralized operations where e-Business and e-Commerce activities require collaboration among multiple participants among whom conflicts and errors (CEs) are unavoidable. To prevent, track, detect, trace, diagnose, and resolve CEs are fundamental challenges in collaboration. Various models, methodologies, algorithms, protocols, and tools have been developed to manage CEs.

In previous research, a conflict has been defined as an inconsistency between cooperative units (Co-Us)' goals, dependent tasks, associated activities, or plans of sharing resources (Yang, 2004). According to this definition, a conflict occurs whenever an inconsistency between two or more units in a system occurs. An error has been defined as any input, output, or intermediate result that has occurred in a system and does not meet system specification, expectation, or comparison objective (Klein, 1997). CE detection is most well studied because of its unique importance to collaboration. If CEs in a system are not detected, (1) CEs cannot be diagnosed and resolved; (2) more CEs may occur due to propagation; (3) eventually collaboration among units in the system is damaged.

The prevalent method to detect conflicts has been using layered constraints (Barber et al., 2001; Klein, 1992; Li et al., 2002; Shin et al., 2006). Each unit must satisfy a set of predefined constraints which can be categorized into different layers, e.g., goal layer, plan layer, belief layer, and task layer. Any violation of constraints that involves two or more units is a conflict. Conflict detection has been mostly studied in collaborative design (Ceroni and Velasquez, 2003; Jiang and Nevill Jr, 2002; Lara and Nof, 2003). The ability to detect conflicts in distributed design activities is vital to their success because multiple designers tend to pursue individual (local) goals prior to considering common (global) goals.

Various domain-specific methods have been developed to detect errors. Three basic research questions in CE prognostics and diagnostics have not been well answered, albeit enormous accomplished and ongoing research:

1. What are conflicts and errors? In most research these two terms have been used interchangeably. When they are differentiated, their definition varies according to research context. The detection, diagnostics, or prognostics method for a conflict is often different than that for an error. It is necessary to have two terms to describe two different situations: (1) A constraint is violated by two or more cooperative units; (2) A constraint is violated by a single unit or multiple units that do not cooperate. The clear definition of these two terms is needed for conflict and error prevention and detection (CEPD);
2. What are differences between prevention and detection? To prevent CEs, they must be predicted through prognostics. Detection is the first step of diagnostics. Differences between prevention and detection are not as clear as they seem to be, however, and both concepts are not formally defined. Some CEs may not be preventable or detectable, i.e., it is unknown when and where the CEs (will) occur due to limited resources;
3. What is the influence of CE propagation on prognostics and diagnostics? CEs (1) may be caused by other CEs through propagation, and (2) can propagate and cause more CEs. Both prognostics and diagnostics require the analysis of CE propagation to prevent CEs and identify causes of CEs, respectively. Compared to diagnostics, prognostics was less studied.

In this research, an agent-based modeling approach is explored to formally model a system for CEPD. The CEPD logic is developed based on previous work. The analytical methods and simulation experiments are used to validate the methodology. Four performance measures are defined to evaluate the CEPD logic and compare it with the Traditional CEPD Algorithm. Results show that (1) the agent-based modeling approach is suitable for CEPD in various systems/networks, and (2) the CEPD logic outperforms the Traditional CEPD Algorithm.

1.2. Research Problems and Questions

The purpose of this research is to develop and apply CEPD logic to prevent and detect CEs. The prevention logic is applied to analyze CE propagation to prevent CEs that may occur. The detection logic is applied to analyze CE propagation to identify causes of CEs. A CE can be prevented only if it is prognosed by the prevention logic and there is sufficient time to take prevention actions before it occurs. Three research problems are defined:

Research problem 1: Not all CEs that have occurred in a system are detected.
Research problem 2: Causes of certain CEs are unknown.
Research problem 3: CEs are not prevented through prognostics.

Five research questions are defined to address the three research problems:
1. How to define and differentiate conflicts and errors? CEs must be defined before they can be prevented and detected. It is critical to differentiate between conflicts and errors for error recovery and conflict resolution;
2. How to detect CEs with the detection logic? Assuming the answer to research question 1 is known, there are different ways to detect CEs in a system with multiple units and different types of relationship between the units. This research question is related to research problem 1;
3. How to analyze CE propagation for CE prognostics and diagnostics? CEs detected with the detection logic (a) may be caused by other CEs that have not been detected through propagation; (b) may cause other CEs through propagation. This question can be defined with two sub-questions:
   3.1 How to prognose CEs which are caused by CEs that have already occurred with the prevention logic? CE prognostics is a process to prognose and prevent CEs through analysis of CE propagation;
   3.2 How to detect CEs that cause other CEs to occur with the detection logic? CE diagnostics is a process to identify causes of CEs through analysis of CE propagation;
4. Different CEPD logic may be developed to answer the above three research questions. It is necessary to evaluate different CEPD logic to help understand how well they perform in different systems. This question is related to all three research problems. Specifically, it is important to know:
   4.1 What are appropriate performance measures?
   4.2 Which CEPD logic minimizes CEPD time for a system?
   4.3 How to detect, diagnose, and prognose as many CEs as possible in a system? (The coverage ability of CEPD logic)
   4.4 Which CEPD logic prognoses the maximum number of CEs and minimizes the damage caused by CEs? CEs that occur at t and are detected at $t_1$ ($t \le t_1$) cause damages to a system. CEs that will occur can be prevented if they are prognosed early enough to allow sufficient time for prevention.
5. What is the best CEPD logic for different systems? According to the answers to research question 4, the best logic for different systems needs to be determined. This question is related to all three research problems.

FIG. 1 shows the relationship between the five research questions and three research problems.

1.3. Research Assumptions and Significance

Three basic research assumptions are as follows:
1. A system can be modeled with constraints that determine potential CEs;
2. Relationships between constraints determine how CEs propagate;
3. Prognostics and diagnostics agents (PDAs) can be deployed at each system unit for CEPD.

To prevent and detect CEs in a system can significantly
1. Improve the quality of products. The success of e-Work (Nof, 2003) provides a platform on which products are produced with the highest possible collaboration among distributed agents. The quality or the consistency of products has been greatly improved because of the intensive communication and collaboration through e-Work. CEs still occur and affect collaboration partly because of more and more distributed and decentralized operations.

There has been always a strong motivation to improve the quality of products through CE prognostics and diagnostics;
2. Eliminate waste. There are two types of CEs: (1) CEs need to be resolved and corrected, and (2) CEs are tolerated in a system and do not need to be resolved or corrected. Both types of CEs waste system resources;
3. Improve the productivity and efficiency of e-activities. e-activities performed on the e-Work platform respond to the market quickly, and communicate internally and externally with high efficiency. E-activities usually have high throughput and provide relatively consistent products. The existence of CEs deteriorates the productivity and efficiency by damaging collaboration, slowing down production/service, and causing system breakdowns. To improve the productivity and efficiency becomes more important but difficult because of the highly distributed e-activities and the need of concurrency.

Chapter 2. Research Objectives

2.1. Objectives

The overall goal of this research is to design and develop effective methods to prevent and detect CEs through prognostics and diagnostics. The specific objectives are to:
1. Design a model to analyze systems for CEPD;
2. Design and develop CEPD logic that determines how CEs are prevented and detected;
3. Design and develop measures to compare and evaluate different CEPD approaches in order to identify the optimal approach for a specific system;
4. Validate CEPD logic with analyses and experiments;
5. Develop guidelines of applying CEPD logic to different systems/networks.

2.2. Organization

CHAPTER 3 reviews related work. CHAPTER 4 illustrates the developed methodology. CHAPTER 5 and CHAPTER 6 validate the methodology with analytical tools and simulation experiments, respectively. CHAPTER 7 concludes and summarizes the methodology.

Chapter 3. Review of Related Work

3.1. Error Detection in Assembly and Inspection

As the first step to prevent errors, error detection has gained much attention especially in assembly and inspection. For instance, researchers (Najjari and Steiner, 1997) have studied an integrated sensor-based control system for a flexible assembly cell which includes error detection function. An error knowledge base has been developed to store information about previous errors that had occurred in assembly operations, and corresponding recovery programs which had been used to correct them. The knowledge base provides support to both error detection and recovery. In addition, a similar machine learning approach to error detection and recovery in assembly has been discussed. To realize error recovery, failure diagnostics has been emphasized as a necessary step after the detection and before the recovery. It is noticed that in assembly, error detection and recovery are often integrated.

Automatic inspection has been applied in various manufacturing processes to detect, identify, and isolate errors or defects with computer vision. It is mostly used to detect defects on printed circuit board (Chang et al., 2005; Moganti and Ercal, 1995; Rau and Wu, 2005) and dirt in paper pulps (Calderon-Martinez and Campoy-Cervera, 2006; Duarte et al., 1999). The use of robots has enabled automatic inspection of hazardous materials (e.g., Wilson and Berardo, 1995) and in environments where human operators cannot access, e.g., pipelines (Choi et al., 2006). Automatic inspection has also been adopted to detect errors in many other products such as fuel pellets (Finogenoy et al., 2007), print contents of soft drink cans (Ni, 2004), oranges (Cai et al., 2006), aircraft components (Erne et al., 1999), and micro drills (Huang et al., 2006). The key technologies involved in automatic inspection include but are not limited to computer or machine vision, feature extraction, and pattern recognition (Chen et al., 1999; Godoi et al., 2005; Khan et al., 2005).

3.2. Fault Detection and Diagnostics for Process Monitoring

Process monitoring, or fault detection and diagnostics in industrial systems, has become a new sub-discipline within the broad subject of control and signal processing (Chiang et al., 2001). Four procedures are associated with process monitoring (Raich and Cinar, 1996), although there appears to be no standard terminology for them: (1) Fault detection is a procedure to determine if a fault has occurred; (2) Fault identification is a procedure to identify the observation variables most relevant to diagnosing the fault; (3) Fault diagnostics is a procedure to determine which fault has occurred, or the cause of the observed out-of-control status; (4) Process recovery is a procedure to remove the effect of the fault.

Another term, fault isolation, is also widely used and defined as the procedure to determine the exact location of the fault or faulty component (Gertler, 1998). Fault isolation provides more information than a fault identification procedure in which only the observation variables associated with the fault are determined. Fault isolation does not provide as much information as a fault diagnostics procedure, however, in which the type, magnitude, and time of the fault are determined (Raich and Cinar, 1996). A commonly used term in the literature is FDI (fault detection and isolation), which includes both fault detection and isolation procedures.

Three approaches to manage faults for process monitoring are summarized in FIG. 2. The analytical approach generates features using detailed mathematical models. Faults can be detected and diagnosed by comparing the observed features with the features associated with normal operating conditions directly or after some transformation (Raich and Cinar, 1996). The data-driven approach applies statistical tools on large amount of data obtained from complex systems. The knowledge-based approach uses qualitative models to detect and analyze faults. It is especially suited for systems in which detailed mathematical models are not available. Among these three approaches, the data-driven approach is considered most promising because of its solid theoretical foundation compared to the knowledge-based approach and its ability to deal with large amount data compared to the analytical approach.

The three approaches do not differentiate conflicts from errors. This is because (1) a fault that is detected, identified, or diagnosed may not be the root cause; (2) even if a fault is determined to be the root cause, systems are not modeled in a way to reveal which units and how they have caused the fault, i.e., is the fault a conflict or an error? Differentiating between conflicts and errors is important for error recovery, conflict resolution, and CE diagnostics.

3.3. Fault Diagnostics Algorithms

The three fault management approaches discussed in 3.2 can be classified according to the way that a system is modeled. In analytical approach, quantitative models are used which require the complete specification of system components, state variables, observed variables, and functional relationships among them for the purpose of fault management. The data-driven approach can be considered as the effort to develop qualitative models in which previous and current data obtained from a system are used. Qualitative models usually require less information about a system than quantitative models. The knowledge-based approach uses qualitative models and other types of models. For instance, pattern recognition can use multivariate statistical techniques whereas the signed directed graph is a typical dependence model which represents the cause-effect relationships in the form of a directed graph (Deb et al., 1995).

Similar to algorithms used in quantitative and qualitative models for process monitoring, fault detection and diagnostics algorithms have been developed in other areas. Significant research has been conducted to find optimal and near-optimal test sequences to diagnose faults (Deb et al., 1995; Pattipati and Alexandridis, 1990; Pattipati and Dontamsetty, 1992; Raghavan et al., 1999a, b; Shakeri et al., 1995; Shakeri et al., 2000; Tu et al., 2002; Tu et al., 2003; Tu and Pattipati, 2003). The research started with fault diagnostics in electronic and electromechanical systems with single fault (Pattipati and Alexandridis, 1990). It was assumed that there is at most one fault or faulty state in a system at any time. An X-windows based software tool, TEAMS (Testability Engineering And Maintenance System) was developed for testability analysis of large systems containing as many as 50,000 faults and 45,000 test points (Deb et al., 1995). TEAMS can be used to model individual systems and generate near-optimal diagnostic procedures. The research has been expanded to multiple fault diagnostics (Shakeri et al., 1995; Shakeri et al., 2000; Tu et al., 2002; Tu et al., 2003; Tu and Pattipati, 2003) in various real-world systems including the space shuttle main propulsion system. Test sequencing algorithms with unreliable tests (Raghavan et al., 1999b) and multivalued tests (Tu et al., 2003) have also been studied.

The goal of the test sequencing problem is to design a test algorithm that is able to unambiguously identify the occurrence of any system state (faulty or fault-free state) using the test in the test set and minimize the expected testing cost (Pattipati and Alexandridis, 1990). The test sequencing problem belongs to the general class of binary identification problems. The problem to diagnose single fault is a perfectly observed Markov decision problem (MDP). The solution to the MDP is a deterministic AND/OR binary decision tree with OR nodes labeled by the suspect set of system states and AND nodes denoting tests (decisions). It is well known that the construction of the optimal decision tree is an NP-complete problem (Pattipati and Alexandridis, 1990). The research conducted integrates concepts from information theory and heuristic search to subdue the computational explosion of the optimal test sequencing problem (Pattipati and Alexandridis, 1990).

To diagnose a single fault in a system, the relationship between the faulty states and tests can be modeled by directed graph (DG; digraph model). Once a system is described in a digraph model, the full order dependences among failure states and tests can be captured by a binary test matrix, also called dependency matrix. The single-fault test strategy for a system can be expressed with a AND/OR decision tree.

In complex systems with large numbers of components and/or subsystems, it is possible that multiple faults occur at the same time. It is therefore necessary to construct optimal and near-optimal test sequences for multiple fault diagnostics. The computational complexity of solving the optimal multiple-fault diagnostics problem is super exponential and is much more difficult than the single-fault diagnostics problem (Shakeri et al., 2000). With the assumption that faulty components are replaced by 100% functional components, an extended strategy to diagnose multiple faults can be developed.

Other strategies (Tu and Pattipati, 2003) and algorithms (Tu et al., 2002; Tu et al., 2003) have been developed to diagnose multiple faults using digraph models, DG=(V,E), which are different than those applied in other research. The nodes V represent the set of components or tests, and an edge $(h_i, h_j) \in E$ represents the fault propagation from $h_i$ to $h_j$ (Tu et al., 2003). The dependency matrix is derived from this digraph model. Other researchers have used digraph model to diagnose faults in hypercube microprocessors (Feng et al., 1996). The directed graph is a powerful tool to describe dependences among system components. Several important issues have been brought up in light of the intensive research on test sequencing problem:

1. The order of dependences. The first-order cause-effect dependence between two nodes, i.e., how a faulty node affects another node directly, is the simplest dependence relationship between two nodes. Earlier research did not consider the dependences among nodes (Pattipati and Alexandridis, 1990; Pattipati and Dontamsetty, 1992) and fault propagation was not studied as part of fault diagnostics. In most recent research, different algorithms and test strategies have been developed after considering not only the first-order, but also high-order dependences among nodes (Tu et al., 2002; Tu et al., 2003; Tu and Pattipati, 2003). It is clear that knowledge about dependences among nodes makes difference in fault diagnostics;

2. Types of faults. Faults can be classified into two categories: functional faults and general faults. A component in a complex system may have more than one function. Each function may become faulty. A component therefore may have one or more functional faults, each of which involves only one function of the component. General faults are those that cause faults in all functions of a component. If a component has a general fault, all its functions are faulty. Models that describe only general faults are often called 'worst case' models (Deb et al., 1995) because of their poor diagnosing ability;

3. Fault propagation time. Systems can be classified into two categories: zero-time and nonzero-time systems (Tu et al., 2003). Fault propagation in zero-time systems is instantaneous to an observer whereas it is several orders of magnitude slower in nonzero-time systems than the response time of the observer. Zero-time systems can be abstracted by taking the propagation times to be zero (Tu et al., 2003).

Another interesting aspect of the research on fault diagnostics algorithms is the list of assumptions discussed in several articles:

1. At most one fault state (component) in a system at any time (Pattipati and Alexandridis, 1990). This may be achieved if the system is tested frequently enough (Shakeri et al., 2000);
2. All faults are permanent faults (Pattipati and Alexandridis, 1990);
3. Tests can identify system states unambiguously (Pattipati and Alexandridis, 1990). A faulty state is either identified or not identified. Tests do not give conclusions such as "There is a 60% chance that a faulty state exists."
4. Tests are 100% reliable (Raghavan et al., 1999b; Tu et al., 2003). Both false positive and false negative are zero;
5. Tests do not have common setup operations (Shakeri et al., 2000). This assumption was proposed to simplify the cost comparison among tests;
6. Faults are independent (Shakeri et al., 2000);
7. Failure states that are replaced/repaired are 100% functional (Shakeri et al., 2000);
8. Systems are zero-time systems (Tu et al., 2003).

There is a critical difference between assumptions 3 and 4. Assumption 3 is related to diagnostics ability. When an unambiguous test detects a fault, the conclusion is that the fault has occurred with 100% probability. Nevertheless, this conclusion could be wrong if false positive is not zero according to the test (diagnostics) reliability described in assumption 4. When an unambiguous test does not detect a fault, the conclusion is that the fault has not occurred with 100% probability. Similarly, this conclusion could be wrong if false negative is not zero. Unambiguous tests have better diagnostics ability than ambiguous tests. If a fault has occurred, ambiguous tests conclude that the fault has occurred with a probability less than one. Similarly, if a fault has not occurred, ambiguous tests conclude that the fault has not occurred with a probability less than one. In summary, if assumption 3 is true, a test gives only two results: a fault has occurred or has not occurred, always with 100% probability. If both assumptions 3 and 4 are true, (1) a fault must have occurred if the test concludes that the fault has occurred; (2) a fault must have not occurred if the test concludes that the fault has not occurred.

Both the test sequencing and CE detection problems deal with systems with large amount of components where multiple faults or errors may occur at the same time. The major weakness of fault diagnostics algorithms discussed here is the centralized CE detection and diagnostics approach. When a system is large and complex (various dependences among nodes exist), to develop the optimal test sequence becomes infeasible due to the time it requires. To develop the near-optimal test sequence requires less time but the test sequence increases detection cost. The characteristics of the centralized approach are (1) algorithms and necessary system information are controlled by a central control unit; (2) the fault detection is performed sequentially. An alternative approach is to develop decentralized algorithms that can utilize distributed agents and their effective collaboration to detect and diagnose CEs. System resources are better utilized by allocating detection tasks to distributed agents that execute tasks simultaneously and communicate with each other following protocols.

There are at least two reasons why centralized CE detection and diagnostics are widely applied: (1) traditionally, CEs have been detected only in the output of a system. Decentralized detection is not necessary. Centralized detection is sufficient and subsequent diagnostics follows the same framework; (2) systems are often designed in a way that is difficult for decentralized CE detection and diagnostics. For instance, fault diagnostics algorithms discussed above were first developed to diagnose errors in electronic and electromechanical systems in which PDAs are difficult to apply.

Another drawback of the above fault diagnostics algorithms is the lack of system models. The relationship between nodes and the relationship between faults have not been considered until recently (Tu et al., 2003). Algorithms are expected to perform better if a system is appropriately modeled. The difference may be more apparent for large (many components) and complex (components are dependent on each other) systems than for small (a few components) and simple (components are independent of each other) systems.

3.4. Research on Conflict and Error Prediction and Detection at PRISM Center

A conflict has been defined in previous research (Yang, 2004) as an inconsistency between Co-Us' goals, dependent tasks, associated activities, or plans of sharing resources. A Co-U is an autonomous working unit in a system that performs tasks to achieve its local goals, and coordinates with other Co-Us to accomplish the common goals of a set of Co-Us in the system. An error is always restricted to a local scope (within a Co-U). A conflict and error detection model (CEDM) has been developed to detect CEs in a distributed collaborative environment supported by conflict and error detection protocol (CEDP). The CEDP is invoked when a CE is detected or system (collaboration) specifications are changed. A software agent, conflict and error detection agent (CEDA), is installed in each Co-U of a collaborative network to perform CE detection coordinated by CEDP. CEDAs work together to identify CEs by applying active middleware that supports the CEDP to evaluate the detection process and exchange detection information among Co-Us.

Active middleware was first developed to optimize the performance of e-Work interactions in heterogeneous, autonomous, and distributed environments (Anussornnitisarn, 2003; Nof, 2003). It has been slightly revised and applied to a distributed environment to detect CEs (Yang, 2004). Active middleware is an enabling layer of information and information flow, database, modeling tools, and decision support system, which has inputs from a distributed yet networked environment. A CEDM is the integration of active middleware, CEDP, and CEDAs, and its output is the CEs detected.

An important issue, CE propagation, has been addressed in previous research by applying active middleware and agent technologies (Chen and Nof, 2007; Yang and Nof, 2004a, b; Yang et al., 2005). An error inside a Co-U's boundary might cause a conflict because of task dependence, or common resources sharing between Co-Us. The task dependence can be treated as the interaction between Co-Us when they cooperate to achieve a common goal. If the task dependence becomes complicated, which is often the case in a complex system, CE propagation might occur because of the complex correlation between Co-Us. This kind of propagation is common in a supply network or a design process. If one participant cannot fulfill a task request (service agreement) because of an internal error, this error event will also affect other participants' plan and cause a widespread conflict. Consequently, CEs propagate in the collaboration network and affect more Co-Us if they are not resolved in time, or are incorrectly resolved by a Co-U's local-view solutions. Most recently, research at the PRISM (Production, Robotics, and Integration Software for Manufacturing and Management) Center has focused on fundamental principles to address CE propagation by developing algorithms and protocols (Chen, 2009; Chen and Nof, 2007, 2009, 2010, 2011) based on previous work related to error recovery and conflict resolution (Avila-Soria, 1998; Lara and Nof, 2003; Velasquez et al., 2008).

Two measures, conflict-severity and detect-ability have been defined to evaluate conflict situations and detection abilities respectively (Yang and Nof, 2004a, b). Conflict-severity is a measure of how serious a conflict is and is calculated by summing up all weights of unsatisfied constraints that are the benchmark of conflict detection. The detect-ability is a function of detection accuracy, cost, and time. Both measures provided necessary decision-making information for detection as well as resolution. Moreover, a cost-damage analysis has been applied to determine optimal detection policy. A viability measure has been developed to examine detection policy and evaluate detection performance.

In summary, substantial research on CE detection has been conducted at the PRISM Center. Basic decentralized error prediction and detection algorithms (Chen and Nof, 2007, 2010, 2011) and conflict detection protocols (Yang and Nof, 2004a, b) have been developed. Different detection policies have also been studied. Based on the previous research, the current research aims at developing a general methodology that can be used to model systems and prevent and detect CEs with optimized logic. The new modeling method and CEPD logic are critical to the success of a wide range of enterprises where CEs are unavoidable and must be prevented and detected.

3.5. Petri Nets for CE Detection

3.5.1. Overview of Related Work

Recently, several researchers have applied Petri nets in fault detection and diagnostics (Chung et al., 2003; Georgilakis et al., 2006; Ushio et al., 1998), fault analysis (Rezai et al., 1995a; Rezai et al., 1995b; Rezai et al., 1997), and conflict detection and resolution (Shiau, 2002). Research conducted before 1990 on error detection and recovery using Petri nets has been summarized by two researchers (Zhou and DiCesare, 1993). Petri nets are formal modeling and analysis tool for discrete event or asynchronous systems. For hybrid systems that have both event driven and time driven (synchronous) elements, Petri nets can be extended to global Petri nets to model both discrete time and event elements. Petri nets have also been used in conflict detection and resolution (Shiau, 2002) as the extension of goal structure tree (O'Hare and Jennings, 1996) and the E-PERT (Extended Project Estimation and Review Technique) diagram (Barber et al., 2001).

Research on fault detection and diagnostics with Petri nets was conducted in the context of fault diagnostics in discrete event systems (Sampath et al., 1995; Zad et al., 2003). Using finite state machine (FSM), researchers defined the notion of diagnosability and provided a construction procedure for the diagnoser that can detect faults in diagnosable systems (Sampath et al., 1995). To detect and diagnose faults with Petri nets, some of the places in a Petri net are assumed observable and others are not. All transitions in the Petri net are also unobservable. Unobservable places, i.e., faults, indicate that the numbers of tokens in those places are not observable, whereas unobservable transitions indicate that their occurrences cannot be observed (Chung et al., 2003; Ushio et al., 1998). The objective of the detection and diagnostics is to identify the occurrence and type of a fault based on observable places within finite steps of observation after the occurrence of the fault. To detect and diagnose faults with Petri nets, system modeling is complex and time-consuming because faulty transitions and places must be included in a model. Research on this subject has been mainly the extension of previous work using FSM and gained limited progress.

Conflicts can be categorized into three classes (Barber et al., 2001): goal conflicts, plan conflicts, and belief conflicts. Goal conflicts are modeled with intended goal structure (Barber et al., 2001) which is extended from goal structure tree (O'Hare and Jennings, 1996). Plan conflicts are modeled with E-PERT diagram. Three classes of conflicts are modeled by Petri nets with the help of four basic modules (Zhou et al., 1992), i.e., sequence, parallel, decision, and decision-free, to detect conflicts in a multi-agent system. Each agent's goal and plan are modeled by separate Petri nets (Shiau, 2002), and many Petri nets are integrated using a bottom-up approach (Zhou and DiCesare, 1993; Zhou et al., 1992) with three types of operations (Shiau, 2002): AND, OR, and Precedence. The synthesized Petri net is analyzed to detect conflicts.

The Petri net based approach for conflict detection developed so far has been rather limited. The approach emphasized more on the modeling of a system and its agents than on the analysis process through which conflicts are detected. The Petri net model that has been applied is indeed a goal-based or plan-based approach, not an agent-based approach. With the agent-based approach, an agent is modeled only once. In other approaches including the Petri net based approach for conflict detection, an agent is modeled multiple times due to multiple goals, plans, or tasks the agent has. Also, the Petri net based approach is a static rather than a dynamic approach in which multiple resources of each type, different plans according to token attributes, and time for transitions must be considered and studied.

Research has also been conducted to diagnose faults in discrete event systems with decentralized approach (Wenbin and Kumar, 2006). Distributed diagnostics can be performed by either diagnosers communicating with each other directly or through a coordinator. Alternatively, diagnostics decisions can be made completely locally without combining the information gathered (Wenbin and Kumar, 2006).

To summarize, Petri nets have been applied to fault and conflict detection in different ways. To detect and diagnose faults, both normal and faulty transitions and places are modeled with Petri nets and detection and diagnostics are executed by utilizing information from observable places. For conflict detection and resolution, only normal transitions and places are modeled. The prevention and prognostics of conflicts and errors have not been addressed with Petri nets and there has been no available approach that can detect both conflicts and errors. The analysis of Petri nets is difficult and has not been well studied, especially for multiple attributes in discrete event systems. The preliminary studies on distributed detection and diagnostics of faults and the use of agent technology for conflict detection are interesting and in line with current research.

3.5.2. Basic P/T Net Knowledge for CEPD

Place/transition (P/T) nets, or Petri nets, have been intensively studied as one of formal methods for verifying the correctness of systems since they were originally introduced by Dr. Petri in 1962. Systems are described as mathematical objects in formal methods which can handle characteristics such as non-determinism and concurrency of a system where CEs are difficult to prevent and detect. Eq. 3.1 defines a P/T net as a tuple:

$$N = \langle P, T, F, W, M_0 \rangle \quad \text{Eq. 3.1}$$

P is a finite set of places and T is a finite set of transitions. The places P and transitions T are disjoint (P∩T=φ). F⊆(P× T)∪(T×P) is the flow relation. W:((P×T)∪(T×P))→N is the arc weight mapping. W(f)=0 for all f∉F, and W(f)>0 for all f∈F. $M_0$: P→N is the initial marking representing the initial distribution of tokens.

To define firing condition and firing rule of the P/T net, four basic concepts are introduced: (1) If ⟨p,tr⟩∈F for a transition tr and a place p, then p is an input place of tr; (2) If ⟨tr, p⟩∈F for a transition tr and a place p, then p is an output place of tr; (3) Let α∈P∪T. The set •α={α'|⟨α',α⟩∈F} is called the pre-set of α, and the set α•={α'|⟨α,α'⟩∈F} is the post-set of α; (4) M(p) denotes the number of tokens in place p in marking M. The firing condition is defined as:

Transition tr∈T is M—enabled (or enabled in M), written as $$M \xrightarrow{tr},$$

iff Eq. 3.2 is met:

$$M(p) \geq W(p, tr), \forall p \in \bullet tr \quad \text{Eq. 3.2}$$

An M—enabled transition tr may fire, producing the successor marking M', written as $$M \xrightarrow{tr} M'.$$

Eq. 3.3 defines the firing rule:

$$M'(p) = M(p) - W(p, tr) + W(tr, p), \forall p \in P \quad \text{Eq. 3.3}$$

Depending on whether CE states (states that represent conflicts and errors) are modeled with P/T nets, there are two different ways for CEPD. If CE states (places) are not modeled with P/T nets, the prevention and detection process needs to check if all normal states (states without CEs) in a P/T net can be reached. A CE is detected, diagnosed, or prognosed if a normal state cannot be reached. If CE states are modeled with P/T nets, the prevention and detection process is aimed at (1) detecting, diagnosing, and prognosing CE states that may be reached; (2) checking if all normal states can be reached. A CE is detected, diagnosed, or prognosed if a CE state is reached or a normal state cannot be reached. The basic task of CEPD process with P/T nets is to determine if certain states can be reached.

A P/T net that includes CE states is often used to detect CEs dynamically. CEs are detected on the fly while the system being monitored is executing various tasks. In most cases, the CE detection process only determines if any CE state is reached and does not consider normal states. The main disadvantage of this approach is the difficulty to include all possible CE states of a system in a P/T net. If a CE state is not modeled with the P/T net, this CE cannot be detected.

On the other hand, a P/T net that includes only normal states is often used to predict CEs statically. CEs are predicted by checking if all normal states can be reached before a system starts executing tasks. This approach can be challenging in terms of the time and cost required when a P/T net includes a large amount of transitions and states. It is sometimes used to detect CEs dynamically. In that case a time stamp is associated with each state and CEs are detected when a state is not reached by the time specified by the time stamp. Both approaches are similar when they are used to detect CEs dynamically.

Several techniques are used to determine if a state can be reached in a P/T net, including reachability graph, coverability graph, and structural analysis. A reachability graph may include infinite number of reachable states if it is not a k-safe net (k≥0 is some constant and an integer) in which no reachable marking contains more than k tokens in any place. The CEPD process will not terminate if a P/T net is not k-safe. Even if a P/T net is k-safe, there can be as many as $(k+1)^{|P|}$ reachable markings (|P| is the total number of places in the net). On the other hand, coverability graphs do not provide accurate information about reachable states. Structural analysis is therefore preferred because it can prove some properties without constructing the graph. Specifically, it is motivated to use place invariants for CEPD.

Let $N = \langle P, T, F, W, M_0 \rangle$ be a P/T net. The corresponding incidence matrix C: P×T→Z is the matrix whose rows correspond to places and whose columns correspond to transitions. Column tr∈T denotes how the firing of tr affects the marking of the net: C(tr,p)=W(tr,p)−W(p,tr). FIG. 3 shows an example of incidence matrix corresponding to the P/T net shown in FIG. 4 (circles represent states/places and boxes represent transitions; black dots signify tokens).

Markings of a P/T net can be written as column vectors, e.g., the initial marking of the P/T net in FIG. 4 is $M_0 = (1\ 0\ 0\ 1\ 1\ 0\ 0)^T$. Likewise, firing counts can be written as column vectors with one entry for each transition. For instance, if each of the transitions $tr_1$, $tr_2$, and $tr_4$ in FIG. 4 fires once, the firing counts are expressed as $u = (1\ 1\ 0\ 1\ 0\ 0)^T$. Let M be the new marking after firing these transitions, M=$M_0$+C•u as shown in FIG. 5 where C is the incidence matrix described in FIG. 3.

For a P/T net N with incidence matrix C, a solution of the equation $C^T x = 0$ such that x≠0 is called a place invariant, or P-invariant of N. P-invariant is a vector with one entry for each place. For instance, $x_1 = (1\ 1\ 1\ 0\ 0\ 0\ 0)^T$, $x_2 = (0\ 0\ 1\ 1\ 0\ 0\ 1)^T$, and $x_3 = (0\ 0\ 0\ 0\ 1\ 1\ 1)^T$ are all P-invariants for the P/T net shown in FIG. 4. Let M be a reachable marking of N. Because M=$M_0$+C•u, Eq. 3.4 holds for any P-invariant x of N:

$$M^T x = (M_0 + Cu)^T x = M_0^T x + (Cu)^T x = M_0^T x + u^T C^T x = M_0^T x \quad \text{Eq. 3.4}$$

P-invariants therefore can be used to determine if certain states in a P/T net cannot be reached. For instance, P-invariant x, indicates that all reachable markings M must satisfy Eq. 3.5:

$$M(p_3) + M(p_4) + M(p_7) = M_0(p_3) + M_0(p_4) + M_0(p_7) = 1 \quad \text{Eq. 3.5}$$

P-invariants cannot be used to determine if certain states in a P/T can be reached. This implies that for a P-invariant x if a marking M is identified such that $M^T x = M_0^T x$, it cannot be concluded that marking M is reachable. Moreover, it can be difficult to determine the marking of all states when a P/T net includes many states and transitions.

3.6. Summary of Related Work

Table 3.1 summarizes seven CEPD methods. Three important findings are:
1. Five out of seven CEPD methods are centralized methods which are difficult to implement when (1) there are a large number of components in a system and (2) many components collaborate with each other;

2. Six out of seven CEPD methods can prevent CEs. Among them, only two methods, CEDM and detection algorithms, have prognostics ability. A system that has prognostics ability can prevent CEs that have not occurred according to their relationships with CEs that have been detected or diagnosed;
3. Two out of seven CEPD methods can detect conflicts. The other five methods do not differentiate between conflicts and errors. The main purpose to differentiate between conflicts and errors is to identify which components are involved in a CE and how they are involved. This information provides guidance for error recovery and conflict resolution, and helps CE diagnostics and prognostics as CEs are related to each other through the same Co-U(s).

TABLE 3.1

Summary of CEPD Methods

| | Conflict and error prevention and detection method | | | | | | |
|---|---|---|---|---|---|---|---|
| | Analytical | Data-driven | Knowledge-based | Diagnostics algorithms | CEDM | Detection algorithms | Petri net |
| Bibliography | Raich and Cinar, 1996; Gertler, 1998; Chiang et al., 2001 | | | * | Yang and Nof, 2004a, b; (Yang et al., 2005) | Chen and Nof, 2007 | ** |
| Error detection | Yes | Yes | Yes | Yes | Yes | Yes | Yes |
| Conflict detection | No | No | No | No | Yes | No | Yes |
| Diagnostics | No | No | Yes | No | Yes | Yes | No |
| Prevention | Yes | Yes | Yes | No | Yes | Yes | Yes |
| Centralized/Decentralized | Centralized | Centralized | Centralized | Centralized | Decentralized | Decentralized | Centralized |
| Main advantage | Accurate and reliable | Can process large amount of data | Do not require detailed system information | Accurate and reliable | Short detection and prediction time | Accurate and reliable | Formal method applicable to various systems |
| Main disadvantage | Require mathematical models that are often not available | Rely on the quantity, quality, and timeliness of data | Results are subjective and may not be reliable | Time-consuming for large systems | Need further development and validation | Limited to sequential production/service lines | State explosion for large systems |

\* Pattipati and Alexandridis, 1990; Pattipati and Dontamsetty, 1992; Deb et al., 1995; Shakeri et al., 1995; Raghavan et al., 1999a, b; Shakeri et al., 2000; Tu et al., 2002; Tu et al., 2003; Tu and Pattipati, 2003
\*\* Zhou and DiCesare, 1993; Rezai et al., 1995a; Rezai et al., 1995b; Rezai et al., 1997; Ushio et al., 1998; Barber at al., 2001; Shiau, 2002; Chung et al., 2003; Georgilakis et al., 2006

In summary, the analytical, data-driven, and knowledge-based CEPD methods are domain-specific methods. They can be applied to a limited number of systems. The other two centralized methods, diagnostics algorithms and Petri net, are generic methods but do not consider relationships between CEs and cannot prognose or diagnose CEs. The current research aims at developing both the Centralized CEPD Logic and Decentralized CEPD Logic with the consideration of relationships between system components and between CEs for prognostics and diagnostics.

The Centralized CEPD Logic is developed based on five centralized CEPD methods. The Decentralized CEPD Logic is developed based on CEDM and detection algorithms described in Table 3.1. The CEDM requires further development to model relationships between CEs and identify best CEPD logic. The detection algorithms are limited to sequential production/service lines. The review of related work also provides foundation for system modeling and visualization of the CEPD logic.

Chapter 4. Methodology

4.1. Research Definitions

To clearly model a system, five basic concepts are defined:

Definition 1: Co-U. A cooperative unit, Co-U, is an autonomous working unit in a system that performs tasks to achieve its local goals, and collaborate with other Co-Us to accomplish the common goals of a set of Co-Us in the system. A Co-U can be defined with Eq. 4.1:

$$u(i,t) = \{\pi(i,t), \vartheta(i,t)\} \qquad \text{Eq. 4.1}$$

$u(i,t)$ is Co-U i in the system at time t. i is the index of Co-Us and is a nonnegative integer. The value of i is unique for each Co-U. $\pi(i,t)$ is a set of constraint(s) in the system at time t that needs to be satisfied by Co-U i without collaborating with other Co-Us. Let $con(r,t)$ denote constraint r in the system at time t. r is a nonnegative integer and the index of constraints. The value of r is unique for each constraint. $\pi(i,t)$ is a set of constraints $(con(r_1,t), con(r_2,t), \ldots)$ that needs to be satisfied by $u(i,t)$ without collaboration. $\vartheta(i,t)$ is Co-U i state at time t that describes what has occurred with Co-U i by time t. It includes necessary and sufficient information to determine whether or not constraints in $\pi(i,t)$ are satisfied. Suppose $\pi(i_1,t)$ is the constraint set for $u(i_1,t)$ and $\pi(i_2,t)$ is the constraint set for $u(i_2,t)$ $(i_1 \neq i_2)$, any constraint $con(r_1,t) \in \pi(i_1,t)$ and $con(r_2,t) \in \pi(i_2,t)$ are different, i.e., $con(r_1,t) \neq con(r_2,t)$.

Definition 2: Co-net. A Co-net is a coordination network that enables cooperation, collaboration, and coordination among a group of Co-Us in a system. A Co-net r is defined with Eq. 4.2:

$$n(r,t) = \{\Omega(r,t), con(r,t), \theta(r,t)\} \qquad \text{Eq. 4.2}$$

$n(r,t)$ is Co-net r in a system at time t, r is the index of Co-nets and r is a nonnegative integer. The value of r is unique for each Co-net. Note that r is the index of both Co-nets and constraints. $\Omega(r,t)$ is a set of Co-Us in $n(r,t)$ that must collaborate to satisfy con(r,t). Let $N(\Omega(r,t))$ denote the number of Co-Us in Co-net r at time t. $N(\Omega(r,t))$ is a positive integer and $N(\Omega(r,t)) \geq 2$. $\theta(r,t)$ is Co-net r state at time t that describes what has occurred with Co-net r by time t. $\theta(r,t)$ includes necessary and sufficient information to determine whether or not con(r,t) is satisfied.

Constraints and Co-nets have one-to-one relationship. Each constraint can have one and only one corresponding Co-net. Each Co-net satisfies one and only one constraint. If a constraint does not have any corresponding Co-net, it indicates collaboration among Co-Us is not required to satisfy the constraint. Any Co-net must include two or more Co-Us ($N(\Omega(r,t)) \geq 2$). Each Co-net con(r,t) is unique in a system at t and is identified by r. Two Co-nets $r_1$ and $r_2$ ($r_1 \neq r_2$) may include the same set of Co-Us ($\Omega(r_1,t) = \Omega(r_2,t)$), and are still different Co-nets because any two constraints in a system are different at t (con($r_1$,t) $\neq$ con($r_2$,t)).

Definition 3: Conflict/Error (CE); Definition 4: Error; Definition 5: Conflict. Let $$\xrightarrow{Satisfy} \text{ and } \xrightarrow[Dissatisfy]{}$$

denote that Co-Us/Co-nets satisfy and dissatisfy constraints, respectively. Let CE(r,t) represent any CE. Eq. 4.3 defines a CE:

$$\exists CE(r,t), \text{iff con}(r,t) \text{ is not satisfied}, \forall r,t \qquad \text{Eq. 4.3}$$

Let E(u(r,i,t)) and C(n(r,t)) represent an error and a conflict, respectively. Eq. 4.4 defines an error and Eq. 4.5 defines a conflict.

$$\exists E(u(r,i,t)), \text{iff } \vartheta(i,t) \xrightarrow[Dissatisfy]{} con(r,t), \qquad \text{Eq. 4.4}$$

$$con(r,t) \in \pi(i,t), \forall r,i,t$$

$$\exists C(n(r,t)), \text{iff } \theta(r,t) \xrightarrow[Dissatisfy]{} con(r,t), \forall r,t \qquad \text{Eq. 4.5}$$

The purpose of this research is to develop and apply CEPD logic for Co-nets and Co-Us in a system (FIG. 6). There are 16 possible states in which a CE is either detected (two states), not detected (two states), prognosed (two states), not prognosed (two states), identified as the cause of another CE (four states), or not identified as the cause of another CE (four states).

State 1: An error has been detected at t (Eq. 4.6). $t_1 \leq t_2 \leq t$ implies $t_1$ is before or at $t_2$, and $t_2$ is before or at t. r, i, and $t_1$ are known at t since $t_2 \leq t$.

$$\exists E(u(r,i,t_1)), \text{ such that } r, i, \text{ and } t_1 \text{ are known at time } t_2, \forall r,i,t_1,t_2,t,t_1 \leq t_2 \leq t \qquad \text{Eq. 4.6}$$

State 2: An error has not been detected at t (Eq. 4.7). $t_1 \leq t \leq t_2$ implies $t_1$ is before or at t, and t is before or at $t_2$. At lease one of r, i, and $t_1$ is unknown at t because $t \leq t_2$.

$$\exists E(u(r,i,t_1)), \text{ such that at least one of } r \cup i \cup t_1 \text{ is unknown at time } t_2, \forall r,i, t_1,t_2,t,t_1 \leq t \leq t_2 \qquad \text{Eq. 4.7}$$

State 3: A conflict has been detected at t (Eq. 4.8).

$$\exists C(n(r,t_1)), \text{ such that } r \text{ and } t_1 \text{ are known at time } t_2, \forall r,t_1,t_2,t,t_1 \leq t_2 \leq t \qquad \text{Eq. 4.8}$$

State 4: A conflict has not been detected at t (Eq. 4.9).

$$\exists C(n(r,t_1)), \text{ such that at least one of } r \cup t_1 \text{ is unknown at time } t_2, \forall r,t_1,t_2,t,t_1 \leq t \leq t_2 \qquad \text{Eq. 4.9}$$

State 5: An error has been prognosed at t (Eq. 4.10). $t_1 > t \geq t_2$ implies $t_1$ is after t, and t is after or at $t_2$. r, i, and $t_1$ are known at t because $t \geq t_2$.

$$\exists E(u(r,i,t_1)), \text{ such that } r, i \text{ and } t_1 \text{ are known at time } t_2, \forall r,i,t_1,t_2,t,t_1 > t \geq t_2 \qquad \text{Eq. 4.10}$$

State 6: An error has not been prognosed at t (Eq. 4.11). $t_1 > t_2 \geq t$ implies $t_1$ is after $t_2$, and $t_2$ is after or at t. At lease one of r, i, and $t_1$ is unknown at t because $t_2 \geq t$.

$$\exists E(u(r,i,t_1)), \text{ such that at least one of } r \cup i \cup t_1 \text{ is unknown at time } t_2, \forall r,i,t_1,t_2,t,t_1 > t_2 \geq t \qquad \text{Eq. 4.11}$$

State 7: A conflict has been prognosed at t (Eq. 4.12).

$$\exists C(n(r,t_1)), \text{ such that } r \text{ and } t_1 \text{ are known at time } t_2, \forall r,t_1,t_2,t,t_1 > t \geq t_2 \qquad \text{Eq. 4.12}$$

State 8: A conflict has not been prognosed at t (Eq. 4.13).

$$\exists C(n(r,t_1)), \text{ such that at least one of } r \cup t_1 \text{ is unknown at time } t_2, \forall r,t_1,t_2,t,t_1 > t_2 \geq t \qquad \text{Eq. 4.13}$$

State 9: An error has been detected at t as the cause of another error (Eq. 4.14). The CE on the left side of the symbol $$\xrightarrow{Cause}$$

is the cause of the CE on the right side of the symbol. For instance, if $E(u(r_1,i_1,t_1))$ causes $E(u(r_2,i_2,t_2))$ directly or indirectly, $E(u(r_1,i_1,t_1))$ is the cause of $E(u(r_2,i_2,t_2))$ and this relationship is expressed as $$E(u(r_1, i_1, t_1)) \xrightarrow{Cause} E(u(r_2, i_2, t_2)).$$

$$\exists E(u(r_1, i_1, t_1)), E(u(r_2, i_2, t_2)), \text{ such that} \qquad \text{Eq. 4.14}$$

$$E(u(r_1, i_1, t_1)) \xrightarrow{Cause} E(u(r_2, i_2, t_2)) \cap r_1, i_1, t_1, r_2, i_2,$$

and $t_2$ are known at time $t_3 \cap E(u(r_1, i_1, t_1)) \xrightarrow{Cause}$ $E(u(r_2, i_2, t_2))$ is known at time $t_3$, $\forall r_1, i_1, t_1, r_2, i_2, t_2, t_3, t, t_1 \leq t_2 \leq t_3 \leq t,$ $r_1 \neq r_2$ if $i_1 = i_2 \cap t_1 = t_2$ State 10: An error has not been detected at t as the cause of another error (Eq. 4.15).

$$\exists E(u(r_1, i_1, t_1)), E(u(r_2, i_2, t_2)), \text{ such that} \qquad \text{Eq. 4.15}$$

$$E(u(r_1, i_1, t_1)) \xrightarrow{Cause} E(u(r_2, i_2, t_2)) \cap r_2, i_2, \text{ and}$$

$t_2$ are known at time $t_3 \cap$ $\left( \begin{array}{l} \text{at least one of } r_1 \cup i_1 \cup t_1 \text{ is unknown at time } t_3 \cup \\ E(u(r_1, i_1, t_1)) \xrightarrow{Cause} E(u(r_2, i_2, t_2)) \text{ is known at time } t_3 \end{array} \right),$ $\forall r_1, i_1, t_1, r_2, i_2, t_2, t_3, t, t_1 \leq t_2 \leq t_3 \leq t,$ $r_1 \neq r_2$ if $i_1 = i_2 \cap t_1 = t_2$ State 11: An error has been detected at t as the cause of a conflict (Eq. 4.16).

$\exists E(u(r_1, i, t_1)), C(n(r_2, t_2))$, such that  Eq. 4.16

$E(u(r_1, i, t_1)) \xrightarrow{Cause} C(n(r_2, t_2)) \cap r_1, i, t_1, r_2$, and $t_2$ are known at time $t_3 \cap E(u(r_1, i, t_1)) \xrightarrow{Cause}$ $C(n(r_2, t_2))$ is known at time $t_3$, $\forall r_1, i, t_1, r_2, t_2, t_3, t, t_1 \le t_2 \le t_3 \le t$ State 12: An error has not been detected at t as the cause of a conflict (Eq. 4.17).

$\exists E(u(r_1, i, t_1)), C(n(r_2, t_2))$, such that  Eq. 4.17

$E(u(r_1, i, t_1)) \xrightarrow{Cause} C(n(r_2, t_2)) \cap r_2$ and $t_2$ are known at time $t_3 \cap$ $\left( \begin{array}{l} \text{at least one of } r_1 \cup i \cup t_1 \text{ is unknown at time } t_3 \cup \\ E(u(r_1, i, t_1)) \xrightarrow{Cause} C(n(r_2, t_2)) \text{ is known at time } t_3 \end{array} \right)$, $\forall r_1, i, t_1, r_2, t_2, t_3, t, t_1 \le t_2 \le t_3 \le t$ State 13: A conflict has been detected at t as the cause of an error (Eq. 4.18).

$\exists C(n(r_1, t_1)), E(u(r_2, i, t_2))$, such that  Eq. 4.18

$C(n(r_1, t_1)) \xrightarrow{Cause} E(u(r_2, i, t_2)) \cap r_1, t_1, r_2, i$, and $t_2$ are known at time $t_3 \cap C(n(r_1, t_1)) \xrightarrow{Cause}$ $E(u(r_2, i, t_2))$ is known at time $t_3$, $\forall r_1, t_1, r_2, i, t_2, t_3, t, t_1 \le t_2 \le t_3 \le t$ State 14: A conflict has not been detected at t as the cause of an error (Eq. 4.19).

$\exists C(n(r_1, t_1)), E(u(r_2, i, t_2))$, such that  Eq. 4.19

$C(n(r_1, t_1)) \xrightarrow{Cause} E(u(r_2, i, t_2)) \cap r_2, i$, and $t_2$ are known at time $t_3 \cap$ $\left( \begin{array}{l} \text{at least one of } r_1 \cup t_1 \text{ is unknown at time } t_3 \cup \\ C(n(r_1, t_1)) \xrightarrow{Cause} E(u(r_2, i, t_2)) \text{ is unknown at time } t_3 \end{array} \right)$, $\forall r_1, t_1, r_2, i, t_2, t_3, t, t_1 \le t_2 \le t_3 \le t$ State 15: A conflict has been detected at t as the cause of another conflict (Eq. 4.20).

$\exists C(n(r_1, t_1)), C(n(r_2, t_2))$, such that  Eq. 4.20

$C(n(r_1, t_1)) \xrightarrow{Cause} C(n(r_2, t_2)) \cap r_1, t_1, r_2$, and $t_2$ are known at time $t_3 \cap C(n(r_1, t_1)) \xrightarrow{Cause}$ $C(n(r_2, t_2))$ is known at time $t_3$, $\forall r_1, t_1, r_2, t_2, t_3, t, t_1 \le t_2 \le t_3 \le t, r_1 \ne r_2$ if $t_1 = t_2$ State 16: A conflict has not been detected at t as the cause of another conflict (Eq. 4.21).

$\exists C(n(r_1, t_1)), C(n(r_2, t_2))$, such that  Eq. 4.21

$C(n(r_1, t_1)) \xrightarrow{Cause} C(n(r_2, t_2)) \cap r_2$ and $t_2$ are known at time $t_3 \cap$ $\left( \begin{array}{l} \text{at least one of } r_1 \cup t_1 \text{ is unknown at time } t_3 \cup \\ C(n(r_1, t_1)) \xrightarrow{Cause} C(n(r_2, t_2)) \text{ is unknown at time } t_3 \end{array} \right)$, $\forall r_1, t_1, r_2, t_2, t_3, t, t_1 \le t_2 \le t_3 \le t, r_1 \ne r_2$ if $t_1 = t_2$

4.2. Collaboration Among Co-Us

To prevent and detect CEs in a system, it is important to understand system topologies and task dependences (Chen and Nof, 2007). Tasks are products and services requested by customers. A system is task-driven and must complete tasks through networks of Co-Us. A task may be divided into subtasks. Each subtask may be further divided into several other subtasks. A Co-U that is needed to complete a task is assigned one or more subtasks. Task dependences are ways of collaboration among Co-Us. FIG. 7 shows an example of 23 Co-Us that are networked together according to task dependences to complete a task requested by customer(s).

A task T is requested by customer(s). In total, 23 Co-Us work collaboratively to complete this task. Six types of collaboration are defined:

1. Collaborate to Provide (CP). Co-Us collaborate to provide products/services to other Co-Us. For instance, u(4,t) and u(11,t) collaborate to provide products/services to u(17,t) and u(22,i); u(1,t), u(17,t), and u(22,t) collaborate to provide products/services to u(17,t) and u(20,t). A pair of parenthesis with a superscript 'P' denote this type of collaboration. The two examples can be expressed as $(u(4,t),u(11,t))$ and $(u(1,t),u(17,t),u(22,t))^P$;

2. Collaborate to Receive (CR). Co-Us collaborate to receive products/services from other Co-Us. For instance, u(17,t) and tu(22,t) collaborate to receive products/services from u(4,t) and u(11,t); u(5,t) and u(22,t) collaborate to receive products/services from u(19,t). Similarly, a pair of parenthesis with a superscript 'R' denote this type of collaboration. The two examples given can be expressed as $(u(17,t),u(22,t))^R$ and $(u(5,t),u(22,t))^R$;

3. One-to-One (OO) dependence. If one Co-U provides products/services to the other Co-U, the type of collaboration between the two Co-Us is OO. For instance, the task dependence between u(13,t) and u(20,t) in FIG. 7 is OO; u(13,t) provides products/services to u(20,t) and u(20,t) is dependent on u(13,t) to complete its tasks. Two Co-Us may have two-way OO dependences, e.g., task dependences between u(6,t) and u(16,t). They provide products/services to each other;

4. Many-to-One (MO) dependence. If Co-Us collaborate to provide products/services to the other Co-U, the collaboration between Co-Us that provide products/services and the Co-U that receives products/services is MO. Three examples are: (1) two Co-Us together provide 100 products every hour to the third Co-U; (2) three Co-Us, Co-U 1, Co-U 2, and Co-U 3, need to provide products A, B, and C, respectively, to the fourth Co-U at the same speed; (3) two Co-Us provide continuous services, e.g., electricity and water, respectively, to the third Co-U to complete a task. As an example in FIG. 7, u(1,t), u(17,t), and u(22,t) collaborate to provide products/services to u(20,t);

5. One-to-Many (OM) dependence. If Co-Us collaborate to receive products/services from the other Co-U, the collaboration between the Co-U that provides products/services, and Co-Us that receive products/services is OM. For instance, a Co-U provides products/services to two other Co-Us at the same speed, the collaboration between the first Co-U and two other Co-Us is OM because the two Co-Us that receive products/services must coordinate to maintain the same supply speed. There are two OM collaboration examples in FIG. 7, e.g., the collaboration between $u(18,t)$ and $(u(12,t),u(15,t))^R$. The collaboration between a group of collaborative Co-Us and a single Co-U is either MO or OM;

6. Many-to-Many (MM) dependence. If a group of Co-Us collaborate to provide products/services to the other group of Co-Us which also collaborate to receive the products/services, the collaboration between Co-Us from different groups is MM. For instance, three Co-Us collaborate to provide the same amount of products to two other Co-Us. FIG. 7 shows a example between $(u(4,t),u(11,t))^P$ and $(u(17,t),u(22,t))^R$.

The six types of collaboration are defined in terms of the need of collaboration and work flow. They can also be categorized according to the order of collaboration, i.e., first-order collaboration and high-order collaboration. First-order collaboration exists between two Co-Us if one of two conditions is met: (1) the two Co-Us collaborate to provide or receive products/services; (2) one of the two Co-Us directly provides products/services to the other Co-U. The six types of collaboration defined in FIG. 7 is first-order collaboration. Let '↦' denote the four types of collaboration (OO, MO, OM, and MM). For instance, $U(i_1,t) \mapsto U(i_2,t)$ indicates that $U(i_1,t)$ provides products/services to $U(i_2,t)$.

High-order collaboration exists between two Co-Us if one of them indirectly provides products/services to the other. Both first-order and high-order collaboration may exist between two Co-Us at the same time. First-order collaboration is most concerned in CEPD and high-order collaboration is always analyzed through first-order collaboration. In the rest of this dissertation, the term 'collaboration' is used to refer to first-order collaboration unless otherwise specified. With the above definitions, the six types of collaboration can be described mathematically. Some examples in FIG. 7 described earlier are:

1. CP: $(u(4,t),u(11,t))^P$, $(u(1,t),u(17,t),u(22,t))^P$;
2. CR: $(u(17,t),u(22,t))^R,(u(5,r),u(22,t))^R$;
3. OO: $u(13,t) \mapsto u(20,t)$, $u(6,t) \mapsto u(16,t)$, and $u(16,t) \mapsto u(6,t)$;
4. MO: $(u(1,t),u(17,t),u(22,t))^P \mapsto u(20,t)$;
5. OM: $u(18,t) \mapsto (u(12,t),u(15,t))^R$;
6. MM: $(u(4,t),u(11,t))^P \mapsto (u(17,t),u(22,t))^R$.

When two Co-Us do not collaborate, they are task independent (TI). There are total seven types of relationships among Co-Us: TI, CP, CR, OO, MO, OM, and MM. The TI and any of the other six types of collaboration are mutually exclusive. The six types of collaboration are not mutually exclusive. CP is implied if MO or MM exists. CR is implied if OM or MM exists. OO is implied if any of MO, OM, and MM exists. Both MO and OM are implied if MM exists. MO and OM are mutually exclusive.

4.3. Modeling of Constraints

Constraints defined in Section 4.1 can be divided into two categories (Table 4.1): capability constraints and task constraints. A task constraint determines what products/services Co-U(s) needs to provide to the other Co-U(s). A capability constraint determines conditions a Co-U or a Co-net must meet.

TABLE 4.1

Constraint Examples

| I Constraint | II Requirement | III Provider | IV Receiver | V Type |
|---|---|---|---|---|
| con(3, 10) | Two units of part A | u(6, 10) | u(11, 10) | Task |
| con(4, 11) | Air pressure between $2 \times 10^5$ and $3 \times 10^5$ Pascals | u(6, 11) | u(21, 11), u(1, 11), u(7, 11) | Task |
| con(2, 7) | Temperature is below 101 F. ° | u(8, 7) | Not applicable | Capability |
| con(6, 7) | Temperature is below 101 F. ° | u(11, 7) | Not applicable | Capability |
| con(100, 20) | 250 cars | u(49, 20), u(38, 20), u(77, 20) | u(33, 20), u(34, 20) | Task |
| con(4, t) | Expense is less than $2 million | u(7, t), u(11, t) | Not applicable | Capability |

Each constraint consists of three parts:
1. Column II—Requirement: A task that must be provided from one Co-U or a group of Co-Us to the other Co-U or group of Co-Us in the task constraint; or a condition that must be satisfied by a Co-U in the capability constraint;
2. Column III—Provider: One Co-U or a group of Co-Us that provides the task in the task constraint; or a Co-U/Co-net that needs to meet the condition in the capability constraint;
3. Column IV—Receiver: One Co-U or a group of Co-Us that receives the task in the task constraint. This column does not apply to capability constraints.

Table 4.2 describes the six constraints in Table 4.1 with six types of collaboration. Note that con(2,7) and con(6,7) are two different constraints but have the same requirement which needs to be satisfied by different Co-Us.

TABLE 4.2

Collaboration among Co-Us

| Constraint | Co-U/Co-net and Collaboration |
|---|---|
| con(3, 10) | n(3, 10), where $\Omega(3, 10) = \{u(6, 10), u(11, 10)\}$, $u(6, 10) \mapsto u(11, 10)$ |
| con(4, 11) | n(4, 11), where $\Omega(4, 11) =$ $\{u(6, 11), u(21, 11), u(1, 11), u(7, 11)\}$ $u(6, 11) \mapsto (u(6, 11), u(21, 11), u(1, 11), u(7, 11))^R$ |
| con(2, 7) | u(8, 7) |
| con(6, 7) | u(11, 7) |
| con(110, 20) | n(100, 20), where $\Omega(100, 20) =$ $\left\{ \begin{array}{l} u(49, 20), u(38, 20), u(77, 20), \\ u(33, 20), u(34, 20) \end{array} \right\}$ $(u(49, 20), u(38, 20), u(77, 20))^P \mapsto (u(33, 20), u(34, 20))^R$ |
| con(4, t) | n(4, t), where $\Omega(4, t) = \{u(7, t), u(11, t)\}$ |

Constraints are related through Co-Us. For instance, con (3,10) and con(4,t) in Table 4.1 are related through u(11, 10)/u(11,t). The relationship between constraints reflects high-order collaboration between Co-Us and the relationship between CEs. Two constraints can be dependent or independent. When two constraints $con(r_1,t_1)$ and $con(r_2,t_2)$ are dependent, there are two types of dependences: inclusive and mutually exclusive. $con(r_1,t_1)$ and $con(r_2,t_2)$ are inclusive if $con(r_1,t_1) \subset con(r_2,t_2)$. This is defined in Eq. 4.22.

$$p(con(r_2,t_2) \text{ is not satisfied}|con(r_1,t_1) \text{ is not satisfied})=1, p(con(r_1,t_1) \text{ is not satisfied})\neq 0 \quad \text{Eq. 4.22}$$

Similarly, $$con(r_2,t_2) \text{ and } con(r_1,t_1) \text{ are inclusive if } con(r_2,t_2) \subset con(r_1,t_1) \quad \text{(Eq. 4.23)}.$$

$$p(con(r_1,t_1) \text{ is not satisfied}|con(r_2,t_2) \text{ is not satisfied})=1, p(con(r_2,t_2) \text{ is not satisfied})\neq 0 \quad \text{Eq. 4.23}$$

$p(con(r_1,t_1) \text{ is not satisfied})=p(con(r_2,t_2) \text{ is not satisfied})$ if both Eq. 4.22 and Eq. 4.23 are met. $con(r_1,t_1) \oplus con(r_2,t_2)$ indicates $con(r_1,t_1)$ and $con(r_2, t_2)$ are mutually exclusive, which is defined in Eq. 4.24.

$$p(con(r_2,t_2) \text{ is not satisfied}|con(r_1,t_1) \text{ is not satisfied})=0, p(con(r_1,t_1) \text{ is not satisfied})\neq 0 \quad \text{Eq. 4.24}$$

To meet Eq. 4.24, $p(con(r_2,t_2)$ is not satisfied $\cap con(r_1,t_1)$ is not satisfied) must be zero, this implies that Eq. 4.25 is met.

$$p(con(r_1,t_1) \text{ is not satisfied}|con(r_2,t_2) \text{ is not satisfied})=0, p(con(r_2,t_2) \text{ is not satisfied})\neq 0 \quad \text{Eq. 4.25}$$

A constraint $con(r_1,t_1)$ is independent if Eq. 4.26 is met.

$$p(con(r_1,t_1) \text{ is not satisfied}|con(r_2,t_2) \text{ is not satisfied})=p(con(r_1,t_1), \text{ is not satisfied}), \forall con(r_2,t_2) \quad \text{Eq. 4.26}$$

4.4. CEPD with Place/Transition Nets

The agent-oriented, constraint-based P/T net is developed in this research to model systems and visualize CEPD logic dynamically. The main advantages of this approach are:

1. A CE is prevented or detected if and only if a constraint is not satisfied. This ensures that a P/T net includes all possible CE states as long as their corresponding constraints are modeled and included in the P/T net;
2. The agent-oriented approach reduces the number of states need to be modeled with P/T nets. An agent executes one or more tasks/processes. Traditional object-oriented approach needs to have a corresponding state for the input and output of each task/process. The agent-oriented approach requires only one state for each agent regardless of how many tasks/processes the agent executes. FIG. 8 illustrates this difference.

In FIG. 8, an agent executes three tasks. $tr_1$, $tr_2$, and $tr_3$ are transitions and represent three tasks. In the object-oriented P/T net shown on the left, the input and output of each task are represented by two different states. The relationship between tasks, i.e., they are executed by the same agent, is not evident in the object-oriented P/T net. In the agent-oriented P/T net shown on the right, only one state, state p, is needed to represent the output of all three tasks. An agent-oriented and constraint-based P/T net is defined as following:

1. There are two types of states (places): constraint states and Co-U states. Each constraint or Co-U is represented by a state;
2. Each constraint state can have at most one token. Initially, each constraint state has one token;
3. Each Co-U state can have any nonnegative integer number of tokens. Initially, each Co-U state is empty and does not have any token;
4. There is one type of transitions: constraint transitions. Each constraint is associated with a transition, which fires if the constraint is not satisfied;
5. The pre-set of a transition includes only one element, a constraint state that represents the constraint;
6. The post-set of a transition includes all Co-Us that must satisfy the constraint associated with the transition;
7. $\forall W(p,tr)=1$ and $\forall W(tr,p)=1$. Each constraint state is enabled initially.

FIG. 9 shows a P/T net example for CEPD. A system has nine Co-Us and five constraints. Each constraint is represented by a state. The marking of five constraint states $M(con(r,t))=1$, $\forall r$, $t$. Each Co-U is represented by a state. The marking of nine Co-U states $M(U(i,t))=0$, $i=1, \ldots, 9$. There are five transitions each of which is associated with one constraint state and fires if the constraint is not satisfied. The pre-set of a transition includes one constraint state and the post-set of a transition includes all Co-Us that must satisfy the constraint. The arc weight $W(con(r,t)tr)=1$, $\forall r$, $t$, $tr$. All five transitions are enabled. The arc weight $W(tr,U(i,t))=1$, $\forall tr$, $t$, $i=1, \ldots, 9$, $tr \times U(i,t) \in F$.

4.5. CEPD Logic

The CEPD logic can be developed to detect, diagnose, and prognose CEs in a system and the results and flow of the logic can be visualized with a P/T net. The CEPD logic determines how constraints in a system are examined. For instance, in FIG. 9, if $con(4,t_3)$ is the first one being evaluated and is not satisfied, $tr_4$ fires. The number of tokens in $con(4,t_3)$ becomes zero and each of Co-U states $U(4,t)$, $U(5,t)$, $U(7,t)$, and $U(9,t)$ receives one token, which indicates a conflict $C(n(4,t_3))$ has been detected, diagnosed, or prognosed. Suppose $con(23,t_8)$ is the next constraint being evaluated and is not satisfied, $tr_3$ fires and the number of tokens in $con(23,t_8)$ becomes zero. $U(5,t)$ receives a token and has two tokens. This indicates an error $E(u(23,5,t_8))$ has been detected, diagnosed, or prognosed. Four steps can be followed to detect, diagnose, and prognose CEs in a system:

1. Determine a time frame within which an invariant model is built for CEPD. The time frame specifies a beginning time $t_b$ from which the system is being modeled, and an ending time $t_e$ at which the invariant model changes or CEPD terminates;
2. Model all constraints that need to be satisfied between $t_b$ and $t_e$, and their relationships. Constraint relationships are asynchronous and reflect high-order dependences between and among Co-Us. Two constraints are different if and only if at least one of four constraint attributes are different (Table 4.1): (1) requirement; (2) provider; (3) receiver; (4) time at which they must be satisfied;
3. For each constraint, determine which Co-Us must satisfy the constraint and their relationships which are synchronous and reflect first-order dependences between and among Co-Us;
4. Apply the CEPD logic.

The assumption of an invariant model indicates that constraints, Co-Us, and the relationship between constraints do not change between $t_b$ and $t_e$. Assumptions for the CEPD logic are discussed in the next section.

4.5.1. Assumptions for the CEPD Logic

Following the discussion in Sections 3.3 and 4.5, six assumptions for the CEPD logic are summarized as follows:
1. A system can be modeled with an invariant model;
2. A CE is either a functional CE or a general CE. CEs may occur because of (1) faulty functions of a Co-U or multiple Co-Us; (2) one or more Co-Us stop working (general failure). A CE therefore can be a functional CE or a general CE. The relationship between CEs is determined by the relationship between constraints;

3. Any number of CEs may occur in a system at any time;
4. All CEs are permanent CEs, i.e., each CE exists in a system since the time it occurs, unless error recovery or conflict resolution is performed to recover the error or resolve the conflict;
5. CE detection techniques can detect CEs unambiguously. The CEPD logic determines when and where to start CE detection, and which steps need to be followed to diagnose and prognose CEs. For a specific CE, different detection techniques can be applied to detect it. It is assumed that all CE detection techniques can give an unambiguous result of having a CE or not having a CE;

4.5.2. Centralized CEPD Logic

The Centralized CEPD Logic starts CEPD at a certain time and evaluates all constraints sequentially. A central control unit executes the logic and controls data and information, which are stored in two tables: a constraint (C) table and a constraint relationship (R) table. The C table describes each constraint and specifies the first-order dependence between and among Co-Us. The R table describes the relationship between constraints and specifies the high-order dependence among Co-Us. Table 4.3 is an example of C table. Table 4.4 is an example of R table. They describe the system modeled in FIG. 9.

TABLE 4.3

Constraint (C) Table

| Constraint | Requirement | Provider | Receiver |
|---|---|---|---|
| con(1, $t_1$) | Two units of part A | u(1, t) | u(3, t), u(6, t) |
| con(1, $t_2$) | Two units of part A | u(1, t) | u(3, t), u(6, t) |
| con(23, $t_8$) | Asset is more than $1.5 million | u(5, t) | Not applicable |
| con(4, $t_3$) | Expense is less than $2 million | u(5, t), u(7, t) | u(4, t), u(9, t) |
| con(8, $t_4$) | Ten units of part D | u(8, t) | u(2, t) |

TABLE 4.4

Constraint Relationship (R) Table

| Constraint | Relationship | Constraint |
|---|---|---|
| con(1, $t_1$) | ⊂ | con(1, $t_2$) |
| con(1, $t_2$) | ⊃ | con(1, $t_1$) |
| con(4, $t_3$) | ⊕ | con(23, $t_8$) |
| con(8, $t_4$) | Independent | |
| con(23, $t_8$) | ⊕ | con(4, $t_3$) |

A P/T net can be constructed to represent the Centralized CEPD Logic. An example is shown in FIG. 10, which is revised from the example in FIG. 9. The Centralized CEPD Logic is defined in Table 4.5.

FIGS. 13A-13C show an exemplary flow of the Centralized CEPD Logic according to an embodiment of the invention. In particular, FIGS. 13A-13C represent the logic in Table 4.5 in traditional flow diagram form.

FIGS. 14A-14B show an exemplary flow of the Decentralized CEPD Logic according to an embodiment of the invention. In particular, FIGS. 14A-14B represent the logic in Table 4.6 in traditional flow diagram form.

The places $P_{(1,t_1)}$, $P_{(1,t_2)}$, $P_{(23,t_2)}$, $P_{(4,t_3)}$ and $P_{(8,t_2)}$ represent five constraints. Each of the five places have (1) two tokens if the constraint is not examined for CEPD, (2) one token if a CE is not detected, diagnosed, or prognosed, and (3) no tokens if a CE is detected, diagnosed, or prognosed. Different numbers of tokens represent different CEPD status. The representation can be adjusted if needed.

TABLE 4.5

Centralized CEPD Logic

| Step | Logic | |
|---|---|---|
| 1 | Check the First-In-First-Out (FIFO) queue for scheduled tasks | |
| 2 | There is at least one task | No task |
| | Execute the oldest task (go to Step 5, 6, or 8) | Go to Step 3 |
| | Start CE detection at $TS^a$ | |
| 3 | Find con(r, t) [M($P_{(r,t)}$) = 2∩t ≤ $t_c$, $t_c$ is the current time] | |
| 4 | con(r, t) is found | con(r, t) is not found |
| | Mark con(r, t) [$tr_{(r,t)}^1$ fires, M($P_{(r,t)}$) = 1] | End of logic |
| 5 | Detect CE | |
| 6 | C(n(r, t)) is detected    E(u(r, i, t)) is detected | C(n(r, t))/E(u(r, i, t)) is not detected |
| | Mark con(r, t) [$tr_{(r,t)}^2$ fires, M($P_{(r,t)}$) = 0] | Find con($r_j$, $t_x$) from R table [con($r_j$, $t_x$) ⊂ con(r, t)∩M($P_{(r_1,t_x)}$) = 2] |
| 7 | Check C table and mark Co-Us of con(r, t) [$tr_{(r,t)}^3$ fires and increases M($P_{u(i,t)}$) by 1, u(i, t) ∈ n(r, t) or con(r, t)∈ π(i, t)] | con($r_j$, $t_x$) is found    Not found<br>Mark con($r_j$, $t_x$) [$tr_{(r_j,t_x)}^{(r,t)}$ fires, M($P_{(r_j,t_x)}$) = 1]    Go to Step 1 [$tr^{(r,t)}$ fires and increases M($P_0$) by 1] |
| 8 | Find con($r_j$, $t_x$) from R table con($r_j$, $t_x$) ⊕ con(r, t)∩M($P_{(r_j,t_x)}$) = 2 | Add "Execute Steps 6, 7, 8, and Go to Step 1 for con($r_j$, $t_x$)" to FIFO queue and go to Step 6 |
| 9 | con($r_j$, $t_x$) is found | Not found |
| | Mark con($r_j$, $t_x$) [$tr_{(r_j,t_x)}^{(r,t)}$ fires, M($P_{(r_j,t_x)}$) = 1] | Go to Step 11 |
| 10 | Add "Execute Steps 6, 7, 8, and Go to Step 1 for con($r_j$, $t_x$)" to FIFO queue and go to Step 8 | |
| | Start CE diagnostics | |
| 11 | Find con($r_m$, $t_y$) from R table [con(r, t) ⊂ con($r_m$, $t_y$)∩$t_y$ ≤ t] | |

TABLE 4.5-continued

Centralized CEPD Logic

| Step | Logic | | |
|---|---|---|---|
| 12 | $con(r_m, t_y)$ is found | | Not found |
| | $\left[C(n(r_m, t_y))/E(u(r_m, i, t_y)) \xrightarrow{Cause} C(n(r, t))/E(u(r, i, t))\right]$ | | |
| | $M(P_{(r_m,t_y)}) = 2$ | $M(P_{(r_m,t_y)}) = 0$ | Go to |
| | Mark $con(r_m, t_y)$ $[tr_{(r_m,t_y)}^{(r,t)}$ fires, $M(P_{(r_m,t_y)}) = 0]$ | Go to Step 11 | Step 15 |
| 13 | Check C table and mark Co-Us of $con(r_m, t_y)$ | | |
| | $[tr_{(r_m,t_y)}^3$ fires and increases $M(P_{u(i,t)})$ by 1, $u(i, t) \in n(r_m, t_y)$ or | | |
| | $con(r_m, t_y) \in \pi(i,t)]$ | | |
| 14 | Add "Execute this logic from Step 8 for $con(r_m, t_y)$" to FIFO queue and go to Step 11 | | |
| 15 | Find $con(r_n, t_z)$ from R table $[con(r_n, t_z) \subset con(r, t) \cap t_z \leq t]$ | | |
| 16 | $con(r_n, t_z)$ is found, $C(n(r_n, t_z))/E(u(r_n, i, t_z))$ may exist | | Not found |
| | $M(P_{(r_n,t_z)}) = 2$ | $M(P_{(r_n,t_z)}) \neq 2$ | Go to Step |
| | Add "Execute this logic from Step 5 for | Go to Step | 17 |
| | $con(r_n, t_z)$" to FIFO queue and go to Step | 15 | |
| | 15 | | |
| | Start CE prognostics | | |
| 17 | Find $con(r_k, t_w)$ from R table $[con(r, t) \subset con(r_k, t_w) \cap t_w > t]$ | | |
| 18 | $con(r, t) \subset con(r_k, t_w)$ is found | | Not found |
| | $M(P_{(r_k,t_w)}) = 2$ | $M(P_{(r_k,t_w)}) = 0$ | Go to Step |
| | Mark $con(r_k, t_w)$ $[tr_{(r_k,t_w)}^{(r,t)}$ fires, $M(P_{(r_k,t_w)}) = 0]$ | Go to Step | 1 |
| | | 17 | |
| 19 | Check C table and mark Co-Us of $con(r_k, t_w)$ | | |
| | $[tr_{(r_k,t_w)}^3$ fires and increases $M(P_{u(i,t)})$ by 1, $u(i, t) \in n(r_k, t_w)$ or | | |
| | $con(r_k, t_w) \in \pi(i, t)]$ | | |
| 20 | Add "Execute this logic from Step 8 for $con(r_k, t_w)$" to FIFO queue and go to Step 17 | | |

The Centralized CEPD Logic starts at $TS^a$. Suppose it ends at $TE^a$ (a is a positive integer and the index of execution). The logic can complete four tasks:
1. Detect and diagnose CEs that have occurred before and at $TE^a$;
2. Prognose CEs that will occur and are caused by any CEs that have occurred before or at $TE^a$;
3. Identify causes of each detected and prognosed CE, i.e., evaluate inclusive constraints of each constraint that is not satisfied;
4. Use exclusive relationship between constraints to identify constraints that are satisfied.

The Centralized CEPD Logic can be executed for multiple times, e.g., between $TS^1$ and $TE^1$, $TS^2$ and $TE^2$, and $TS^3$ and $TE^3$. They satisfy the condition $t_b \leq TS^1 \leq TS^2 \leq TS^3 \leq t_e$. Because the logic is executed sequentially, two adjacent executions do not overlap, e.g., $TE^1 \leq TS^2$ and $TE^2 \leq TS^3$.

4.5.3. Decentralized CEPD Logic

The Centralized Logic is usually complex (with many steps) and requires a large database to store data and information for an entire system. An alternative way of CEPD is to use intelligent agents to perform CEPD tasks in parallel. Each constraint employs a PDA that detects, diagnose, and prognose the CE related to the constraint. The prognostics and diagnostics of CEs are performed by sending "CE" and "No CE" messages from one PDA to the other. FIG. 11 is an example of a P/T net revised from FIG. 9 to illustrate the Decentralized CEPD Logic. Each agent follows the logic described in Table 4.6 to perform CEPD tasks.

To apply the Decentralized CEPD Logic, each agent stores information of a constraint. A C table (e.g., Table 4.3) is not necessary because only information of one constraint is needed. Each agent maintains a R table. Table 4.4 is divided into four tables, Table 4.7, Table 4.8, Table 4.9, and Table 4.10, each of which is used by an agent. If a constraint is independent, e.g., $con(8,t_4)$, the agent it employs does not have a R table.

The Decentralized CEPD Logic described in Table 4.6 is activated if an agent (r,t) is in one of three situations: (1) receives a "No CE" message; (2) receives a "CE" message; (3) current time $t_c$ is equal to or larger than t.

TABLE 4.6

Decentralized CEPD Logic for Agent (r, t)

| Step | Logic | | |
|---|---|---|---|
| | Agent (r, t) receives a "No CE" message $[M(P_{(r_l,t_x)}) = 1$ for and $tr_{(r,t)}^{(rl,tx)}]$ | | |
| 1a | $M(P_{(r,t)}^0) = 1$ | | $M(P_{(r,t)}^0) = 0$ |
| | Mark con(r, t) $[tr_{(r,t)}^{(rl,tx)}$ fires, $M(P_{(r,t)}) = 1]$ | | End of logic |
| 2a | Find $con(r_l, t_x)$ from agent (r, t)'s R table $[con(r_l, t_x) \subset con(r, t)]$ | | |
| 3a | $con(r_l, t_x)$ is found | | Not found |
| | Send a "No CE" message to agent $(r_l, t_x)$ $[M(P_{(r,t)}) = 1$ | | End of logic |
| | for any $tr_{(r_l,t_x)}^{(r,t)}]$ and go to Step 2a | | |
| | Agent (r, t) receives a "CE" message $[M(P_{(r,t)}^{(rl,tx)}) = 1$ for any $P_{(r,t)}^{(rl,tx)}]$ | | |

TABLE 4.6-continued

Decentralized CEPD Logic for Agent (r, t)

| Step | Logic | |
|---|---|---|
| 1b | $M(P_{(r,t)}^0) = 1$ | $M(P_{(r,t)}^0) = 0$ |
|  | Mark con(r, t) [$tr_{(r,t)}^1$ and $tr_{(r,t)}^{(r_j, t_x)}$ fire, $M(P_{(r,t)}) = 0$] | End of logic |
| 2b | Mark Co-Us of con(r, t) | |
|  | [$tr_{(r,t)}^3$ fires and increases $M(P_{u(i,t)})$ by 1, u(i, t) ∈ n(r, t) or con(r, t) ∈ π(i, t)] | |
| 3b | Find con($r_m$, $t_y$) from agent (r, t)'s R table [con(r, t) ⊂ con($r_m$, $t_y$)] | |
| 4b | con($r_m$, $t_y$) is found | Not found |
|  | Send a "CE" message to agent ($r_m$, $t_y$) | Go to Step 5b |
|  | [$M(P_{(r_m,t_y)}^{(r,t)}) = 1$] and go to Step 3b | |
| 5b | Find con($r_n$, $t_z$) from agent (r, t)'s R table [con(r, t) ⊕ con($r_n$, $t_z$)] | |
| 6b | con($r_n$, $t_z$) is found | Not found |
|  | Send a "No CE" message to agent ($r_n$, $t_z$) | End of logic |
|  | $\left[ M\binom{(r_n,t_z)}{P} \middle\vert \binom{(r,t)}{P} \right] = 1$ for any $tr_{(r_n,t_z)}^{(r,t)}$ and go to Step 5b | |
|  | $t \le t_c$, $t_c$ is the current time | |
| 1c | $M(P_{(r,t)}^0) = 1$ | $M(P_{(r,t)}^0) = 0$ |
|  | Detect CE for con(r, t) | End of logic |
| 2c | C(n(r, t)) or E(u(r, i, t)) is detected | Not detected |
|  | Mark con(r, t) [$tr_{(r,t)}^1$ and $tr_{(r,t)}^2$ fire, $M(P_{(r,t)}) = 0$] and to to Step 2b | Mark con(r, t) [$tr_{(r,t)}^1$ fires $M(P_{(r,t)}) = 1$] and go to Step 2a |

TABLE 4.7

Agent con(1, $t_1$) R Table

| Constraint | Relationship | Constraint |
|---|---|---|
| con(1, $t_1$) | ⊂ | con(1, $t_2$) |

TABLE 4.8

Agent (1, $t_2$) R Table

| Constraint | Relationship | Constraint |
|---|---|---|
| con(1, $t_2$) | ⊃ | con(1, $t_1$) |

TABLE 4.9

Agent (4, $t_3$) R Table

| Constraint | Relationship | Constraint |
|---|---|---|
| con(4, $t_3$) | ⊕ | con(23, $t_8$) |

TABLE 4.10

Agent (23, $t_8$) R Table

| Constraint | Relationship | Constraint |
|---|---|---|
| con(23, $t_8$) | ⊕ | con(4, $t_3$) |

Chapter 5. Analysis of CEPD Approaches for Different Networks

Three CEPD approaches are evaluated in this research, the Centralized CEPD Logic (Table 4.5), the Decentralized CEPD Logic (Table 4.6), and the Traditional CEPD Algorithm discussed in Section 3.3. Two main characteristics of the Traditional CEPD Algorithm are: (1) it is a centralized approach, i.e., it detects CEs sequentially; (2) it does not consider the relationship between CEs, i.e., it cannot perform CE prognostics and diagnostics. The CEPD approaches are applied to different types of networks whose topologies affect the performance of the approaches. This chapter analyzes the three CEPD approaches for three types of constraint networks.

5.1. Constraint Network

A network is comprised of nodes and links that connect them. In a constraint network, each constraint is a node. The links describe the relationships between constraints. Two types of links, inclusive and exclusive links, are used to describe the two types of relationships, inclusive and exclusive (defined in 4.3), respectively, between any two constraints when they are related. The inclusive link has directions, i.e., con($r_1,t_1$) ⊂ con($r_2,t_2$) is different than con($r_2,t_2$) ⊂ con($r_1,t_1$), whereas the exclusive link is undirected, i.e., con($r_1,t_1$)⊕con($r_2,t_2$) is the same as con($r_2,t_2$)⊕con($r_1,t_1$). A constraint network can have both directed and undirected links.

Directed networks can be cyclic, meaning they contain closed loops of links, or acyclic, meaning they do not contain closed loops of links. A constraint network can be cyclic, e.g., both con($r_1,t_1$) ⊂ con($r_2,t_2$) and con($r_2,t_2$) ⊂ con ($r_1,t_1$) exist, or acyclic. Let • denote a constraint, → denote the inclusive relationship, and — denote the exclusive relationship. There can be five possible relationships between two constraints con($r_1,t_1$) and con($r_2,t_2$) (FIG. 12). Note that the inclusive and exclusive relationships are mutually exclusive.

The study of network topologies has had a long history stretching back at least in the 1730s. The classic model of network, random network, was first discussed in the early 1950s (Solomonoff and Rapoport, 1951) and was rediscovered and analyzed in a series of papers published in the late 1950s and early 1960s (Erdos and Renyi, 1959, 1960, 1961). Most random networks assume that (1) undirected links; (2) at most one link between any two nodes; (3) a node does not have a link to itself. The degree of a node, d, is the number of links connected to the node. In a random network with n nodes and probability p to connect any pair of nodes, the maximum number of links in the network is $$\frac{1}{2}n(n-1).$$

The probability $p_d$ that a node has degree d is $$\binom{n-1}{d}p^d(1-p)^{n-1-d},$$

which is also the fraction of nodes in the network that have degree d. The mean degree $\bar{d}=(n-1)p$. Two important properties of a random network are:
1. Phase transition or bond percolation (Angeles Serrano and De Los Rios, 2007; Newman, 2003; Newman et al., 2006; Solomonoff and Rapoport, 1951). There is a phase transition from a fragmented random network for the mean degree $\bar{d}\leq 1$ to a random network dominated by a giant component for the mean degree $\bar{d}>1$. When the mean degree $\bar{d}\leq 1$, the number of nodes to which there exist paths from an arbitrary node is negligible compared to the total number of nodes n in the network if n is large. When the mean degree $\bar{d}>1$, the percentage of nodes to which there exist paths from an arbitrary node increases rapidly, starting with slope two. For instance, the percentage is 80% when $\bar{d}=2$. In the language of bond percolation, a spanning cluster forms when the mean degree $\bar{d}>1$.
2. Critical probability $p_c$ (Erdos and Renyi, 1959, 1960, 1961): for many properties of a random network, there exists a critical probability $p_c$ such that if p grows slower than $p_c$ as n→∞, the network fails to have those properties. Conversely, if p grows faster than $p_c$, the network has those properties. For instance, the probability of having a triple (a single node connects to two other nodes) is negligible if $p<cn^{-1/2}$ for some constant c, but tends to one as n becomes large if $p>cn^{-1/2}$.

The random network is homogeneous in the sense that most nodes in the network have approximately the same number of links. A typical example of the random network is the US highway system (Barabasi, 2002; Jeong, 2003). If a city is a node and the highway between two cities is a link, most cities in the system connect to approximately the same number of highways. Another type of networks that have been extensively studied is the small-world network (e.g., Watts and Strogatz, 1998). Compared to the random network, the small-world network has higher clustering coefficient, which means that there is a heightened probability that two nodes will be connected directly to one another if they have another neighboring node in common. The small-world network model is, however, not a very good model of real networks (Newman et al., 2006). There is little evidence that any known real-world network is substantially similar to the small-world network.

A common characteristic of both random and small-world networks is that the probability of having a highly connected node, i.e., a large d, decreases exponentially with d; nodes with large number of links are practically absent (Barabasi and Albert, 1999). Another type of networks that has been studied extensively and does capture the topology of many real-world networks is the scale-free network (e.g., Albert, et al., 1999; Barabasi and Albert, 1999; Broder et al., 2000; Price, 1965). In scale-free networks, the probability $p_d$ that a node has d degree follows a power law distribution, i.e., $p_d \propto d^{-\gamma}$, where γ is between 2.1 and 4 for real-world scale-free networks (Barabasi and Albert, 1999). Compared to the nodes in random and small-world networks, nodes with large d have a better chance to occur in scale-free networks.

Both random and scale-free networks have small-world effect. The distance l between two nodes in a network can be defined as the minimum number of links existing in the network that connect the two nodes. If the distance l between nodes in a network scales logarithmically or slower with network size for fixed mean degree, the network has small-world effect. It can be shown that l=log n/log(p(n−1)) for random networks (Barabasi, 2002; Newman, 2003), and l=log n/log log n for scale-free networks (Cohen and Havlin, 2003). This implies that nodes in both random and scale-free networks are close to each other. Another important characteristic of scale-free networks is that they are resilient to random failures (Albert et al., 2000; Cohen et al., 2000) but are vulnerable to targeted attacks (Cohen et al., 2001).

Another type of networks worth mentioning is the Bose-Einstein condensation network (Bianconi and Barabasi, 2001b). The Bose-Einstein network was discovered in an effort to model the competitive nature of networks. Many real-world scale-free networks are formed following the rule that older nodes have high probability of obtaining links. This is true in many real networks. For example, an old business has more customers than a new business; a Web site that was established ten years ago links to many more Web sites than a Web site established one year ago does. This rule is not always true, however, and a very good example is Google.com, which is a relatively new Web site but links to so many other Web sites. Motivated by this and probably many other examples, a fitness model (Bianconi and Barabasi, 2001a) was proposed to assign a fitness parameter $\eta_i$ to each node i. A node with higher $\eta_i$ has higher probability to obtain links. $\eta_i$ is randomly chosen from a distribution $\rho(\eta)$. When $\rho(\eta)$ follows certain distributions, e.g., $\rho(\eta)=(\lambda+1)(1-\eta)^\lambda$, $\lambda>1$, a Bose-Einstein condensation network forms.

The Bose-Einstein network shows "winner-takes-all" phenomena observed in competitive networks. This means that the fittest node acquires a finite fraction of the total links (about 80%, Bianconi and Barabasi, 2001b) in the network. The fraction is independent of the size of the network. In contrast, the fittest nodes' share of all links decreases to zero in the scale-free network. The fittest node corresponds to the lowest energy level in the Bose gas. The fittest node acquires most links corresponds to the phenomenon that many particles are at the lowest energy level when the temperature is close to absolute zero. Bose-Einstein condensation was predicted in 1924 by Bose and Einstein and was created in 1995 by Cornell and Wieman who received the Nobel Prize in Physics 2001 together with Ketterle for their work on Bose-Einstein condensation. FIG. 13 summarizes the three types of networks discussed here.

The three types of networks discussed here can be used to model constraint networks for CEPD. There are many real-world examples in which constraint networks can be modeled with one of the three networks:
1. Random network (RN): in project organizations, there exist multiple projects and a person is often involved in more than one project. A constrained network can be built in which each project is a constraint and two projects are related if they need the participation of the same person. If projects on average have the same size, i.e., they need the participation of approximately the same number of people, the constraint network becomes a random network. Both inclusive and exclusive relationships may exist between projects. For instance, a CE in a project may indicate that CEs may occur in another project because the same person is working on both projects. This is the inclusive relationship. On the other hand, the failure of one project may indicate that the other project does not have any problems because the person who works on both projects can successfully complete one of the two projects. This is the exclusive relationship;

2. Scale-free network (SFN): the scale-free constraint network can be used to model many organizations in which a few managers deal with many tasks whereas many employees work on a few tasks. Each manager or employee is a node and nodes are related through links, i.e., tasks;

3. Bose-Einstein condensation network (BECN): this type of network has many real-world applications. For instance, a software program that is written with object-oriented language can be modeled with BECN. The whole program is represented by a constraint and the code for each object is also represented by a constraint. The program is related to all objects whereas some objects are related to each.

5.2. Definition of Three Constraint Networks

Three types of networks, RN, SFN, and BECN, are studied to validate the newly developed CEPD logic, evaluate its performance, and compare it with the Traditional CEPD Algorithm:
RN: The degree distribution is $$p_d = \binom{n-1}{d} p^d (1-p)^{n-1-d}, p \neq 0.$$

The mean degree $\bar{d}$ is $(n-1)p$;
SFN: The degree distribution is $$p_d = \frac{1}{1.20} d^{-3}.$$

The exponent $-3$ is the median of most real-world scale free networks ($-2.1 \sim -4$; Barabasi and Albert, 1999). The constant $$c = \frac{1}{1.20}$$

is fixed by the requirement of normalization, which gives $\Sigma p_k = 1$ when $n \to \infty$;
BECN: The fittest node has 80% of total links and the other 20% links are uniformly and randomly assigned to other nodes.

To provide a reliable validation of the CEPD logic, it is desirable that the three networks have the same amount of nodes and links. The number of nodes n is the same for all three networks as $n \to \infty$. The degree distribution function $cd^{-\gamma}$ of a SFN is a power series ($d \to \infty$), and the mean degree of a SFN converges if $\gamma > 2$ and diverges if $1 < \gamma \leq 2$ (Arfken, 2005). The mean degree $\bar{d}$ of the above defined SFN is $\pi^2/7.20$. To validate the CEPD logic over the RN, it is necessary that $(n-1)p = \pi^2/7.20$. The mean total number of links of both the SFN and RN is $n\pi^2/14.40$. The fittest node in the BECN therefore has $n\pi^2/18$ links each of which is connected to a node that is uniformly and randomly chosen. The rest $n\pi^2/72$ links are uniformly and randomly assigned to nodes other than the fittest node in the BECN.

5.3. Analysis of CEPD Approaches

To analyze the CEPD approaches, a list of parameters and assumptions is defined:

1. The central control unit in the Centralized CEPD Logic and Traditional CEPD Algorithm, and agents in the Decentralized CEPD Logic use various detection techniques to detect CEs. The reliability of a detection technique is r, $0 < r \leq 1$. Both false positive and false negative are $1-r$;

2. The invariant model for CEPD starts at $t_b=0$ and ends at $t_c=T$, $T>0$. The time t that a node con(r,t) needs to be satisfied is uniformly and randomly chosen from (0,T);

3. The CEPD starts at time TS (defined in Section 4.5.2). The mean total number of nodes that must be satisfied before TS is $$n\frac{TS}{T}, 0 < TS < T;$$

4. The mean time for a detection technique to detect a CE is $\bar{t}_d$;

5. There are three types of information transmission: (1) from an agent to another agent in the Decentralized CEPD Logic; (2) from a node to the central control unit in the Centralized CEPD Logic and Traditional CEPD Algorithm; (3) from the central control unit to a node in the Centralized CEPD Logic and Traditional CEPD Algorithm. The mean time for each information transmission is $\bar{t}_i$;

6. When two nodes, $con(r_1,t_1)$ and $con(r_2,t_2)$, are linked to each other, they have one of the three types of relationships (FIG. 12), $con(r_1,t_1) \subset con(r_2,t_2)$, $con(r_2,t_2) \subset con(r_1,t_1)$, and $(con(r_1,t_1) \subset con(r_2,t_2)) \cap (con(r_2,t_2) \subset con(r_1,t_1))$. The other type of relationships, exclusive relationships $con(r_1,t_1) \oplus con(r_2,t_2)$ or $con(r_2,t_2) \oplus con(r_1,t_1)$, is not considered because they are seldom found in real-world networks. For any node $con(r_1,t_1)$, the probability of $con(r_1,t_1) \subset con(r_2,t_2)$, $con(r_2,t_2) \subset con(r_1,t_1)$, and $(con(r_1,t_1) \subset con(r_2,t_2)) \cap (con(r_2,t_2) \subset con(r_1,t_1))$ is $p_{out}$, $p_{in}$, and $p_{both}$, respectively. $p_{out}+p_{in}+p_{both}=1$;

7. The probability that a node has a CE is $p_{CE}$, $0 < p_{CE} \leq 1$. $p_{CE}$ is also the probability that a component has CEs. In an undirected network ($p_{both}=1$), any node in a component can be reached by all other nodes in the component. In a directed network ($p_{both}<1$), a component exists if any two nodes in the component are connected through links;

8. The damage caused by a CE is the product of damage caused by the CE over one time unit and the total time units for which the CE exists. The latter is dependent on when the CE is detected or diagnosed. It is assumed that the damage caused by a CE is zero if it is prognosed. No more damage is caused by a CE once it is detected or diagnosed. The mean damage caused by a CE over one time unit is $\overline{dA}$.

The above definitions are the foundation to evaluate the CEPD approaches with four performance measures:

1. CA (coverage ability): the quotient of the number of CEs that are detected, diagnosed, or prognosed, divided by the total number of nodes. $0 \leq CA \leq 1$;

2. PA (prognostics ability): the quotient of the number of CEs that are prognosed, divided by the total number of nodes. 0≤PA≤1;
3. TT (total CEPD time): the time difference between the CEPD approach stops (TE, defined in 4.5.2) and starts (TS);
4. TD (total CE damage): the total damage caused by CEs, which is the sum of the damage caused by all CEs.

The Centralized CEPD Logic starts at TS from Step 3 in Table 4.5 because The FIFO queue is empty at TS. Agents in the Decentralized CEPD Logic start at TS from Step 1c in Table 4.6. The Traditional CEPD Algorithm starts at TS and the central control unit randomly and uniformly selects a node to detect CEs. All three approaches can proceed if and only if there is at least one node that needs to be satisfied before TS. The probability that no nodes can be found that need to be satisfied before TS is $$\left(1 - \frac{TS}{T}\right)^n.$$

Because n→∞ and 0<TS<T, $$\left(1 - \frac{TS}{T}\right)^n = 0.$$

This indicates that all three approaches start CEPD by detecting CEs at one or more nodes regardless of the value of TS.

5.3.1. Analysis of the Centralized CEPD Logic

After randomly and uniformly selecting a node at Step 4 in Table 4.5 Centralized CEPD Logic, the Centralized CEPD Logic moves to Step 5 to detect CEs. There is a $p_{CE}r+(1-p_{CE})(1-r)$ probability that a CE is detected and a $p_{CE}(1-r)+(1-p_{CE})r$ probability that a CE is not detected. When a CE is detected, Steps 6 and 7 are executed and the logic moves to Step 11. Steps 8 through 10 are skipped because the exclusive relationship between constraints is not considered. From Steps 11 to 20, the logic finds all nodes that are related to the current node and mark them as having CEs. When a CE is not detected, the logic repeats Steps 6 through 8 and mark all nodes that are related to the current node as not having CEs. Essentially, once a node is found at Step 3, the Centralized CEPD Logic marks all nodes that are related to the node whether or not a CE is detected.

1. Random Network (RN)

The performance of the Centralized CEPD Logic depends on the mean degree $\bar{d}$. According to the phase transition property of RNs, $$(n-1)p \frac{p_{both}}{p_{in} + p_{out} + p_{both}} > 1$$

guarantees a giant component appears in the RN. Since $(n-1)p=\pi^2/7.20$, it requires that $$\frac{p_{both}}{p_{in} + p_{out} + p_{both}} > \frac{7.20}{\pi^2} = 0.73.$$

The large $$(n-1)p \frac{p_{both}}{p_{in} + p_{out} + p_{both}}$$

is, the larger is the giant component. When $p_{in}=p_{out}=0$ and $p_{both}=1$, $$(n-1)p \frac{p_{both}}{p_{in} + p_{out} + p_{both}}$$

is the largest, $$(n-1)p \frac{p_{both}}{p_{in} + p_{out} + p_{both}} = (n-1)p = 1.37$$

and the giant component includes about 49% of all nodes in the RN. Let $p_g$ denote the portion of nodes in the giant component, $p_g$ is the function of $\bar{d}$ and can be calculated according to $$\bar{d} = \frac{-\log(1 - p_g)}{p_g}$$

(Erdos and Renyi, 1959).

$p_{both}=1$ indicates that all links in the RN have two directions. The RN becomes an undirected network. There is a 49% probability that the node selected at Step 4 belongs to the giant component. Except the one giant component, there are many smaller components that fill the portion of the RN not occupied by the giant component and their average size is $$\frac{1}{1 - (n-1)p + (n-1)pp_g}$$

(Bollobas, 2001).

When $p_{both}=1$, the average size of small components is 3.32.

When $0<p_{both}<1$, the RN includes both directed and undirected links. The RN includes only directed links if $p_{both}=0$. A network is called a directed network if it has only directed links. Research has been conducted to study the size of the giant component in the directed network (Angeles Serrano and De Los Rios, 2007; Broder et al., 2000; Dorogovtsev et al., 2001; Newman et al., 2001; Tadic, 2001). Various results have been suggested under different assumptions. Because the connectivity of directed networks is more complex than the connectivity of undirected networks, there are also various definitions, e.g., strongly connected component, weakly connected component, IN component, and OUT component. More research is needed to help understand the characteristics of directed networks and networks with both directed and undirected links. In the following discussion, a network is a directed network if $p_{both}<1$.

Comparison of $\overline{TT}$ Between the Directed and Undirected Networks

It can be reasonably assumed that the time needed to find related nodes according to the relationship and mark the nodes is negligible compared to the detection time (mean is $\bar{t}_d$) and communication time (mean is $\bar{t}_i$). With this assumption, the mean total CEPD time $\overline{TT}$ when $p_{both}<1$ is equal to or larger than the $\overline{TT}$ when $p_{both}=1$. This conclusion is true for the RN, SFN, and BECN when the Centralized CEPD Logic is applied.
Proof:
Suppose there is a directed network (Net 1) with $p_{both}<1$. It is possible to replace each directed link in Net 1 with an undirected link to form an undirected network, Net 2 ($p_{both}=1$). The TT of Net 2 is not larger than the TT of Net 1 because (1) some nodes require detection (Step 5) in Net 1, but do not require detection in Net 2; (2) because of (1), more communication time between nodes and the central control unit is needed in Net 1; (3) because of (1) and (2), more nodes may require CE detection (Step 3 in Table 4.5) in Net 1. This further increases the TT of Net 1. For each directed network, an corresponding undirected network can be formed. For each pair of such networks, the TT of the directed network is larger than or equal to that of the undirected network. Hence, $\overline{TT}_{P_{both}=1} \leq \overline{TT}_{P_{both}<1}$. This completes the proof.
Comparison of $\overline{CA}$ Between the Directed and Undirected Networks
A critical difference between the undirected and directed networks is that certain nodes (say n' nodes) that require detection for n' times (one time for each node) in the directed network require detection for only one time in the undirected network. Let j be the number of times Step 5 is executed. $\overline{CA}_{P_{both}=1} \geq \overline{CA}_{P_{both}<1}$ when j is the same for the directed and undirected networks.
This conclusion is true for the RN, SFN, and BECN when the Centralized CEPD Logic is applied.
Proof:
Suppose there are n nodes that (1) are in the same component and require detection once in the undirected network; (2) require detection n' times in the directed network. In the undirected network, CA=1 with probability $p_{CE}r$ and CA=0 with probability $1-p_{CE}r$. $\overline{CA}_1 = p_{CE}r$. In the directed network, a CE is detected at a node with the probability $p_{CE}r$. The coverage ability $$\overline{CA_2} = \frac{n' p_{CE} r}{n'} = p_{CE}r.$$

Apparently, $\overline{CA}_1 = \overline{CA}_2 = p_{CE}r$ if there is sufficient time for the Centralized CEPD Logic to complete CEPD for the directed network. If there is no sufficient time, i.e., $$j < n', \overline{CA_2} = \frac{j p_{CE} r}{n'} \leq \overline{CA}_1 \cdot \overline{CA}_{P_{both}=1} \geq \overline{CA}_{P_{both}<1}$$

therefore. This completes the proof.
Comparison of $\overline{PA}$ Between the Directed and Undirected Networks
First, note that $\overline{PA} \leq \overline{CA}$. It can be shown that $\overline{PA}_{P_{both}=1} \geq \overline{PA}_{P_{both}<1}$ for the RN, SFN, and BECN when j is the same for the directed and undirected networks.
Proof:
In the undirected network, $$PA = \frac{m}{n'}$$

with probability $p_{CE}r$ and PA=0 with probability $$1 - p_{CE}r \cdot \overline{PA}_1 = \frac{m}{n'} p_{CE} \cdot m$$

is the number of CEs prognosed and $0 \leq m \leq n'$. In the directed network, $PA_2=0$ because each of n' nodes needs to be detected. $\overline{PA}_1 \geq PA_2$. Hence $\overline{PA}_{P_{both}=1} \geq \overline{PA}_{P_{both}<1}$. This completes the proof.
Comparison of $\overline{TD}$ Between the Directed and Undirected Networks
Because $\overline{CA}_{P_{both}=1} \geq \overline{CA}_{P_{both}<1}$ and $\overline{PA}_{P_{both}=1} \geq \overline{PA}_{P_{both}<1}$, without rigorous proof, it is clear that $\overline{TD}_{P_{both}=1} \leq \overline{TD}_{P_{both}<1}$ for the RN, SFN, and BECN when j is the same for the directed and undirected networks.
Calculation of $\overline{TT}$ when $p_{both}=1$
For an arbitrary value of TS, at least one node that needs to be satisfied before TS can be found at Step 3 because $n \to \infty$. This indicates $j \geq 1$. Note that j is the number of times Step 5 is executed. $\overline{TT} = j(\bar{t}_d + 2\bar{t}_i)$. When j=1, $\overline{TT} = \bar{t}_d + 2\bar{t}_i$. The Centralized CEPD Logic may stop in two possible situations: (1) no nodes that need to be satisfied before $j(\bar{t}_d + 2\bar{t}_i)$ can be found. The logic stops after Step 5 is executed for j times; (2) there are nodes that are not detected or marked for CEs when $TS+j(\bar{t}_d+2\bar{t}_i) \geq T$. As soon as $TS+j(\bar{t}_d+2\bar{t}_i) \geq T$, the logic stops and TT=T−TS. It can be shown that situation (1) will not happen if $$\frac{T - TS}{\bar{t}_d + 2\bar{t}_i} \in o(n), \text{ i.e., } \lim_{n \to \infty} \frac{\frac{T-TS}{\bar{t}_d + 2\bar{t}_i}}{n} = 0.$$

Proof:
Let n'' be the number of nodes left in the undirected RN after j steps. $n'' \geq 0.51n - 3.32(j-1)$. When $$\frac{T - TS}{\bar{t}_d + 2\bar{t}_i} \in o(n),$$

$j \in o(n)$ because $$j \leq \frac{T - TS}{\bar{t}_d + 2\bar{t}_i}.$$

If $j \in o(n)$, the probability that no nodes that need to satisfied before $j(\bar{t}_d + 2\bar{t}_i)$ can be found is approximately $$\left(1 - \frac{TS + j(\bar{t}_d + 2\bar{t}_i)}{T}\right)^{n''}.$$

When $TS + j(\bar{t}_d + 2\bar{t}_i) \leq T$, $$\left(1 - \frac{TS + j(\bar{t}_d + 2\bar{t}_i)}{T}\right)^{n'} \leq \left(1 - \frac{TS + j(\bar{t}_d + 2\bar{t}_i)}{T}\right)^{0.51n - 3.32(k-1)} = 0.$$

This indicates at least one node that needs to satisfied before $j(\bar{t}_d + 2\bar{t}_i)$ can be found. This completes the proof.

When $$\frac{T-TS}{\bar{t}_d + 2\bar{t}_i} \in o(n), j = \left[\frac{T-TS}{\bar{t}_d + 2\bar{t}_i}\right]$$

and TT=T−TS. This conclusion is true for the RN, SFN, and BECN when the Centralized CEPD Logic is applied. j is the largest integer less than $$\frac{T-TS}{\bar{t}_d + 2\bar{t}_i}.$$

Calculation of $\overline{CA}$ when $p_{both}=1$
When j=1, $$\overline{CA} = p_{CE}r\left(0.49^2 + 0.51\frac{3.32}{n}\right) = 0.49^2 p_{CE}r.$$

When j increases, $\overline{CA}$ increases. When $$\frac{T-TS}{\bar{t}_d + 2\bar{t}_i} \in o(n),$$

$$\overline{CA} = p_{CE}r \times \left(0.49\left(0.49 + \frac{3.32}{n} + ...\right) + 0.51\left(\frac{3.32}{n} + \frac{0.49n}{n-3.32}(0.49 + ...) + \frac{0.51n - 3.32}{n-3.32}\left(\frac{3.32}{n} + ...\right)\right)\right) = 0.49(1 - 0.51^j)p_{CE}r$$

If j is large such that $0.51^j \to 0$, $\overline{CA} = 0.49 p_{CE}r$. Note that $$j = \left[\frac{T-TS}{\bar{t}_d + 2\bar{t}_i}\right]$$

is large and $$\frac{T-TS}{\bar{t}_d + 2\bar{t}_i} \in o(n)$$

do not conflict and can both be true at the same time. For example, if $$j = \left[\frac{T-TS}{\bar{t}_d + 2\bar{t}_i}\right] = 20, 0.51^j = 1.42 \times 10^{-6} \approx 0 \text{ and } \lim_{n \to \infty} \frac{\frac{T-TS}{\bar{t}_d + 2\bar{t}_i}}{n} = 0.$$

The understanding of the result is as follows. When j is large, there is almost a 100% probability $(1-0.51^j \approx 0)$ that a node belongs to the giant component is selected at Step 3. The $\overline{CA}$ obtained from the node is $0.49p_{CE}r$. The CA obtained from nodes that do not belong to the giant component is negligible because $n \to \infty$.

Calculation of $\overline{PA}$ when $p_{both}=1$
When $$j = 1, \overline{PA} = \overline{CA}\left(1 - \frac{TS + \bar{t}_d + 2\bar{t}_i}{T}\right) = 0.49^2 p_{CE}r\left(1 - \frac{TS + \bar{t}_d + 2\bar{t}_i}{T}\right).$$

When j increases, $\overline{PA}$ increases. When $$\frac{T-TS}{\bar{t}_d + 2\bar{t}_i} \in o(n),$$

$$\overline{PA} = p_{CE}r \times \left\{ \begin{array}{l} 0.49 \times \left(0.49\left(1 - \frac{TS + \bar{t}_d + 2\bar{t}_i}{T}\right) + \frac{3.32}{n}\left(1 - \frac{TS + 2(\bar{t}_d + 2\bar{t}_i)}{T} + ...\right)\right) + \\ 0.51 \times \left(\frac{3.32}{n}\left(1 - \frac{TS + \bar{t}_d + 2\bar{t}_i}{T}\right) + \frac{0.49n}{n-3.32}\left(0.49\left(1 - \frac{TS + 2(\bar{t}_d + 2\bar{t}_i)}{T}\right) + ...\right) + \frac{0.51n - 3.32}{n-3.32}\left(\frac{3.32}{n}\left(1 - \frac{TS + 2(\bar{t}_d + 2\bar{t}_i)}{T}\right) + ...\right)\right) \end{array} \right\} =$$

$$p_{CE}r\left(0.49(1 - 0.51^j)\left(1 - \frac{TS}{T}\right) - \frac{\bar{t}_d + 2\bar{t}_i}{T}(1 - 0.51^j - 0.49 \times 0.51^j j)\right)$$

If j is large such that $0.51^j j \to 0$, $$\overline{PA} = 0.49 p_{CE}r\left(1 - \frac{TS + (\bar{t}_d + 2\bar{t}_i)/0.49}{T}\right).$$

Calculation of $\overline{TD}$ when $p_{both}=1$
When j=1, $$\overline{TD} = p_{CE}r\overline{dA} \times \left(0.49\left(0.49n\frac{(TS + \bar{t}_d + 2\bar{t}_i)^2}{2T} + 0.51np_{CE}\frac{T}{2}\right) + 0.51np_{CE}\frac{T}{2}\right) +$$

$$p_{CE}(1-r)np_{CE}\frac{T}{2}\overline{dA} +$$

$$(1-p_{CE})\left(0.49 \times 0.51np_{CE}\frac{T}{2} + 0.51np_{CE}\frac{T}{2}\right)\overline{dA} =$$

$$\frac{T}{2}np_{CE}\overline{dA}\left(\frac{0.49^2(TS + \bar{t}_d + 2\bar{t}_i)^2 r}{T^2} + 0.49 \times 0.51 p_{CE}r + 0.51 p_{CE}r + p_{CE}(1-r) + (1-p_{CE})(0.49 \times 0.51 + 0.51)\right) =$$

$$\frac{T}{2}np_{CE}\overline{dA}\left(\frac{0.49^2(TS + \bar{t}_d + 2\bar{t}_i)^2 r}{T^2} - 0.49^2 p_{CE}r + 0.49^2 p_{CE} + 1 - 0.49^2\right)$$

$$\frac{(TS + \bar{t}_d + 2\bar{t}_i)^2}{2T}$$

has two parts, $$\frac{TS + \bar{t}_d + 2\bar{t}_i}{T} \text{ and } \frac{TS + \bar{t}_d + 2\bar{t}_i}{2} \cdot \frac{TS + \bar{t}_d + 2\bar{t}_i}{T}$$

is the percentage of nodes that must be satisfied before $TS + \bar{t}_d + 2\bar{t}_i$.

$$\frac{TS + \bar{t}_d + 2\bar{t}_i}{2} = TS + \bar{t}_d + 2\bar{t}_i - \frac{TS + \bar{t}_d + 2\bar{t}_i}{2}$$

where the second $$\frac{TS + \bar{t}_d + 2\bar{t}_i}{2}$$

is the average of the time that nodes must be satisfied; the first $$\frac{TS + k(\bar{t}_d + 2\bar{t}_i)}{2}$$

is the average of the time that CEs exist. When j increases, TD decreases. When $$\frac{T - TS}{\bar{t}_d + 2\bar{t}_i} \in o(n):$$

$$\overline{TD} = 0.49 \begin{pmatrix} 0.49 n \overline{dA} \left( p_{CE} r \frac{(TS + \bar{t}_d + 2\bar{t}_i)^2}{2T} + p_{CE}(1-r)\frac{T}{2} \right) + \\ 3.32 \overline{dA} \left( p_{CE} r \frac{(TS + 2(\bar{t}_d + 2\bar{t}_i))^2}{2T} + p_{CE}(1-r)\frac{T}{2} \right) + \ldots \end{pmatrix} +$$

$$0.51 \begin{pmatrix} 3.32 \overline{dA} \left( p_{CE} r \frac{(TS + \bar{t}_d + 2\bar{t}_i)^2}{2T} + p_{CE}(1-r)\frac{T}{2} \right) + \\ \frac{0.49n}{n - 3.32} \left( 0.49 n \overline{dA} \left( p_{CE} r \frac{(TS + 2(\bar{t}_d + 2\bar{t}_i))^2}{2T} + \right. \right. \\ \left. \left. p_{CE}(1-r)\frac{T}{2} \right) + \ldots \right) + \\ \frac{0.51n - 3.32}{n - 3.32} \left( 3.32 \overline{dA} \left( p_{CE} r \frac{(TS + 2(\bar{t}_d + 2\bar{t}_i))^2}{2T} + \right. \right. \\ \left. \left. p_{CE}(1-r)\frac{T}{2} \right) + \ldots \right) \end{pmatrix} =$$

$$0.49 \begin{pmatrix} 0.49 n \overline{dA} \left( p_{CE} r \frac{(TS + \bar{t}_d + 2\bar{t}_i)^2}{2T} + p_{CE}(1-r)\frac{T}{2} \right) + \\ 3.32 \overline{dA} \left( p_{CE} r \frac{(TS + 2(\bar{t}_d + 2\bar{t}_i))^2}{2T} + p_{CE}(1-r)\frac{T}{2} \right) + \ldots \end{pmatrix} +$$

-continued $$0.51 \begin{pmatrix} 3.32 \overline{dA} \left( p_{CE} r \frac{(TS + \bar{t}_d + 2\bar{t}_i)^2}{2T} + p_{CE}(1-r)\frac{T}{2} \right) + \\ 0.49 \left( 0.49 n \overline{dA} \left( p_{CE} r \frac{(TS + 2(\bar{t}_d + 2\bar{t}_i))^2}{2T} + \right. \right. \\ \left. \left. p_{CE}(1-r)\frac{T}{2} \right) + \ldots \right) + \\ 0.51 \left( 3.32 \overline{dA} \left( p_{CE} r \frac{(TS + 2(\bar{t}_d + 2\bar{t}_i))^2}{2T} + \right. \right. \\ \left. \left. p_{CE}(1-r)\frac{T}{2} \right) + \ldots \right) \end{pmatrix}$$

There is no simple form for $\overline{TD}$. It is possible to calculate the lower bound of $\overline{TD}$:

$$\overline{TD} > 0.49^2 n\xi + 0.49(j-1)3.32\xi +$$
$$0.51 \times 3.32\xi + 0.51 \times 0.49^2 n\xi + 0.51 \times 0.49(j-2)3.32\xi +$$
$$0.51^2 \times 3.32\xi + 0.51^2 \times 0.49^2 n\xi + 0.51^3 \times 3.32\xi + \ldots =$$
$$0.49^2 n\xi + 0.51 \times 3.32\xi + \sum_{j=2}^{j} 0.51^{j-1} \times 0.49^2 n\xi +$$
$$0.49 \times 3.32\xi \times 0.51^{j-2}(j - (j'-1)) + 0.51^j \times 3.32\xi >$$
$$\sum_{j=1}^{j} 0.51^{j-1} \times 0.49^2 n\xi + 0.51^j \times 3.32\xi =$$
$$\left( 0.49n + \frac{0.51}{0.49}3.32 \right)(1 - 0.51^j)\xi = 0.49n(1 - 0.51^j)\xi$$

Where $$\xi = \frac{T}{2} p_{CE} \overline{dA} \left( \frac{(TS + \bar{t}_d + 2\bar{t}_i)^2 r}{T^2} + 1 - r \right).$$

If j is large such that $0.51^j \to 0$, $\overline{TD} \geq 0.49n\xi$. $\overline{TD}$ has the lower bound $0.49n\xi$ and upper bound $$\frac{T}{2} n p_{CE} \overline{dA} \left( \frac{0.49^2(TS + \bar{t}_d + 2\bar{t}_i)^2 r}{T^2} - 0.49^2 p_{CE} r + 0.49^2 p_{CE} + 1 - 0.49^2 \right).$$

Scale-Free Network (SFN):

The degree distribution of the SFN is $$p_j = \frac{1}{1.20} j^{-3}.$$

Because the exponent is −3, the SFN has a giant component whose size scales linearly with the size of the network, n, but does not fill the whole network (Aiello et al., 2000; Newman et al., 2006). The size of the giant component can be described as $p_g n$, where $0 < p_g < 1$. Beside the giant component, there are many non-giant components in the SFN. The second largest components have size of $\theta(\log n)$ (Aiello et al., 2000). Because $$\lim_{n\to\infty} \frac{\log n}{n} = 0,$$

the TT, $\overline{CA}$, $\overline{PA}$, and $\overline{TD}$ of the SFN can be analyzed similarly as those of the RN.

Bose-Einstein Condensation Network (BECN):

In the BECN, the fittest node has 80% of total links and 20% links are uniformly and randomly assigned to other nodes. The mean total number of links is $$\frac{n(n-1)p}{2} = 0.69n.$$

The fittest node has on average 0.55n links. Each of all other nodes has on average $$\frac{0.55n}{n-1} + \frac{2 \times 0.14n}{n-1} = \frac{0.83n}{n-1} \approx 0.83$$

nodes. The average size of the giant component is between 0.55n and 0.63n when $p_{both}=1$.

Proof:

The average number of nodes, including the fittest node and nodes that link to the fittest node directly is 0.55n+ 1≈0.55n. The nodes that link to the fittest node directly also link to other nodes. The average number of links between the nodes that link to the fittest node, and the nodes that do not link to the fittest node directly is $$0.55n \frac{2 \times 0.14n}{n-1}(1 - 0.55) = 0.55n \times 0.126.$$

There are less than or equal to 0.55n×0.126 nodes that link to the fittest node indirectly and are one node away from the fittest node. This calculation continues and the average total number of nodes that link to the fittest node indirectly is less than or equal to $0.55n(0.126+0.126^2+\ldots)\leq 0.08n$. The size of the giant component is therefore between 0.55n and 0.63n when $p_{both}=1$. This completes the proof.

Note that all the nodes that do not link to the giant component directly or indirectly belong to small components because the average number of links they have is 0.28. Theorem 1 summarizes the analysis of the Centralized CEPD Logic.

Theorem 1: the Centralized CEPD Logic has the following properties when it is applied to the RN, SFN, or BECN if $$\frac{T-TS}{\bar{t}_d + 2\bar{t}_i} \in o(n):$$

1. The total CEPD time $TT_{P_{both}=1} = TT_{P_{both}<1} = T-TS$;
2. The mean coverage ability $\overline{CA}_{P_{both}=1} \geq \overline{CA}_{P_{both}<1}$;
3. The mean prognostics ability $\overline{PA}_{P_{both}=1} \geq \overline{PA}_{P_{both}<1}$;
4. The mean total damage $\overline{TD}_{P_{both}=1} \leq \overline{TD}_{P_{both}<1}$.

Without the condition $$\frac{T-TS}{\bar{t}_d + 2\bar{t}_i} \in o(n), \overline{TT}_{P_{both}=1} \leq \overline{TT}_{P_{both}<1}.$$

When $p_{both}=1$, the Centralized CEPD Logic has the following properties if $$\frac{T-TS}{\bar{t}_d + 2\bar{t}_i} \in o(n)$$

$$\left(j = \left\lceil \frac{T-TS}{\bar{t}_d + 2\bar{t}_i} \right\rceil \right)$$

therefore) and j is large such that $(1-p_g)^j$ j→0 (j is the number of times Step 5 is executed and $p_g$ is the portion of nodes that belong to the giant component):

1. The mean coverage ability $\overline{CA} = p_g p_{CE} r$;
2. The mean prognostics ability $$\overline{PA} = p_s p_{CE} r \left(1 - \frac{TS + (\bar{t}_d + 2\bar{t}_i)/p_s}{T}\right);$$

3. The mean total damage $$\frac{T}{2} np_{CE} \overline{dA} p_g \left(\frac{(TS + \bar{t}_d + 2\bar{t}_i)^2 r}{T^2} + 1 - r\right) \leq \overline{TD}$$

$$\leq \frac{T}{2} np_{CE} \overline{dA} p_g^2 \left(\frac{(TS + \bar{t}_d + 2\bar{t}_i)^2 r}{T^2} - p_{CE} r + p_{CE} + \frac{1}{p_g^2} - 1\right)$$

$p_g = 0.49$ for the RN;

$$p_i = \frac{1}{1.20} j^{-3}$$

and $0 < p_g < 1$ for the SFN; the fittest node of the BECN has 80% of links and $0.55 \leq p_g \leq 0.63$ for the BECN.

5.3.2. Analysis of the Decentralized CEPD Logic

With the Decentralized CEPD Logic (Table 4.6), an agent is deployed at each node. For nodes that need to be satisfied before TS, their corresponding agents start CEPD from Step 1c. Without rigorous proof, it is clear that the TT, $\overline{CA}$, and $\overline{PA}$ of the undirected ($p_{both}=1$) RN, SFN, or BECN are larger than or equal to those of the directed ($p_{both}<1$) RN, SFN, or BECN, respectively. Consequently, the $\overline{TD}$ of the undirected RN, SFN, or BECN are smaller than or equal to those of the directed RN, SFN, or BECN, respectively.

Because agents perform CEPD in parallel, the TT of the undirected RN, SFN, or BECN is determined by the TT of the giant component. When the RN has $p_{both}=1$, for each node whose agent starts CEPD at TS, there is a 0.49 probability that the node belongs to the giant component and a 0.51 probability that the node belongs to one of the small components. The probability that all nodes that need to be satisfied before TS are from small components is $$0.51^{\frac{TS}{T}n}$$

where $$\frac{TS}{T}n$$

is the mean number of nodes that need to satisfied before TS. If $$\frac{TS}{T}n \in \theta(n), \text{ i.e., } \lim_{n\to\infty} \frac{\frac{TS}{T}n}{n} = c,$$

$0<c<\infty$, then $$\lim_{n\to\infty} 0.51^{\frac{TS}{T}n} = 0.$$

Because the average distance in an undirected RN is roughly l=log n/log((n−1)p) and the average distance in the giant component is less than log 0.49n/log((n−1)p), the upper bound of $\overline{TT}$ is calculated as following:

$$\overline{TT} < \bar{t}_d + 7.31\bar{t}_i \log n - 2.27\bar{t}_i,$$

$$7.31 = \frac{1}{\log((n-1)p)}, -2.27 = \frac{\log 0.49}{\log((n-1)p)}.$$

The similar result can be obtained for the undirected SFN, i.e., $$\overline{TT} < \bar{t}_d + 7.31\bar{t}_i \log n + \bar{t}_i \frac{\log p_g}{\log((n-1)p)}.$$

For the undirected BECN, $\overline{TT}$ of the giant component is $$\bar{t}_d + \left(\frac{1}{np_g} + \frac{2(np_g - 1)}{np_g}\right)\bar{t}_i.$$

When $n \to \infty$, $\overline{TT} = \bar{t}_d + 2\hat{t}_i$, which is the same as the $\overline{TT}$ of the Centralized CEPD Logic when j=1.

In many real-world situations, $\bar{t}_d$ and $\bar{t}_i$ are relatively small compared to T and TS. For example, suppose $$\bar{t}_d = \frac{1}{200}T, \bar{t}_i = \frac{1}{400}T, TS = \frac{1}{2}T,$$

and n=10000. With the Centralized CEPD Logic, TT=T−TS=0.5T because $$\frac{T-TS}{\frac{\bar{t}_d + 2\bar{t}_i}{n}} = \frac{50}{10000} = 0.005 \approx 0.$$

With the Decentralized CEPD Logic, $\overline{TT} < 0.08T$ for the undirected RN, SFN, and BECN. $\overline{TT}$ of the Decentralized CEPD Logic is smaller than that of the Centralized CEPD Logic.

With the Decentralized CEPD Logic, it is clear that $$\overline{CA} \geq \frac{TS}{T} p_{CE} r$$

for any of the undirected RN, SFN, and BECN. The further analysis of $\overline{CA}$ is difficult if $t_i \neq 0$. Suppose $t_i = 0$. Because $$\lim_{n\to\infty} (1 - p_g)^{\frac{TS}{T}n} = 0,$$

at least one node that needs to be satisfied before TS belongs to the giant component. For all the nodes that need to be satisfied after TS and belong to the giant component, $$\overline{CA} = p_g p_{CE} r \left(1 - \frac{TS}{T}\right).$$

The $\overline{CA}$ of nodes that need to be satisfied after TS and belong to small components is difficult to calculate. When $t_i = 0$, therefore, $$\overline{CA} \geq \left(p_g + (1 - p_g)\frac{TS}{T}\right) p_{CE} r.$$

This result is valid if $TT \leq T-TS$. Note that when $t_i = 0$, $TT = \max(t_d)$.

The calculation of $\overline{PA}$ also requires the assumption that $t_i = 0$. Nodes that need to be satisfied before TS are not prognosed with the Decentralized CEPD Logic. For nodes that need to be satisfied after TS and belong to the giant component, $$\overline{PA} = p_g p_{CE} r \left(1 - \frac{TS + \bar{t}_d}{T}\right).$$

The $\overline{PA}$ of nodes that need to be satisfied after TS and belong to small components is difficult to calculate. In summary, $$\overline{PA} \geq p_g p_{CE} r \left(1 - \frac{TS + \bar{t}_d}{T}\right).$$

This result is valid if $TT \leq T-TS$. It is expected that both $\overline{CA}$ and $\overline{PA}$ decrease if $t_i > 0$.

Even with the assumption that $t_i = 0$, the exact form of $\overline{TD}$ is difficult to derive with the Decentralized CEPD Logic. It is expected that the $\overline{TD}$ of the Decentralized CEPD Logic is less than that of the Centralized CEPD Logic because the $\overline{CA}$ and $\overline{PA}$ of the Decentralized CEPD Logic is larger than those of the Centralized CEPD Logic, respectively. The $\overline{TD}$, however, is dependent on the value of many parameters including $\bar{t}_d$, $\bar{t}_i$, T and TS.

Note that the above analysis is based on the assumption that only nodes that need to be satisfied before TS are detected for CEs. According to Steps 1c and 2c of the Decentralized CEPD Logic in Table 4.6, nodes that need to satisfied after TS may also be detected for CEs. One of the conditions in the analysis of the Centralized CEPD Logic is $$\frac{T-TS}{\bar{t}_d + 2\bar{t}_i} \in o(n).$$

One of the conditions in the analysis of the Decentralized CEPD Logic is $t_i=0$. Because both conditions need to be satisfied for the comparison between the two approaches, $$\frac{T-TS}{\bar{t}_d} \in o(n).$$

This means $$\lim_{n\to\infty} \frac{\frac{T-TS}{\bar{t}_d}}{n} = 0,$$

which can be rewritten as $$\lim_{n\to\infty} \frac{1-\frac{TS}{T}}{\frac{\bar{t}_d}{T}n} = 0.$$

This indicates that $$\frac{\bar{t}_d}{T}n \to \infty,$$

which means in a period of $\bar{t}_d$ time there are unlimited number of nodes some of which are due for CE detection.

There are therefore two situations: (a) only nodes that need to be satisfied before TS are detected for CEs, i.e., Steps 1c and 2c are executed by agents for nodes that need to be satisfied before TS; (b) not only nodes that need to be satisfied before TS, but also nodes that need to be satisfied after TS are detected for CEs. Because $$\frac{\bar{t}_d}{T}n \to \infty,$$

situation (b) has the following properties: (1) TT=T−TS; (2) $\overline{CA} \approx p_{CE}r$; (3) the $\overline{PA}$ of situation (b) is larger than or equal to the $\overline{PA}$ of situation (a); (4) the $\overline{TD}$ of situation (b) is smaller than or equal to the $\overline{TD}$ of situation (a). Theorem 2 summarizes the analysis of the Decentralized CEPD Logic in both situations.

Theorem 2: the Decentralized CEPD Logic has the following properties when it is applied to the RN, SFN, or BECN:

1. The total CEPD time $TT_{P_{both}=1} \geq TT_{P_{both}<1}$;
2. The mean coverage ability $\overline{CA}_{P_{both}=1} \geq \overline{CA}_{P_{both}<1}$;
3. The mean prognostics ability $\overline{PA}_{P_{both}=1} \geq \overline{PA}_{P_{both}<1}$;
4. The mean total damage $\overline{TD}_{P_{both}=1} \leq \overline{TD}_{P_{both}<1}$.

When $p_{both}=1$, $$\frac{TS}{T}n \in \theta(n),$$

and only nodes that need to be satisfied before TS are detected for CEs (situation (a)), the Decentralized CEPD Logic has the following properties:

1. The mean total CEPD time $$\overline{TT} < \bar{t}_d + \frac{\log np_g}{\log \bar{d}}\bar{t}_i$$

for the RN and SFN, $$\frac{1}{\log \bar{d}} = 7.31.$$

$\overline{TT} = \bar{t}_d + 2\bar{t}_i$ for the BECN; $TT = \max(t_d)$ if $t_i=0$;

2. The mean coverage ability $$\overline{CA} \geq \frac{TS}{T}p_{CE}r$$

when TT≤T−TS.

$$\overline{CA} \geq \left(p_g + (1-p_g)\frac{TS}{T}\right)p_{CE}r$$

when TT≤T−TS and $t_i=0$;

3. The mean prognostics ability $$\overline{PA} \geq p_g p_{CE} r\left(1 - \frac{TS + \bar{t}_d}{T}\right)$$

when TT≤T−TS and $t_i=0$.

When $$\frac{TS}{T}n \in \theta(n)$$

and nodes are detected for CEs when they are due for detection (situation (b)), the Decentralized CEPD Logic has the following properties:

1. The total CEPD time TT=T−TS;
2. The mean coverage ability $\overline{CA} \approx p_{CE}r$ if $t_i=0$;
3. The mean prognostics ability $\overline{PA}$ is larger than or equal to the $\overline{PA}$ in situation (a) if $t_i=0$;
4. The mean total damage $\overline{TD}$ is equal to or smaller than the $\overline{TD}$ in situation (a) if $t_i=0$.

$p_g$=0.49 for the RN;

$$p_j = \frac{1}{1.20} j^{-3}$$

and $0<p_g<1$ for the SFN; the fittest node of the BECN has 80% of links and $0.55 \le p_g \le 0.63$ for the BECN.

5.3.3. Analysis of the Traditional CEPD Algorithm

The Traditional CEPD Algorithm detects CEs sequentially without considering the relationship between nodes. Regardless of the value of $p_{both}$ and the types of networks, TT=T−TS, $$\overline{CA} = \frac{\overline{j}}{n} = 0,$$

PA=0, and $$\overline{TD} = \frac{1}{2} n p_{CE} T \overline{dA}$$

if $$\frac{T-TS}{\bar{t}_d + 2\bar{t}_i} \in o(n).$$

Theorem 3 summarizes the analysis of the Traditional CEPD Algorithm.

Theorem 3: the Traditional CEPD Algorithm has the following properties when it is applied to the RN, SFN, or BECN if $$\frac{T-TS}{\bar{t}_d + 2\bar{t}_i} \in o(n):$$

1. The total CEPD time $TT_{P_{both}=1} = TT_{P_{both}<1} = T-TS$;
2. The mean coverage ability $\overline{CA}_{P_{both}=1} = \overline{CA}_{P_{both}<1} = 0$;
3. The prognostics ability $PA_{P_{both}=1} = PA_{P_{both}<1} = 0$;
4. The mean total damage $$\overline{TD}_{P_{both}=1} = \overline{TD}_{P_{both}<1} = \frac{1}{2} n p_{CE} T \overline{dA}.$$

Table 5.2, Table 5.3, and Table 5.4 summarize the analysis results in the three theorems. Analysis results show that (1) the decentralized CEPD Logic performs better than the Centralized CEPD Logic, and the Centralized CEPD Logic performs better than the Traditional CEPD Algorithm in terms of the mean of all four performance measures regardless of the type of undirected network; (2) both the Centralized and Decentralized CEPD Logic performs better over the undirected network than the corresponding directed network in terms of the mean of all four performance measures; (3) the Centralized Logic performs better over the undirected BECN than the undirected RN in terms of the mean of CA; (4) the Traditional CEPD Algorithm has the same performance regardless of the type of network (RN, SFN, or BECN; directed or undirected).

TABLE 5.2

Performance of the CEPD Approaches over the Same Undirected Network

|  | | Centralized | Decentralized | Traditional |
|---|---|---|---|---|
| TT | | Decentralized ≤ Centralized = Traditional (when $\bar{t}_d \le T - TS$) | | |
| | | T − TS | max($t_d$) or T − TS | T − TS |
| $\overline{CA}$ | | Decentralized ≥ Centralized > Traditional | | |
| | | $p_g p_{CE} r$ | $\ge \left(p_g + (1 - p_g)\frac{TS}{T}\right) p_{CE} r$ or $\approx p_{CE} r$ | 0 |
| $\overline{PA}$ | | Decentralized ≥ Centralized ≥ Traditional | | |
| | | $p_g p_{CE} r \left(1 - \frac{TS + (\bar{t}_d + 2\bar{t}_i)/p_g}{T}\right)$ | $\ge p_g p_{CE} r \left(1 - \frac{TS + \bar{t}_d}{T}\right)$ | 0 |
| $\overline{TD}$ | | Centralized ≤ Traditional; expect that Decentralized ≤ Centralized | | |
| | | $\ge \frac{T}{2} n p_{CE} \overline{dA} p_g \left(\frac{(TS + \bar{t}_d + 2\bar{t}_i)^2 r}{T^2} + 1 - r\right)$ | N/A | $\frac{1}{2} n p_{CE} T \overline{dA}$ |
| | | $\le \frac{T}{2} n p_{CE} \overline{dA} p_g^2 \left(\frac{(TS + \bar{t}_d + 2\bar{t}_i)^2 r}{T^2} - p_{CE} r + p_{CE} + \frac{1}{p_g^2} - 1\right)$ | | |
| | Condition | $\frac{T-TS}{\bar{t}_d + 2\bar{t}_i} \in o(n); (1 - p_g)^j j \to 0$ | $\frac{TS}{T} n \in \theta(n); t_i = 0;$ $t_d \le T - TS$ | $\frac{T-TS}{\bar{t}_d + 2\bar{t}_i} \in o(n)$ |

TABLE 5.3

Performance of the CEPD Approaches over Corresponding Directed and Undirected Networks

| | Centralized | Decentralized | Traditional |
|---|---|---|---|
| $\overline{TT}$ | $TT_{p_{both}=1} = TT_{p_{both}<1} = T - TS$ | $TT_{p_{both}=1} \geq TT_{p_{both}<1}$ | $TT_{p_{both}=1} = TT_{p_{both}<1} = T - TS$ |
| $\overline{CA}$ | $\overline{CA}_{p_{both}=1} \geq \overline{CA}_{p_{both}<1}$ | | $\overline{CA}_{p_{both}=1} = \overline{CA}_{p_{both}<1} = 0$ |
| $\overline{PA}$ | $\overline{PA}_{p_{both}=1} \geq \overline{PA}_{p_{both}<1}$ | | $\overline{PA}_{p_{both}=1} = \overline{PA}_{p_{both}<1} = 0$ |
| $\overline{TD}$ | | $\overline{TD}_{p_{both}=1} \leq \overline{TD}_{p_{both}<1}$ | $\overline{TD}_{p_{both}=1} = \overline{TD}_{p_{both}<1} = \frac{1}{2}np_{CE}\overline{TdA}$ |
| Condition | $\frac{T-TS}{\bar{t}_d + 2\bar{t}_i} \in o(n)$ | | None |

TABLE 5.4

Performance of the Same CEPD Approach over Different Undirected Networks

| | RN<br>$p_g = 0.49$ | SFN<br>$0 < p_g < 1$ | BECN<br>$0.55 \leq p_g \leq 0.63$ |
|---|---|---|---|
| $\overline{TT}$ | \multicolumn{3}{l}{RN = SFN = BECN = T - TS for the Centralized Logic, Decentralized Logic in situation (b), and Traditional Algorithm; RN = SFN = BECN = max($t_d$) for the Decentralized Logic in situation (a)} | | |
| $\overline{CA}$<br>$\overline{PA}$ | \multicolumn{3}{l}{BECN $\geq$ RN for the Centralized Logic; RN = SFN = BECN = 0 for the Traditional Algorithm} | | |
| $\overline{TD}$ | \multicolumn{3}{l}{RN = SFN = BECN = $\frac{1}{2}np_{CE}\overline{TdA}$ for the Traditional Algorithm} | | |
| Condition | \multicolumn{3}{l}{$\frac{T-TS}{\bar{t}_d + 2\bar{t}_i} \in o(n)$ and $(1-p_g)^j j \to 0$ for the Centralized Logic; $\frac{TS}{T} n \in \theta(n)$ and $t_i = 0$ for the Decentralized Logic; $\frac{T-TS}{\bar{t}_d + 2\bar{t}_i} \in o(n)$ for the Traditional Algorithm} | | |

Chapter 6. Experiments, Results and Validation

The objectives of the experiments are to: (1) verify the analytical results of the three CEPD approaches; (2) explore properties of the Centralized and Decentralized CEPD Logic that have not been analytically studied; (3) discover the properties of the CEPD approaches when certain conditions are relaxed; (4) identify improvements for the Centralized and Decentralized CEPD Logic to obtain better performance.

6.1. Network Generation

The experiments are conducted by executing a software program using AutoMod (AutoMod Version 11.1, 1998-2003) to simulate the three CEPD approaches. Three networks, RN, SFN, and BECN, must be generated in the experiments. Due to the limit of maximum 200 entities in AutoMod, n=150 for each network. In the SFN, $$\sum_{d=1}^{149} cp_d = c\sum_{d=1}^{149} d^{-3} \approx 1.20c \cdot c = \frac{1}{1.20}$$

still holds when n=150. The parameters of the three networks are:
RN: p=1.37/(150−1)≈0.009;
SFN: The degree distribution is $$p_d = \frac{1}{1.20}d^{-3}, 1 \leq d \leq 149;$$

BECN: The total number of links is $$\frac{n(n-1)p}{2} \approx 103.$$

The fittest node has 80% of total links, i.e., 82 links, and the other 20% links, i.e., 21 links, are uniformly and randomly assigned to other nodes.

The generation of the RN and BECN is straightforward. To generate the SFN, a four-step procedure has been used in previous research (Molloy and Reed, 1995; Newman et al., 2001; Newman et al., 2006):

1. Generate the degree sequence according to the degree distribution to determine the number of links each node has;
2. Create a list in which the label s of each node appears exactly $d_s$ times;
3. Pair up elements from the list randomly and uniformly until none remain;
4. Add a link to the network joining the two nodes in each pair.

As long as $$\sum_{s=1}^{n} d_s$$

is even, the procedure can always be completed. If $$\sum_{s=1}^{n} d_s$$

is odd, the procedure repeats Step 1 until $$\sum_{s=1}^{n} d_s$$

becomes even. In Step 3, each pair has two different nodes. If two nodes are the same, they are not paired up and Step 3 is repeated until two different nodes are selected. Two nodes are paired up only once. If two randomly selected nodes have already been paired up, Step 3 is repeated to find another pair of nodes. A possible failure that has not been discussed previously can be illustrated with the following example.

Suppose a network has three nodes, node 1, node 2, and node 3. Node 1 has one link; node 2 has one link; and node 3 has two links. There are four numbers on the list generated in Step 2: 1, 2, 3, 3. It is possible that the numbers 1 and 2 are first selected from the list. This causes a failure because node 3 cannot link to itself.

A small revision of the procedure can avoid the failure. This means to first pair up nodes that have more links. To generate a pair of nodes, the first node is chosen according to the number of links it has, i.e., the number of times it appears on the list; the second node is chosen randomly and uniformly from the list. The revision can avoid the situation in which nodes with more links have to link to itself. Note that, however, nodes with more links already have higher probability to be chosen following the procedure. The revision therefore may not be necessary. In the experiments, the four-step procedure described above is used to generate the SFN. If the failure discussed here occurs, all pairings will be deleted and the procedure repeats Step 3.

6.2. Experiment Design

To verify the analytical results, the design of the experiments is as following:
1. The independent variable CEPD approach (AP) has three levels: $AP_1$=Centralized CEPD Logic, $AP_2$=Decentralized CEPD Logic, and $AP_3$=Traditional CEPD Algorithm;
2. The independent variable network (NET) has six levels: $NET_1$=Directed RN; $NET_2$=Undirected RN; $NET_3$=Directed SFN; $NET_4$=Undirected SFN; $NET_5$=Directed BECN; $NET_6$=Undirected BECN;
3. For the directed RN, SFN, and BECN, $p_{both}$=0.5 and $p_{in}$=$p_{out}$=0.25. For the undirected RN, SFN, and BECN, $p_{both}$=1 and $p_{in}$=$p_{out}$=0;
4. There are four dependent variables: TT, CA, PA, and TD;
5. T=100; TS=50; $\bar{t}_d$=5 and $t_d$ is randomly and uniformly drawn from (4,6); $t_i$=0. These are reasonable assumptions.

For instance, T=100 indicates the system is modeled for 100 seconds, i.e., at most 100 seconds are allowed for CEPD. TS=50 indicates the CEPD starts at time 50 seconds. $\bar{t}_d$=5 indicates it takes on average 5 seconds to detect a CE. $t_i$=0 indicates the information transmission is instantaneous. These assumptions ensure the conditions of the analysis are satisfied:

5a.

$$\frac{T - TS}{\frac{\bar{t}_d + 2\bar{t}_i}{n}} = \frac{10}{150} = 0.07 \approx 0,$$

the probability that no nodes that need to satisfied before j($\bar{t}_d + 2\bar{t}_i$) can be found is approximately $$\left(1 - \frac{TS + j(\bar{t}_d + 2\bar{t}_i)}{T}\right)^{n'}.$$

$n \geq c_1 n - c_2(j-1)$ where $c_1$ is the portion of nodes that belong to small components ($c_1$=0.51 for the undirected RN; $0 < c_1 < 1$ for the undirected SFN; $0.37 \leq c_1 \leq 0.45$ for the undirected BECN); $c_2$ is the size of small components ($c_2$=3.32 for the undirected RN; $c_2 \in \theta(\log n)$ for the undirected SFN).

$$\left(1 - \frac{TS + j(\bar{t}_d + 2\bar{t}_i)}{T}\right)^{n'} \leq \left(1 - \frac{TS}{T}\right)^{c_1 n - c_2(j-1)} \approx 0;$$

5b. Because $4 < t_d < 6$, $t_i$=0, and $$j = \frac{T - TS}{\bar{t}_d + 2\bar{t}_i}$$

for the Centralized CEPD Logic, 8.33<j<12.5. $(1-p_g)^j \approx 0$ where $p_g$ is the size of the giant component;

5c. Because $$\frac{TS}{T} n = 75, (1 - p_g)^{\frac{TS}{T} n} \approx 0$$

where $p_g$ is the size of the giant component;
5d. $t_d < T-TS = 50$.
6. The reliability of any detecting technique r=0.9. Both false positive and false negative are 0.1;
7. The time t that a node con(r,t) needs to be satisfied is uniformly and randomly chosen from (0,T), i.e., (0,100);
8. The probability that a node has a CE or a component has CEs $p_{CE}$=0.5. All nodes have the CE if the component has the CE. This guarantees that the average total number of CEs in a network is $np_{CE}$, regardless of the type of network;
9. The mean damage caused by a CE over one time unit $\overline{dA}$=10 and dA is randomly and uniformly drawn from (5,15).

There are 18 combinations (3×6) of independent variables. Two hundred experiments are conducted for each combination. Total 3600 experiments are conducted using AutoMod (AutoMod Version 11.1, 1998-2003). The experiments aim to verify the results summarized in Table 6.1.

TABLE 6.1

Analytical Results for Verification

| Performance Measure | Network | Centralized | | | Decentralized | | | Traditional | | |
|---|---|---|---|---|---|---|---|---|---|---|
| | | RN | SFN | BECN | RN | SFN | BECN | RN | SFN | BECN |
| $\overline{TT}$ | Undirected | | 50 | | | 6 in situation (a); 50 in situation (b) | | | 50 | |
| | Directed | | | | | | | | | |
| $\overline{CA}$ | Undirected | 0.22 | 0.45 $p_g$ | 0.25~0.28 | ≥0.34 | ≥0.225(1 + $p_g$) ~0.45 in situation (b) | ≥0.35 | | 0 | |
| | Directed | ≤0.22 | ≤0.45 $p_g$ | $\leq \overline{CA}_{Pboth=1}$ | | $\leq \overline{CA}_{Pboth=1}$ situation (a) | | | | |
| $\overline{PA}$ | Undirected | 0.09 | 0.22 $p_g$ – 0.02 | 0.10~0.12 | ≥0.10 | ≥0.20 $p_g$ situation (b) ≥ situation (a) | ≥0.11 | | | |
| $\overline{TD}$ | Directed | ≤0.09 | $\leq \overline{PA}_{Pboth=1}$ | | | $\leq \overline{PA}_{Pboth=1}$ situation (b) ≤ situation (a) | | | | |
| | Undirected | 6840~31398 | 13959 $p_g$~ 37500-25416 $p_g^2$ | 11344~29812 | | | | | 37500 | |
| | Directed | | $\geq \overline{TD}_{Pboth=1}$ | | | $\geq \overline{TD}_{Pboth=1}$ | | | | |

6.3 Experiment Results and Discussion

Reference is made to FIG. 14, which shows a diagram labeled Table 6.2. Table 6.2 summarizes the experiment results for verification. Comparing Table 6.1 and Table 6.2 (as shown in FIG. 14), there is an excellent agreement between experiment and analytical results except for two values, the (CA)⁻ (Analytical: 0.09; Experiment: 0.16) of the Centralized CEPD Logic and the (TT)⁻ (Analytical: 50; Experiment: 41.54) of the Decentralized CEPD Logic, both of which are for the undirected SFN and are highlighted in Table 6.2. The inconsistencies are due to the unique properties of SFN. Recall the discussion in Section 5.3.1, the undirected SFN with exponent −3 has a giant component whose size scales linearly with the size of the network, n. Beside the giant component, there are many non-giant components in the SFN. The second largest components have size of θ(log n).

Because n=150 in the experiments, the size of some non-giant components may be close to the size of the giant component. In other words, the effect of non-giant components is not negligible when n=150. This explains why the $\overline{CA}$ is larger in the experiments (0.16>0.09) and the $\overline{TT}$ is smaller in the experiments (41.54<50). When a non-giant component whose size is close to the size of the giant component is selected for CEPD, the CA increases and the TT decreases substantially. Note that the size of non-giant components in the undirected RN and BECN is relatively small and is not related to the size of the network.

1. Performance of the Three CEPD Approaches Over the Undirected Networks

The experiment results in Table 6.2 show that:
a. For each of the three undirected networks, RN, SFN, and BECN, the Decentralized CEPD Logic outperforms the Centralized CEPD Logic. Compared to the Centralized CEPD Logic, the Decentralized CEPD Logic has smaller $\overline{TT}$ and $\overline{TD}$, and larger $\overline{CA}$ and $\overline{PA}$;
b. For each of the three undirected networks, RN, SFN, and BECN, the Centralized CEPD Logic outperforms the Traditional CEPD Algorithm. Compared to the Traditional CEPD Algorithm, the Centralized CEPD Logic has smaller $\overline{TD}$ and larger $\overline{CA}$ and $\overline{PA}$. Both approaches have the same $\overline{TT}$.
c. When TT increases from 6 to 50, the performance of the Decentralized CEPD Logic improves.

These results verify the analysis summarized in Table 5.2. For the large undirected constraint network, RN, SFN, or BECN, with a giant component, the Decentralized CEPD Logic is always preferred to detect, diagnose, and prognose CEs with the largest $\overline{CA}$ and $\overline{PA}$, and the smallest $\overline{TT}$ and $\overline{TD}$.

2. Performance of the Three CEPD Approaches Over the Directed Networks

The experiment results in Table 6.2 show that for each of the three directed networks, RN, SFN, and BECN, the Decentralized CEPD Logic outperforms both the Centralized CEPD Logic and Traditional CEPD Algorithm. Compared to the other two approaches, the Decentralized CEPD Logic has smaller $\overline{TT}$ and $\overline{TD}$, and larger $\overline{CA}$ and $\overline{PA}$. This verifies the analysis summarized in Theorem 2. In addition, the experiment results in Table 6.2 show that the Centralized CEPD Logic outperforms the Traditional CEPD Algorithm with larger $\overline{CA}$ and $\overline{PA}$.

3. Performance of the Three CEPD Approaches Over Different Networks (RN, SFN, or BECN), and the Corresponding Undirected and Directed Networks The experiment results in Table 6.2 show that the Traditional CEPD Algorithm performs the same over the corresponding directed and undirected networks. The Centralized CEPD Logic performs better over the undirected network with larger $\overline{CA}$ and $\overline{PA}$, and smaller $\overline{TD}$. The Decentralized CEPD Logic has larger $\overline{PA}$ and smaller $\overline{TD}$ over the undirected network than the corresponding directed network. The $\overline{CA}$ of the Decentralized CEPD Logic is almost the same for the corresponding undirected and directed networks. These results verify the analysis summarized in Table 5.3.

The experiment results in Table 6.2 show that for all three networks, RN, SFN, and BECN (all are directed or undirected), the performance of the Centralized CEPD Logic is BECN>RN>SFN. The performance of the Decentralized CEPD Logic and Traditional CEPD Algorithm is not sensitive to the type of network. The Decentralized CEPD Logic, however, performs a little better over the SFN than the RN and BECN because there are some large components in the SFN other than the giant component. These results verify the analysis summarized in Table 5.4. theorem 4 summarizes the selection of CEPD approaches to detect, diagnose, and prognose CEs.

Theorem 4: for any of the directed or undirected constraint network, RN, SFN, or BECN, the Decentralized CEPD Logic is preferred to detect, diagnose, and prognose CEs with the largest $\overline{CA}$ and $\overline{PA}$, and the smallest $\overline{TT}$ and $\overline{TD}$. The Centralized CEPD Logic outperforms the Traditional CEPD Algorithm with larger $\overline{CA}$ and $\overline{PA}$. The Centralized CEPD Logic perform better over the undirected network than the corresponding directed network with larger $\overline{CA}$ and $\overline{PA}$, and smaller $\overline{TD}$. The Traditional CEPD Algorithm performs the same over the undirected and the corresponding directed networks. The Decentralized CEPD Logic has larger $\overline{PA}$ and smaller $\overline{TD}$ over the undirected network than the corresponding directed network whereas the $\overline{CA}$ of the corresponding undirected and directed network is almost the same. The performance of the Centralized CEPD Logic is influenced by the type of network, i.e., BECN>RN>SFN in terms of $\overline{CA}$, $\overline{PA}$, and $\overline{TD}$. The performance of the Decentralized CEPD Logic and Traditional CEPD Algorithm is not sensitive to the type of network. The Decentralized CEPD Logic, however, performs better over the SFN than the RN and BECN when there are some large components in the SFN other than the giant component.

6.4. CECA and CEPA

The CA and PA defined earlier to evaluate the performance of three CEPD approaches are not the CE coverage ability or CE prognostics ability. The CE coverage ability (CECA) is the quotient of the number of CEs that are detected, diagnosed, or prognosed, divided by the total number of CEs, $0 \leq CECA \leq 1$. The CE prognostics ability (CEPA) is the quotient of the number of CEs that are prognosed, divided by the total number of CEs, $0 \leq CEPA \leq 1$. The CECA and CEPA are the performance measures of interest, but cannot be analyzed mathematically because of the dependence between the numerator and denominator. Table 6.3 summarizes the experiment results of $\overline{CECA}$ and $\overline{CEPA}$.

CEPD Algorithm performs the same over the undirected and the corresponding directed networks;
3. The performance of the Centralized CEPD Logic is influenced by the type of network, i.e., BECN≥RN>SFN in terms of $\overline{CECA}$ and $\overline{CEPA}$. The performance of the Traditional CEPD Algorithm is not sensitive to the type of network;
4. The Decentralized CEPD Logic is also influenced by the type of network, i.e., SFN>RN>BECN. This result about $\overline{CECA}$ and $\overline{CEPA}$ is different than the analysis and experiment results of $\overline{CA}$ and $\overline{PA}$.

In summary, the Decentralized CEPD Logic is preferred to detect, diagnose, and prognose CEs in terms of $\overline{CECA}$ and $\overline{CEPA}$. For instance, when the Decentralized CEPD Logic is applied for CEPD over the undirected SFN, $\overline{CECA}$=0.9 and $\overline{CEPA}$=0.34. This indicates that on average, 90% of CEs are detected, diagnosed, or prognosed, and 34% of CEs are actually prognosed.

6.5. Performance of CEPD Approaches with Non-Zero Communication Time

It is assumed in the Centralized CEPD Logic that the time needed to find related nodes according to the relationship (e.g., Table 4.4) and mark the nodes (e.g., Table 4.3) is negligible. In the Decentralized CEPD Logic, it is assumed that the communication time between agents is zero, i.e., $t_i=0$. As a result, the communication time between the central control unit and nodes in the Centralized CEPD Logic is also assumed to be zero for the purpose of valid comparison between the CEPD approaches.

In reality, the time needed to find related nodes and mark them is very small and close to zero because the task is

TABLE 6.3

Experiment Results of $\overline{CECA}$ and $\overline{CEPA}$

| Performance Measure | Network | Centralized | | | Decentralized | | | Traditional | | |
| --- | --- | --- | --- | --- | --- | --- | --- | --- | --- | --- |
| | | RN | SFN | BECN | RN | SFN | BECN | RN | SFN | BECN |
| $\overline{CECA}$ | Undirected | 0.42 | 0.28 | 0.42 | situation (a) 0.72 0.76 0.64 situation (b) 0.89 0.90 0.87 | | | 0.06 | | |
| | Directed | 0.23 | 0.19 | 0.31 | situation (a) 0.66 0.68 0.59 situation (b) 0.88 0.89 0.87 | | | | | |
| $\overline{CEPA}$ | Undirected | 0.11 | 0.07 | 0.12 | situation (a) 0.24 0.28 0.17 situation (b) 0.25 0.34 0.17 | | | 0 | | |
| | Directed | 0.04 | 0.03 | 0.08 | situation (a) 0.19 0.21 0.13 situation (b) 0.21 0.26 0.14 | | | | | |

It is expected and the results in Table 6.2 and Table 6.3 show that $\overline{CECA}$ and $\overline{CEPA}$ are larger than $\overline{CA}$ and $\overline{PA}$, respectively, for each network and approach combination. In addition, the change of $\overline{CECA}$ and $\overline{CEPA}$ mostly follows the same trend of $\overline{CA}$ and $\overline{PA}$, respectively:
1. For any large constraint network, RN, SFN, or BECN, the Decentralized CEPD Logic has the largest $\overline{CECA}$ and $\overline{CEPA}$. The Centralized CEPD Logic has larger $\overline{CECA}$ and $\overline{CEPA}$ than the Traditional CEPD Algorithm;
2. The Centralized and Decentralized CEPD Logic has larger $\overline{CECA}$ and $\overline{CEPA}$ over the undirected network than the corresponding directed network. The Traditional completed automatically by computers or other computing devices. This is verified by simulation experiments which take less than 1 second of CPU time to complete one experiment. It is therefore reasonable to assume the time needed to search and mark nodes to be zero. The communication time in both Centralized and Decentralized CEPD Logic, however, may not be negligible, and is affected by many factors such as distance between nodes, routing algorithms, and transmission media. It is interesting to know how the three CEPD approaches perform when the communication time is larger than zero.

Additional experiments are conducted to study the performance of three CEPD approaches when $t_i \neq 0$. In the experiments, it is assumed that $t_i$ and $t_d$ follow the same distribution, i.e., $\bar{t}_i = 5$ and $t_i$ is randomly and uniformly drawn from (4,6) for both the Centralized and Decentralized CEPD Logic. According to Theorem 1, it is expected that $\overline{CA}$, $\overline{CECA}$, $\overline{PA}$, and $\overline{CEPA}$ will decrease and $\overline{TD}$ will increase for the Centralized CEPD Logic when $\bar{t}_i \neq 0$. The same trend is expected for the Traditional CEPD Algorithm. For the Decentralized CEPD Logic, $\overline{TT}$ will increase in situation (a) and remain almost the same in situation (b). It is expected that $\overline{CA}$, $\overline{CECA}$, $\overline{PA}$, and $\overline{CEPA}$ will remain almost the same. $\overline{TD}$ may increase because some CEs are detected, diagnosed, or prognosed at a later time. Table 6.4 summarizes the experiment results when $t_i \neq 0$.

TABLE 6.4

Experiment Results when $t_i \neq 0$

| Performance Measure | Network | Centralized | | | Decentralized | | | Traditional | | |
|---|---|---|---|---|---|---|---|---|---|---|
| | | RN | SFN | BECN | RN | SFN | BECN | RN | SFN | BECN |
| $\overline{TT}$ | Undirected | 50 | | | situation (a) | | | 50 | | |
| | | | | | 21.93 | 19.15 | 17.13 | | | |
| | | | | | situation (b) | | | | | |
| | | | | | 49.83 | 44.85 | 49.90 | | | |
| | Directed | | | | situation (a) | | | | | |
| | | | | | 21.70 | 18.35 | 16.70 | | | |
| | | | | | situation (b) | | | | | |
| | | | | | 49.97 | 49.74 | 49.97 | | | |
| $\overline{CA}$ | Undirected | 0.16 | 0.08 | 0.28 | situation (a) | | | 0.01 | | |
| | | | | | 0.37 | 0.39 | 0.36 | | | |
| | | | | | situation (b) | | | | | |
| | | | | | 0.44 | 0.45 | 0.43 | | | |
| | Directed | 0.05 | 0.04 | 0.18 | situation (a) | | | | | |
| | | | | | 0.35 | 0.34 | 0.33 | | | |
| | | | | | situation (b) | | | | | |
| | | | | | 0.44 | 0.44 | 0.43 | | | |
| $\overline{CECA}$ | Undirected | 0.24 | 0.13 | 0.35 | situation (a) | | | 0.02 | | |
| | | | | | 0.71 | 0.76 | 0.63 | | | |
| | | | | | situation (b) | | | | | |
| | | | | | 0.88 | 0.90 | 0.87 | | | |
| | Directed | 0.07 | 0.07 | 0.23 | situation (a) | | | | | |
| | | | | | 0.66 | 0.68 | 0.59 | | | |
| | | | | | situation (b) | | | | | |
| | | | | | 0.88 | 0.89 | 0.87 | | | |
| $\overline{PA}$ | Undirected | 0.03 | 0.01 | 0.07 | situation (a) | | | 0 | | |
| | | | | | 0.12 | 0.12 | 0.11 | | | |
| | | | | | situation (b) | | | | | |
| | | | | | 0.12 | 0.15 | 0.11 | | | |
| | Directed | 0.01 | 0.01 | 0.04 | situation (a) | | | | | |
| | | | | | 0.10 | 0.09 | 0.08 | | | |
| | | | | | situation (b) | | | | | |
| | | | | | 0.10 | 0.11 | 0.09 | | | |
| $\overline{CEPA}$ | Undirected | 0.05 | 0.02 | 0.08 | situation (a) | | | 0 | | |
| | | | | | 0.20 | 0.24 | 0.14 | | | |
| | | | | | situation (b) | | | | | |
| | | | | | 0.21 | 0.29 | 0.14 | | | |
| | Directed | 0.01 | 0.01 | 0.05 | situation (a) | | | | | |
| | | | | | 0.17 | 0.18 | 0.11 | | | |
| | | | | | situation (b) | | | | | |
| | | | | | 0.18 | 0.22 | 0.11 | | | |
| $\overline{TD}$ | Undirected | 33437 | 36202 | 28849 | situation (a) | | | 36878 | 37135 | 36663 |
| | | | | | 16832 | 16590 | 17043 | | | |
| | | | | | situation (b) | | | | | |
| | | | | | 14624 | 14470 | 14606 | | | |
| | Directed | 36942 | 36478 | 30284 | situation (a) | | | 37125 | 36802 | 36927 |
| | | | | | 17897 | 17779 | 18293 | | | |
| | | | | | situation (b) | | | | | |
| | | | | | 14769 | 14605 | 14911 | | | |

The comparison between Table 6.4, and Table 6.2 and Table 6.3 verifies the expectations. The performance of all three CEPD approaches deteriorates when $t_i \neq 0$. Among them, the Decentralized CEPD Logic is the most robust approach because its performance is affected the least when $t_i$ increases.

1. For the Centralized CEPD Logic, $\overline{CA}$, $\overline{CECA}$, $\overline{PA}$, and $\overline{CEPA}$ are smaller and $\overline{TD}$ are larger when $t_i \neq 0$ than what they are when $t_i = 0$;

2. For the Traditional CEPD Algorithm, $\overline{CA}$ and $\overline{CECA}$ are smaller and $\overline{TD}$ are larger when $t_i \neq 0$ than what they are when $t_i = 0$. $\overline{PA}$ and $\overline{CEPA}$ are zero in both cases;

3. For the Decentralized CEPD Logic, $\overline{TT}$ is larger in situation (a) when $t_i \neq 0$ than what it is when $t_i = 0$. $\overline{TT}$ remains almost the same in situation (b) when $t_i$ changes. $\overline{CA}$ and $\overline{CECA}$ remain almost the same when $t_i$ changes. $\overline{TD}$ is larger when $t_i \neq 0$ than what it is when $t_i = 0$. $\overline{PA}$ and $\overline{CEPA}$ are smaller when $t_i \neq 0$ than what they are when $t_i = 0$. This should be expected because some CEs that are prognosed when $t_i = 0$ are no longer prognosed when $t_i \neq 0$.

6.6. Network-Adaptive Centralized CEPD Logic

Based on the analysis and experiment results, it becomes clear that the performance of the Centralized CEPD Logic is sensitive to the network topology, i.e., RN, SFN, BECN, directed, or undirected. The performance of the Traditional CEPD Algorithm is not sensitive to the network topology at all. The performance of the Decentralized CEPD Logic is sensitive to the network topology to a certain degree, but not as much as the Centralized CEPD Logic. It is interesting to know if the Centralized or Decentralized CEPD Logic can take advantage of the network topology to improve their performance.

With the Decentralized CEPD Logic, each agent has local information about only one node, i.e., the constraint relationship (R) table such as Table 4.7 that describes the relationship between the node and other nodes. The only way for the Decentralized CEPD Logic to take advantage of the network topology is to let an agent have information about other nodes that are related to the node the agent is attached to. It is uncertain if this will improve the performance. Moreover, to enable an agent to obtain information about related nodes increases information overload and may be time consuming and error prone. It is therefore not recommended for agents to obtain information about related nodes.

A central control unit executes the Centralized CEPD Logic described in Table 4.5 to detect, diagnose, and prognose CEs. Because the central control unit has the complete information about all the nodes in the network (e.g., Table 4.3) and their relationship (e.g., Table 4.4), it is possible to explore the network topology to improve the performance of the Centralized CEPD Logic. Probably the most helpful improvement is to start CE detection at the node that has the most links, then go to the next node that has the second most links, and continue the process until all the nodes in the network are checked or the time that the CEPD must stop. This is relatively a minor change of the logic. In Step 3 of Table 4.5, originally con(r,t) is randomly selected. To improve, con(r,t) will be selected if it has the most links. The computation time of selecting the node with most links is negligible.

The improved CEPD Logic, Network-Adaptive Centralized CEPD Logic, is expected to have better performance, i.e., it is expected that $\overline{CA}$, $\overline{CECA}$, $\overline{PA}$, and $\overline{CEPA}$ will increase and $\overline{TD}$ will decrease. The performance improvement is due to the complete information owned by the central control unit. This unique advantage of the Centralized CEPD Logic is not shared by two other approaches. Table 6.5 summarizes the experiment results of the Network-Adaptive Centralized CEPD Logic.

TABLE 6.5

Experiment Results of the Network-Adaptive Centralized CEPD Logic

| Performance Measure | Network | Centralized | | |
| --- | --- | --- | --- | --- |
| | | RN | SFN | BECN |
| TT | Undirected | 49.95 | 49.83 | 50 |
| | Directed | 50 | 49.99 | 50 |
| $\overline{CA}$ | Undirected | 0.28 | 0.19 | 0.31 |
| | Directed | 0.18 | 0.14 | 0.24 |
| $\overline{CECA}$ | Undirected | 0.48 | 0.35 | 0.44 |
| | Directed | 0.28 | 0.25 | 0.31 |
| $\overline{PA}$ | Undirected | 0.10 | 0.06 | 0.12 |
| | Directed | 0.04 | 0.04 | 0.09 |
| $\overline{CEPA}$ | Undirected | 0.15 | 0.10 | 0.15 |
| | Directed | 0.07 | 0.06 | 0.11 |
| $\overline{TD}$ | Undirected | 27877 | 32380 | 24411 |
| | Directed | 34347 | 34955 | 28677 |

The comparison between Table 6.5, Table 6.2, and Table 6.3 verifies the expectations. $\overline{CA}$, $\overline{CECA}$, $\overline{PA}$, and $\overline{CEPA}$ increase and $\overline{TD}$ decrease. The Decentralized CEPD Logic, however, still outperforms the Network-Adaptive Centralized CEPD Logic.

Chapter 7. Conclusions and Implementation

7.1. Conclusions

This research studies conflict and error prevention and detection. The unique and major theoretical contributions of this research are:
1. Development of a constraint-based modeling tool to unambiguously define CEs, model the collaborative, cooperative, and/or coordination relationship between units in a system, and identify relationships between CEs (Sections 4.2 and 4.3);
2. Development of (a) Centralized CEPD Logic and, (b) Decentralized CEPD Logic to detect, diagnose, and prognose both conflicts and errors by exploring the relationship between CEs and agent-based technologies (Section 4.5);
3. Development of agent-oriented Petri nets to define interactive control of CEPD (Section 4.4);
4. Implementation and analyses of the newly developed CEPD logic, and the Traditional CEPD Algorithm over three types of real-world constraint networks: RN, SFN, and BECN (CHAPTER 5 and CHAPTER 6);
5. Development of four performance measures for validation and comparison of different CEPD approaches (Section 5.3);
6. Validation of CEPD logic through analytics (CHAPTER 5) and simulation experiments (CHAPTER 6).

The guidelines of when to apply which CEPD approaches have been developed in this research and are described as follows. Table 7.1 summarizes the recommended CEPD logic and algorithm.
1. Both analytical and experiments results show that for a large constraint RN, SFN, or BECN, the Decentralized CEPD Logic is preferred since it requires the least CEPD time, obtains the largest coverage ability and prognostics ability, and minimizes the total damage, compared to the Centralized CEPD Logic and Traditional CEPD Algorithm (Table 5.2, Table 6.2, and Table 6.3);
2. If the Decentralized CEPD Logic cannot be applied for certain reasons, e.g., communication disruptions between distributed agents, the Network-Adaptive Centralized CEPD Logic should be used to obtain relatively larger coverage ability and prognostics ability, and relatively smaller total damage compared to the Traditional CEPD Algorithm (Table 6.2, Table 6.3, and Table 6.5);
3. It is assumed in this research that: (1) there are many nodes (constraints) that need to be checked for CEs in a system, i.e., the size of the constraint network is relatively large; (2) the detection time for a CE is relatively small compared to the total time allowed for CEPD, so that the detection process can be repeated for sufficient amount of times in the Centralized CEPD Logic, e.g., 10 times. This assumption guarantees that at least one node that belongs to the giant component is detected for CEs; (3) the time needed to identify and mark related nodes in the Centralized CEPD Logic approaches zero; (4) the communication time approaches zero in both Centralized and Decentralized CEPD Logic. The first three assumptions hold in most real-world situations. When the last assumption is relaxed, i.e., when the communication time is not zero, experiment results show that the above two guidelines are still true (Table 6.2, Table 6.3, and Table 6.4);

4. This research has studied the typical real-world networks, i.e., the directed and undirected RN, SFN, and BECN. The exponent of the assumed SFN is −3, which is the median of most real-world SFNs. The fittest node has 80% of total links in the BECN. Other parameters are determined to make sure that the mean degree is the same for all six networks ($\bar{d}=1.37$). As long as there exists a giant component in the network, the above three guidelines may hold with one exception: the Centralized CEPD Logic may perform as well as the Decentralized CEPD Logic if the size of the giant component is large (Table 5.2). Both analytical (Table 5.2) and experiment results (Table 6.2) show that the Centralized CEPD Logic performs better as the size of the giant component increases. For instance, if (1) the exponent of the SFN is smaller than 1 (the size of the giant component tends to 1) (Aiello et al., 2000; Newman et al., 2006), (2) the mean degree of the RN is larger than 2 (the size of the giant component is larger than 0.8) (Solomonoff and Rapoport, 1951), and (3) the fittest node has more than 80% of total links in the BECN (the size of the giant component will be probably larger than 0.63), the performance of the Centralized CEPD Logic may be close or even the same as that of the Decentralized CEPD Logic;

5. If there is no giant component in the network, e.g., the exponent of the SFN is larger than 3.48 (Aiello et al., 2000; Newman et al., 2006), or the mean degree of the RN is less than 1 (Solomonoff and Rapoport, 1951), the Decentralized CEPD Logic still outperforms the other two approaches, i.e., the first guideline holds. The performance of the Centralized CEPD Logic may be only a little better or even the same as that of the Traditional CEPD Algorithm (Table 5.2).

TABLE 7.1

Recommended CEPD Logic and Algorithm

| Given Network ||||||  Given Condition || Recommended ||
| Undirected ||| Directed ||| Giant | Communication | CEPD Logic | |
| RN | SFN | BECN | RN | SFN | BECN | Component | on Time | or Algorithm | Source |
|---|---|---|---|---|---|---|---|---|---|
| x | x | x | | | | $p_g$ = 0.49 for RN; $0 < p_g < 1$ for SFN; $0.55 \le p_g \le 0.63$ for BECN | $0 \le t_i < \infty$ | Decentralized CEPD Logic | Table 5.2, Table 6.2, Table 6.3, and Table 6.4 |
| | | | | | | | $t_i \to \infty$ | Network-Adaptive Centralized CEPD Logic | Table 6.2, Table 6.3, and Table 6.5 |
| | | | x | x | x | $0 < p_g \le 0.49$ for RN; $0 < p_g < 1$ for SFN; $0 < p_g \le 0.63$ for BECN | $0 \le t_i < \infty$ | Decentralized CEPD Logic | Table 6.2, Table 6.3, and Table 6.4 |
| | | | | | | | $t_i \to \infty$ | Network-Adaptive Centralized CEPD Logic | Table 6.2, table 6.3, and Table 6.5 |
| x | x | x | | | | $p_g \to 1$: $\bar{d} > 2$ for RN; $\gamma < 1$ for SFN; the fittest node has more than 80% of total links for BECN | $0 \le t_i < \infty$ | Centralized CEPD Logic, Decentralized CEPD Logic, or Network-Adaptive Centralized CEPD Logic | Table 5.2, Table 6.2, Table 6.3, Table 6.4, and Table 6.5 |
| | | | | | | | $t_i \to \infty$ | Centralized CEPD Logic, Network-Adaptive Centralized CEPD Logic | Table 5.2, Table 6.2, Table 6.3, and Table 6.5 |
| x | x | | | | | $p_g \to 0$: $\bar{d} < 1$ for RN; $\gamma > 3.48$ for SFN | $0 \le t_i < \infty$ | Decentralized CEPD Logic | Table 5.2, Table 6.2, Table 6.3, Table 6.4, and Table 6.5 |
| | | | | | | | $t_i \to \infty$ | Centralized CEPD Logic, Network-Adaptive Centralized CEPD Logic, or Traditional CEPD Algorithm | Table 5.2, Table 6.2, Table 6.3, and Table 6.5 |

7.2. Implementation and Application Example

The general implementation steps to apply the CEPD Logic for a complex system are as following:

1. System network identification (Ljung, 1999). This step determines the topology of the system and the type of links in the system. If the topology of the system is known, e.g., a highway system is a random network, the type of each link, i.e., directed or undirected, needs to be determined. Sometimes there are no appropriate theoretical network models that can be used to describe the system topology. System network identification is significantly influenced by how the system is modeled. For instance, the Internet can be modeled at the router level or at the server level. These two modeling approaches may lead to two different system network models in terms of topology, type of links, or network parameters;
2. Constraint modeling and network identification. Once the network of the system is identified, each node in the network can be represented by a constraint and links between nodes represent relationships between constraints. In this case, the constraint network is the same as the system network. In other cases, however, the constraint network can be different from the system network. For instance, a link instead of a node in the system network is represented by a constraint. When the system network cannot be described with any theoretical network models, constraints can be modeled in a way that the constraint network can be described with certain theoretical network model. A constraint network that can be described with a theoretical network model such as RN, SFN, or BECN enables analytical study for optimized CEPD logic or algorithm;
3. Analysis of CEPD logic and algorithms. Once the constraint network has been identified, the Centralized CEPD Logic, Decentralized CEPD Logic, and Tradition CEPD Algorithm can be analyzed with the knowledge of the characteristics of CEPD logic and algorithms and the network model that describes the constraint network. If the constraint network is a directed or undirected RN, SFN, or BECN studied in this research, analysis has been completed and Table 7.1 summarizes which logic and/or algorithm is recommended to optimize the CEPD performance. Simulation experiments can be conducted to validate the analytics. If the constraint network cannot be described with a known network model, analytics is not applicable and simulation experiments should be conducted to analyze CEPD logic and algorithms before they are applied to the real system;
4. Test CEPD logic/algorithm. After the analysis of CEPD logic and algorithms, selected CEPD logic/algorithms are applied to the real system to test their performance. Test results are expected to confirm analytical and simulation experiment results. If test results do not match analytical or simulation experiment results, Step 3 may be revisited;
5. Finalize and apply the selected CEPD logic/algorithm. The selected CEPD logic/algorithm may be customized to adapt to specific CEPD requirements. For instance, if a constraint is dissatisfied more frequently compared to other constraints, i.e., a conflict or an error occurs more frequently compared to other CEs, the CEPD logic/algorithm can start with checking this constraint. As another example, if the system has certain fault-tolerant ability, the CEPD logic/algorithm can be adjusted to not visit certain constraints. If a significant adaptation is required, Step 2 may be revisited.

The above implementation steps can be illustrated with the electrical power grid of the western United States (Barabasi and Albert, 1999):
1. System network identification. The nodes in this electrical power grid include generators, transformers, and substations. There are 4941 nodes. The links are the high-voltage transmission lines between the nodes. All links are directed links. This power grid has been identified as a SFN with $\gamma=4$;
2. Constraint modeling and network identification. Each node in the electrical power grid can be represented by a constraint and links between nodes represent relationships between constraints. For instance, a constraint for a generator is "Providing $10^4$ voltage electricity." The constraint network is the same as the system network, i.e., a SFN with $\gamma=4$. Links between nodes in the constraint network are directed links. It is possible to construct different constraint networks for the same system network. For instance, a node in the electrical power grid can be represented by multiple constraints if necessary. In this case, it may be difficult to study the CEPD performance analytically due to the lack of known theoretical network models.
3. Analysis of CEPD logic and algorithms. Recall the discussion in Section 5.2, the degree distribution function $cd^{-\gamma}$ of a SFN is a power series ($d \to \infty$), and the mean degree of a SFN converges if $\gamma>2$ and diverges if $1<\gamma\leq2$ (Arfken, 2005). Because the constraint network for the electrical power grid is a SFN with $\gamma=4$, the CEPD performance can be studied analytically. The analytical results for the comparison of Centralized CEPD Logic, Decentralized CEPD Logic, and Traditional CEPD Algorithm are expected to be similar to those in Sections 5.3 and 6.3. The Decentralized CEPD Logic should be used if communication between agents is possible. If the communication is broken, Network-Adaptive Centralized CEPD Logic should be used to optimize CEPD performance based on the four performance measures defined in Section 5.3. A simulation model can also be built to analyze the performance of different CEPD logic and algorithms;
4. Test CEPD logic/algorithm. The Decentralized CEPD Logic and Network-Adaptive Centralized CEPD Logic can be tested with the electrical power grid. The test results are compared with the analytical results in terms of the four performance measures, i.e., it is expected that the logic completes CEPD within certain amount of time, achieves expected coverage ability and prognostics ability, and the damage caused by CEs is close to analytical result;
5. Finalize and apply the selected CEPD logic/algorithm. Even if the CEPD logic has been tested and test results match analytical results, the CEPD logic may not meet system requirements. For instance, the CEPD logic cannot complete CEPD within certain amount of time that is acceptable to the electrical power grid. The CEPD logic may be improved to meet system requirements. For instance, a heuristic CEPD logic can start CEPD with constraints that are dissatisfied most frequently.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

The following references are incorporated herein by reference:

LIST OF REFERENCES

Albert, R., Jeong, H., and Barabasi, A. L., 1999, "Internet: Diameter of the World-Wide Web," *Nature,* 401(6749), pp. 130-131.
Albert, R., Jeong, H., and Barabasi, A. L., 2000, "Error and attack tolerance of complex networks," *Nature,* 406 (6794), pp. 378-382.
Aiello, W., Chung, F., and Lu, L., 2000, "A random graph model for massive graphs," In *Proceedings of the 32$^{rd}$ Annual ACM Symposium on Theory of Computing,* pp. 171-180. Association of Computing machinery, New York.

Angeles Serrano, M. and De Los Rios, P., 2007, "Interfaces and the edge percolation map of random directed networks," *Physical Review E—Statistical, NonInear, and Soft Matter Physics,* 76(5), pp. 56-121.

Anussornnitisam, P., 2003, Design of active middleware protocols for coordination of distributed resources, Ph.D. Dissertation, School of Industrial Engineering, Purdue University, West Lafayette, Ind., U.S.A.

Arfken, G. B., 2005, Mathematical methods for physicists, 6$^{th}$ ed., Elsevier, Boston.

AutoMod Version 11.1, 1998-2003, Brooks Automation, Inc.

Avila-Soria, J., 1998, Interactive error recovery for robotic assembly using a neural-fuzzy approach, Master Thesis, School of Industrial Engineering, Purdue University, West Lafayette, Ind., U.S.A.

Barabasi, A. L. and Albert, R., 1999, "Emergence of scaling in random networks," *Science,* 286(5439), pp. 509-512.

Barabasi, A. L., 2002, Linked: the new science of networks, Perseus Publishing, Cambridge, Mass.

Barber, K. S., Liu, T. H., and Ramaswamy, S., 2001, "Conflict detection during plan integration for multi-agent systems," *IEEE Transactions on Systems, Man, and Cybernetics, Part B: Cybernetics,* 31(4), pp. 616-628.

Bianconi, G. and Barabasi, A. L., 2001a, "Competition and multiscaling in evolving networks," *Europhysics Letters,* 54(4), pp. 436-442.

Bianconi, G. and Barabasi, A. L., 2001b, "Bose-Einstein condensation in complex networks," *Physical Review Letters,* 86(24), pp. 5632-5635.

Bollobas, B., 2001, Random graphs, Academic Press, New York, 2$^{nd}$ ed.

Broder, A., Kumar, R., Maghoul, F., Raghavan, P., Rajagopalan, S., Stata, R., Tomkins, A., and Wiener, J., 2000, "Graph structure in the Web," *Computer Networks,* 33(1), pp. 309-320.

Cai, J., Zhang, G., and Zhou, Z., 2006, "The application of area-reconstruction operator in automatic visual inspection of quality control," in *Proc. of the World Congress on intelligent Control and Automation (WCICA),* 2, pp. 10111-10115.

Calderon-Martinez, J. A. and Campoy-Cervera, P., 2006, "An application of convolutional neural networks for automatic inspection," *IEEE Conference on Cybernetics and Intelligent Systems,* pp. 1-6.

Ceroni, J. A. and Velasquez, A. A., 2003, "Conflict detection and resolution in distributed design," *Production Planning and Control,* 14(8), pp. 734-742.

Chang, C.-Y., Chang, J.-W., and Jeng, M. D., 2005, "An unsupervised self-organizing neural network for automatic semiconductor wafer defect inspection," *IEEE International Conference on Robotics and Automation,* pp. 3000-3005.

Chen, L., Wang, X., Suzuki, M., and Yoshimura, N., 1999, "Optimizing the lighting in automatic inspection system using Monte Carlo method," *Japanese Journal of Applied Physics, Part 1: Regular Papers and Short Notes and Review Papers,* 38(10), pp. 6123-6129.

Chen, X. W. and Nof, S. Y., 2007, "Error detection and prediction algorithms: application in robotics," *Journal of Intelligent and Robotic Systems,* 48(2), pp. 225-252.

Chen, X., 2009, "Information systems supported decentralized conflict and error prevention and detection," in *Proceedings of the 2009 Industrial Engineering Research Conference,* Miami, Fla., USA.

Chen, X. W. and Nof, S. Y., 2009, "Automating error and conflict prognostics and prevention," In *Handbook of Automation,* Springer Publishers, Heidelberg, Germany.

Chen, X. W. and Nof, S. Y., 2010, "A decentralized conflict and error detection and prediction model," *International Journal of Production Research,* 48(16), pp. 4829-4843.

Chen, X. W. and Nof, S. Y., 2011, "Agent-based error prevention algorithms," submitted to *Expert Systems with Applications.*

Chiang, L. H., Braatz, R. D., and Russell, E., 2001, Fault detection and diagnosis in industrial systems, London, N.Y., Springer.

Choi, J. Y., Lim, H., and Yi, B.-J., 2006, "Semi-automatic pipeline inspection robot systems," *SICE-ICASE International Joint Conference,* pp. 2266-2269.

Chung, S.-L., Wu, C.-C., and Jeng, M., 2003, Failure diagnosis: A case study on modeling and analysis by Petri nets, Washington, D.C., United States, Institute of Electrical and Electronics Engineers Inc.

Cohen, R., Erez, K., Ben-Avraham, D., and Havlin, S., 2000, "Resilience of the Internet to random breakdowns," *Physical Review Letters,* 85(21), pp. 4626-4628.

Cohen, R., Erez, K., Ben-Avraham, D., and Havlin, S., 2001, "Breakdown of the Internet under intentional attack," *Physical Review Letters,* 86(16), pp. 3682-3685.

Cohen, R. and Havlin, S., 2003, "Scale-free networks are ultrasmall," *Physical Review Letters,* 90(5), pp. 0587011-0587014.

Deb, S., Pattipati, K. R., Raghavan, V., Shakeri, M., and Shrestha, R., 1995, "Multi-signal flow graphs: a novel approach for system testability analysis and fault diagnosis," *IEEE Aerospace and Electronics Systems Magazine,* 10(5), pp. 14-25.

Dorogovtsev, S. N., Mendes, J. F. F., and Samukhin, A. N., 2001, "Giant strongly connected component of directed networks," *Physical Review E—Statistical, Nonlinear, and Soft Matter Physics,* 64(2), pp. 0251011-0251014.

Duarte, F., Arauio, H., and Dourado, A., 1999, "Automatic system for dirt in pulp inspection using hierarchical image segmentation," *Computers and Industrial Engineering,* 37(1-2), pp. 343-346.

Erdos, P. and Renyi, A., 1959, "On random graphs," *Publicationes Mathematicae Debrecen,* 6, pp. 290-291. (see Newman et al., 2006)

Erdos, P. and Renyi, A., 1960, "On the evolution of random graphs," *Magyar Tud. Akad. Mat. Kutato Int. Kozl.,* 5, pp. 17-61. (see Newman et al., 2006)

Erdos, P. and Renyi, A., 1961, "On the strength of connectedness of a random graph," *Acta mathematica Academiae Scientiarum Hungaricae,* 12, pp. 261-267. (see Newman et al., 2006)

Erne, O., Walz, T., and Ettemeyer, A., 1999, "Automatic shearography inspection systems for aircraft components in production," in *Proc. of SPIE,* 3824, pp. 326-328.

Feng, C., Bhuyan, L. N., and Lombardi, F., 1996, "Adaptive system-level diagnosis for hypercube multiprocessors," IEEE Transactions on Computers, 45(10), pp. 1157-1170.

Finogenoy, L. V., Beloborodov, A. V., Ladygin, V. I., Chugui, Y. V., Zagoruiko, N. G., Gulvaevskii, S. Y., Shul'man, Y. S., Lavrenyuk, P. I., and Pimenov, Y. V., 2007, "An optoelectronic system for automatic inspection of the external view of fuel pellets," *Russian Journal of Nondestructive Testing,* 43(10), pp. 692-699.

Georgilakis, P. S., Katsigiannis, J. A., Valavanis, K. P., and Souflaris, A. T., 2006, "A systematic stochastic Petri net based methodology for transformer fault diagnosis and repair actions," *Journal of Intelligent and Robotic Systems: Theory and Applications*, 45(2), pp. 181-201.

Gertler, J., 1998, Fault detection and diagnosis in engineering systems, New York, Marcel Dekker.

Godoi, W. C., da Silva, R. R., and Swinka-Filho, V., 2005, "Pattern recognition in the automatic inspection of flaws in polymeric insulators," *Insight: Non-Destructive Testing and Condition Monitoring*, 47(10), pp. 608-614.

Huang, C. K., Wang, L. G., Tang, H. C., and Tarng, Y. S., 2006, "Automatic laser inspection of outer diameter, run-out taper of micro-drills," *Journal of materials processing Technology*, 171(2), pp. 306-313.

Jeong, H., 2003, "Complex scale-free networks," *Physica A: Statistical Mechanics and Its Applications*, 321, pp. 226-237.

Jiang, T. and Nevill Jr, G. E., 2002, "Conflict cause identification in web-based concurrent engineering design system," *Concurrent Engineering Research and Applications*, 10(1), pp. 15-26.

Khan, U. S., Igbal, J., and Khan, M. A., 2005, "Automatic inspection system using machine vision," in *Proc. of 34th Applied Imagery Pattern Recognition Workshop*, pp. 210-215.

Klein, B. D., 1997, "How do actuaries use data containing errors? Models of error detection and error correction," *Information Resources Management Journal*, 10(4), pp. 27-36.

Klein, M., 1992, "Detecting and resolving conflicts among cooperating human and machine-based design agents," *Artificial Intelligence in Engineering*, 7(2), pp. 93-104.

Lara, M. A. and Nof, S. Y., 2003, "Computer-supported conflict resolution for collaborative facility designers," *International Journal of Production Research*, 41(2), pp. 207-233.

Li, X., Zhou, X., and Ruan, X., 2002, "Conflict management in closely coupled collaborative design system," *International Journal of Computer Integrated Manufacturing*, 15(4), pp. 345-352.

Ljung, L., 1999, System identification: theory for the user, 2nd, Upper Saddle River, N.J.: Prentice Hall PTR.

Moganti, M. and Ercal, F., 1995, "Automatic PCB inspection systems," *IEEE Potentials*, 14(3), pp. 6-10.

Molloy, M. and Reed, B., 1995, "A critical point for random graphs with a given degree sequence," *Random Structures and Algorithms*, 6(2-3), pp. 161-179.

Najjari, H. and Steiner, S. J., 1997, "Integrated sensor-based control system for a flexible assembly," *Mechatronics*, 7(3), pp. 231-262.

Newman, M. E. J., 2003, "The Structure and Function of Complex Networks," *SIAM Review*, 45(2), pp. 167-256.

Newman, M. E. J., Strogatz, S. H., and Watts, D. J., 2001, "Random graphs with arbitrary degree distributions and their applications," *Physical Review E—Statistical, Nonlinear, and Soft Matter Physics*, 64(2), 0261181-02611817.

Newman, M. E. J., Barabasi, A. L., and Watts, D. J., 2006, The structure and dynamics of networks, Princeton University Press, Princeton, N.J.

Ni, C. W., 2004, "Automatic inspection of the printing contents of soft drink cans by image processing analysis," in *Proc. of SPIE*, 3652, pp. 86-93.

Nof, S. Y., 2003, "Design of effective e-Work: review of models, tools, and emerging challenges," *Production Planning and Control*, 14(8), pp. 681-703.

O'Hare, G. M. P. and Jennings, N., 1996, Foundations of distributed artificial intelligence, New York, Wiley.

Pattipati, K. R. and Alexandridis, M. G., 1990, "Application of heuristic search and information theory to sequential fault diagnosis," *IEEE Transactions on Systems, Man and Cybernetics*, 20(4), pp. 872-887.

Pattipati, K. R. and Dontamsetty, M., 1992, "On a generalized test sequencing problem," *IEEE Transactions on Systems, Man and Cybernetics*, 22(2), pp. 392-396.

Price, D. J. DE S., 1965, "Networks of scientific papers," *Science*, 149, pp. 510-515. (see Newman et al., 2006)

Raghavan, V., Shakeri, M., and Pattipati, K., 1999a, "Optimal and near-optimal test sequencing algorithms with realistic test models," *IEEE Transactions on Systems, Man, and Cybernetics Part A: Systems and Humans*, 29(1), pp. 11-26.

Raghavan, V., Shakeri, M., and Pattipati, K., 1999b, "Test sequencing algorithms with unreliable tests," *IEEE Transactions on Systems, Man, and Cybernetics Part A: Systems and Humans*, 29(4), pp. 347-357.

Raich, A. and Cinar, A., 1996, "Statistical process monitoring and disturbance diagnosis in multivariable continuous processes," *AIChE Journal*, 42(4), pp. 995-1009.

Rau, H. and Wu, C.-H., 2005, "Automatic optical inspection for detecting defects on printed circuit board inner layers," *International Journal of Advanced Manufacturing Technology*, 25(9-10), pp. 940-946.

Rezai, M., Ito, M. R., and Lawrence, P. D., 1995a, Modeling and simulation of hybrid control systems by Global Petri Nets, Seattle, Wash., USA, IEEE.

Rezai, M., Lawrence, P. D., and Ito, M. R., 1995b, Analysis of faults in hybrid systems by global Petri nets, Vancouver, BC, Can, IEEE, Piscataway, N.J., USA.

Rezai, M., Lawrence, P. D., and Ito, M. B., 1997, Hybrid modeling and simulation of manufacturing systems, Los Angeles, Calif., USA, IEEE.

Sampath, M., Sengupta, R., Lafortune, S., Sinnamohideen, K., and Teneketzis, D., 1995, "Diagnosability of discrete-event systems," *IEEE Transactions on Automatic Control*, 40(9), pp. 1555-1575.

Shakeri, M., Pattipati, K. R., Raghavan, V., Patterson-Hine, A., and Kell, T., 1995, Sequential test strategies for multiple fault isolation, Atlanta, Ga., USA, IEEE, Piscataway, N.J., USA.

Shakeri, M., Raghavan, V., Pattipati, K. R., and Patterson-Hine, A., 2000, "Sequential testing algorithms for multiple fault diagnosis," *IEEE Transactions on Systems, Man & amp; Cybernetics, Part A: Systems & amp; Humans*, 30(1), pp. 1-14.

Shiau, J.-Y., 2002, A formalism for conflict detection and resolution in a multi-agent system, United States, Arizona, Arizona State University.

Shin, M., Cha, Y., Ryu, K., and Jung, M., 2006, "Conflict detection and resolution for goal formation in the fractal manufacturing system," *International Journal of Production Research*, 44(3), pp. 447-465.

Solomonoff, R. and Rapoport, A., 1951, "Connectivity of random nets," *Bulletin of Mathematical Biophysics*, 13, pp. 107-117. (see Newman et al., 2006)

Tadic, B., 2001, "Dynamics of directed graphs: the world-wide Web," *Physica A: Statistical Mechanics and Its Applications*, 293, pp. 273-284.

Tu, F., Pattipati, K., Deb, S., and Malepati, V. N., 2002, Multiple fault diagnosis in graph-based systems, Orlando, Fla., United States, The International Society for Optical Engineering.

Tu, F. and Pattipati, K. R., 2003, "Rollout strategies for sequential fault diagnosis," *IEEE Transactions on Systems, Man, and Cybernetics Part A: Systems and Humans,* 33(1), pp. 86-99.

Tu, F., Pattipati, K. R., Deb, S., and Malepati, V. N., 2003, "Computationally efficient algorithms for multiple fault diagnosis in large graph-based systems," *IEEE Transactions on Systems, Man, and Cybernetics Part A: Systems and Humans,* 33(1), pp. 73-85.

Ushio, T., Onishi, I., and Okuda, K., 1998, Fault detection based on Petri net models with faulty behaviors, San Diego, Calif., USA, IEEE, Piscataway, N.J., USA.

Velasquez, J. D., Lara, M. A., and Nof, S. Y., 2008, "Systematic resolution of conflict situations in collaborative facility design," Int. J. of Production Economics, 116(1), pp. 139-53.

Watts, D. J. and Strogatz, S. H., 1998, "Collective dynamics of 'small-world' networks," *Nature,* 393(6684), pp. 440-442.

Wenbin, Q. and Kumar, R., 2006, "Decentralized failure diagnosis of discrete event systems," *IEEE Transactions on Systems, Man & amp; Cybernetics, Part A: Systems & amp; Humans,* 36(2), pp. 384-395.

Wilson, J. C. and Berardo, P. A., 1995, "Automatic inspection of hazardous materials by mobile robot," in *Proc. of the IEEE International Conference on Systems, Man and Cybernetics,* 4, pp. 3280-3285.

Yang, C.-L. and Nof, S. Y., 2004a, "Design of a task planning conflict and error detection system with active protocols and agents," *PRISM Research Memorandum,* School of Industrial Engineering, Purdue University, West Lafayette, Ind., U.S.A., 2004-P1.

Yang, C.-L. and Nof, S. Y., 2004*b*, "Analysis, detection policy, and performance measures of detection task planning errors and conflicts," *PRISM Research Memorandum,* School of Industrial Engineering, Purdue University, West Lafayette, Ind., U.S.A., 2004-P2.

Yang, C.-L., Chen, X., and Nof, S. Y., 2005, "Design of a production conflict and error detection model with active protocols and agents," 18*th International Conference on Production Research,* Italy.

Zad, S. H., Kwong, R. H., and Wonham, W. M., 2003, "Fault diagnosis in discrete-event systems: framework and model reduction," *IEEE Transactions on Automatic Control,* 48(7), pp. 1199-1212.

Zhou, M. and DiCesare, F., 1993, Petri net synthesis for discrete event control of manufacturing systems, Boston, Kluwer Academic.

Zhou, M., DiCesare, F., and Desrochers, A. A., 1992, "A hybrid methodology for synthesis of Petri net models for manufacturing systems," *IEEE Transactions on Robotics and Automation,* 8(3), pp. 350-361.

GLOSSARY

| | |
|---|---|
| •: | Constraint |
| •a: | Pre-set of a |
| ( )$^P$: | Cooperate and/or coordinate to provide |
| ( )$^R$: | Cooperate and/or coordinate to receive |
| ($h_i$, $h_j$): | An edge |
| —: | Exclusive relationship |
| →: | Inclusive relationship |
| ↦: | Four types of collaboration |

GLOSSARY -continued

| | |
|---|---|
| $\overrightarrow{\text{Cause}}$ : | Causation between CEs |
| $\overrightarrow{\text{Dissatisfy}}$ : | Dissatisfy a constraint |
| $\overrightarrow{\text{Satisfy}}$ : | Satisfy a constraint |
| γ: | Exponent of a scale-free network |
| η: | Fitness parameter |
| $t'$ (i, t): | Co-U state |
| θ(r, t): | Co-net state |
| λ: | Parameter in the fitness distribution |
| π(i, t): | A set of constraints |
| ρ(η): | Fitness distribution |
| Ω(r, t): | A set of Co-Us |
| a: | Index of CEPD logic execution |
| a•: | Post-set of a |
| c: | Constant |
| con(r, t): | Constraint |
| d: | Degree of a node |
| $\bar{d}$: | Mean degree |
| $\overline{dA}$: | Mean damage per time unit caused by a CE |
| e-activities: | Electronic activities |
| e-Work: | Electronic Work |
| f : | A flow relation |
| i: | Index of Co-U |
| j: | Number of times Step 5 in Table 4.5 is executed |
| k: | Maximum number of tokens in any place |
| l: | Distance between nodes |
| m: | Number of CEs prognosed |
| n: | Size of a network |
| n': | Number of nodes each of which requires detection |
| n": | Number of nodes left in the undirected RN after j steps |
| n(r, t): | Co-net |
| p: | A place |
| p: | Probability |
| p$_{both}$: | Probability of undirected link |
| p$_c$: | Critical probability |
| p$_g$: | Portion of nodes in the giant component |
| p$_{in}$: | Probability of incoming directed link |
| p$_{out}$: | Probability of outgoing directed link |
| p$_{CE}$: | Probability of a node having a CE |
| r: | Index of constraint and Co-net |
| r: | Reliability of a detection technique |
| t: | Time |
| t$_b$: | Beginning time of an invariant model |
| t$_c$: | Current time |
| $\bar{t}_d$: | Mean detection time of a detection technique |
| t$_e$: | End time of an invariant model |
| $\bar{t}_i$: | Mean time of one information transmission |
| tr: | A transition |
| u: | Firing counts |
| u(i, t): | Co-U |
| x: | A place invariant or a P-invariant |
| AP: | CEPD approach |
| BECN: | Bose-Einstein condensation network |
| C: | Incidence matrix |
| C table: | Constraint table |
| C(n(r, t)): | A conflict |
| Co-net: | Coordination network |
| Co-U: | Cooperative Unit |
| CA: | Coverage ability |
| CE: | Conflict and Error |
| CE(r, t): | A CE |
| CECA: | CE Coverage ability |
| CEDA: | Conflict and Error Detection Agent |
| CEDM: | Conflict and Error Detection Mode |
| CEDP: | Conflict and Error Detection Protocol |
| CEPA: | CE prognostics ability |
| CEPD: | Conflict and Error Prevention and Detection |
| CP: | Corporate and/or Coordinate to Provide |
| CR: | Corporate and/or Coordinate to Receive |
| DG: | Directed Graph |
| E: | A set of fault propagation edges |
| E(u(r, i, t)): | An error |

-continued

GLOSSARY

| | |
|---|---|
| E-PERT: | Extended Project Estimation and Review Technique |
| F: | A set of flow relations |
| FDI: | Fault Detection and Isolation |
| FIFO: | First-In-First-Out |
| FSM: | Finite State Machine |
| M: | Marking |
| M(p): | Number of tokens in place p |
| $M \xrightarrow{tr}$: | M - enabled |
| $M_0$: | Initial markingZ |
| MDP: | Markov Decision Problem |
| MM: | Many-to-Many |
| MO: | Many-to-One |
| N: | A place/transition net |
| N: | The set of natural numbers |
| $N(\Omega(r, t))$: | Number of Co-Us |
| NET: | Network |
| OO: | One-to-One |
| OM: | One-to-Many |
| P: | A finite set of places |
| \|P\|: | Total number of places in a place/transition net |
| PA: | Prognostics ability |
| PDA: | Prognostics and Diagnostics Agent |
| PRISM: | Production, Robotics, and Integration Software for Manufacturing and Management |
| P/T: | Place/Transition |
| R table: | Constraint relationship table |
| RN: | Random network |
| SFN: | Scale-free network |
| T: | Task |
| T: | A finite set of transitions |
| T: | End time of an invariant model |
| TD: | Total CE damage |
| TEAMS: | Testability Engineering And Maintenance System |
| $TE^a$: | End time of CEPD logic |
| TI: | Task Independent |
| $TS^a$: | Start time of CEPD logic |
| TT: | Total CEPD time |
| V: | A set of components or tests |
| W: | A set of arc weights |
| Z: | The set of integers |

The invention claimed is:

1. A system, comprising:
two or more cooperative units, wherein the two or more cooperative units periodically exhibit conflicts and errors
at least one control unit configured to;
   receive a list of parameters associated with the cooperative units and interactions between the cooperative units by at least one control unit;
   perform conflict and error detection, including:
      a) providing a list of at least two constraints, each constraint defining a task to be accomplished or a requirement to be satisfied by one or more cooperative units by a first time;
      b) identifying one or more constraints from the list, which need to be satisfied by a defined time;
      c) identifying for each identified constraint whether any conflict or error exists; where a conflict occurs whenever an inconsistency between two or more cooperative units occurs, and an error is associated with any condition that is inconsistent with the list of parameters;
      d) marking the constraints for which an error or conflict has been identified;
      e) incrementing a mark count for each cooperative unit associated with each marked constraint;
   perform at least one of diagnosis and prognosis based at least in part on the marked constraints; and
wherein the at least one control unit is further configured to:
   create and update at least one constraint (C) table using the list of parameters associated with the cooperative units and interactions between the cooperative units;
   use the constraint table in step e) to identify each cooperative unit associated with each constraint marked in step d);
   model dependencies between constraints to form at least one relationship (R) table using the C table and the list of parameters associated with a system of cooperative units and interactions between the cooperative units;
   use the at least one R table in performing the at least one of diagnosis and prognosis in the at least one control unit;
   establish and update a constraint network encompassing the constraints and their dependencies using the C and R tables, wherein each node in the constraint network is represented by a constraint and links between nodes represent relationships between constraints;
   diagnose and mark constraints that have conflicts or errors through the analysis of the constraint network; and
   predict and mark constraints that have or will have conflicts or errors through the analysis of the constraint network.

2. The system of claim 1, wherein the at least one control unit is further configured to perform diagnosis, including:
   f) identifying each constraint having a first predefined relationship with each constraint marked in d); and
   g) marking the constraints identified in f).

3. The system of claim 2, wherein the predetermined relationship includes a condition wherein a time associated with the identified constraint is the same or earlier than a time associated with the constraint marked in step d).

4. The system of claim 2, wherein the predetermined relationship includes a condition wherein a time associated with the identified constraint is later than a time associated with the constraint marked in step d).

5. The system of claim 3, wherein the at least control unit is further configured to perform prognosis, including:
   h) identifying each constraint having a second predefined relationship with each constraint marked in d); and
   i) marking the constraints identified in h).

6. The system of claim 1, wherein the at least one control unit is further configured to mark in a different manner the constraints for which an error or conflict has not been identified.

7. The system of claim 1, wherein the at least one control unit is further configured to cause visualization of steps a), b) and c) and enable interactions between users based at least in part on using Petri nets or other state transition graphs.

8. A system for preventing and detecting conflicts and errors through prognostics and diagnostics, comprising:
   multiple autonomous agents or control units;
      each receiving a list of parameters associated with agents or control units with which the current agent or control unit has an inclusive, mutually exclusive, or other relationship, each modeling a first constraint;
      each performing detection, including:
         a) identifying any conflict or error associated with the first constraint;
         b) marking the first constraint to identify whether any conflict or error is identified;
         c) communicating a message to another of the agents or control units, the message including information determined at least in part based on whether any conflict or error is identified; and wherein, step a) further comprises, if information from another of the agents and control units identifies that no conflict exists, then identifying a second constraint associated with the first constraint; and step b) further comprises marking the first constraint to indicate no conflict or error identified.

9. The system of claim 8, wherein step c) further comprises communicating the message to an agent or control unit associated with the second constraint.

10. The system of claim 9, further comprising:

d) identifying a third constraint associated with the first constraint; and e) communicating a second message to an agent or control unit associated with the third constraint.

11. The system of claim 10, wherein the second message comprises information identifying whether a conflict or error was identified.

12. The system of claim 9, wherein the message comprises information identifying whether a conflict or error was identified.

13. The system of claim 12, further comprising:

d) identifying a third constraint associated with the first constraint; and e) communicating a second message to an agent or control unit associated with the third constraint.

14. The system of claim 13, wherein the second message comprises information identifying whether a conflict or error was identified.

* * * * *